US008266111B2

(12) United States Patent
Lin et al.

(10) Patent No.: US 8,266,111 B2
(45) Date of Patent: Sep. 11, 2012

(54) DISTRIBUTED DATABASE SYSTEM PROVIDING DATA AND SPACE MANAGEMENT METHODOLOGY

(75) Inventors: Mei-Lin Linda Lin, San Jose, CA (US); Fei Zhou, Glenview, IL (US); Joe Francis, Fremont, CA (US); Srikanth Sampath, Fremont, CA (US); Satya N. Ramachandran, Fremont, CA (US); Gangavara Prasad Varakur, Livermore, CA (US)

(73) Assignee: Sybase, Inc., Dublin, CA (US)

( * ) Notice: Subject to any disclaimer, the term of this patent is extended or adjusted under 35 U.S.C. 154(b) by 612 days.

(21) Appl. No.: 12/056,201

(22) Filed: Mar. 26, 2008

(65) Prior Publication Data
US 2008/0235298 A1 Sep. 25, 2008

Related U.S. Application Data

(62) Division of application No. 10/904,263, filed on Nov. 1, 2004, now Pat. No. 7,403,945.

(51) Int. Cl.
*G06F 7/00* (2006.01)

(52) U.S. Cl. ........................................ 707/674

(58) Field of Classification Search .................. 707/674
See application file for complete search history.

(56) References Cited

U.S. PATENT DOCUMENTS
6,732,124 B1 * 5/2004 Koseki et al. ........................ 1/1
* cited by examiner

*Primary Examiner* — Etienne Leroux
*Assistant Examiner* — Ajith Jacob
(74) *Attorney, Agent, or Firm* — Sterne, Kessler, Goldstein and Fox P.L.L.C.

(57) ABSTRACT

A distributed database system providing data and space management methodology. In a distributed database system having an allocation page for tracking allocation and deallocation of data pages including a deallocation bit for tracking data page deallocation, a method for determining when to clear the deallocation bit during recovery comprises: during runtime operation, generating log records recording allocation and deallocation of data pages, setting the deallocation bit during deallocation of a data page by a transaction, and clearing the deallocation bit after the transaction has committed; during recovery following a failure, identifying a particular log record corresponding to the deallocation bit set during deallocation of a given data page; determining whether the deallocation of the given data page recorded in the particular log record committed prior to the failure; and if the deallocation of the given data page committed prior to the failure, clearing the deallocation bit.

30 Claims, 16 Drawing Sheets

LOCK SUFFICIENCY TABLE 701

| Lock Held | Lock Requested | | | | | |
|---|---|---|---|---|---|---|
| | EX | PW | PR | CW | CR | NL |
| EX | yes | yes | yes | yes | yes | yes |
| PW | no | yes | yes | yes | yes | yes |
| PR | no | no | yes | no | yes | yes |
| CW | no | no | no | yes | yes | yes |
| CR | no | no | no | no | yes | yes |
| NL | no | no | no | no | no | yes |

*FIG. 7A*

LOCK CONFLICT TABLE 702

| Lock Held | Lock Requested | | | | | |
|---|---|---|---|---|---|---|
| | EX | PW | PR | CW | CR | NL |
| EX | yes | yes | yes | yes | yes | no |
| PW | yes | yes | yes | yes | no | no |
| PR | yes | yes | no | yes | no | no |
| CW | yes | yes | yes | no | no | no |
| CR | yes | no | no | no | no | no |
| NL | no | no | no | no | no | no |

*FIG. 7B*

LOCK DOWNGRADE TABLE 703

| Lock Held | Lock Requested | | | | | |
|---|---|---|---|---|---|---|
| | EX | PW | PR | CW | CR | NL |
| EX | NL | CR | PR | CW | PW | x |
| PW | NL | CR | PR | CW | x | x |
| PR | NL | CR | x | CW | x | x |
| CW | NL | CR | CR | x | x | x |
| CR | NL | x | x | x | x | x |
| NL | x | x | x | x | x | x |

*FIG. 7C*

LOGICAL LOCK SUFFICIENCY TABLE 704

| lock held | requested mode | | | | | | | | | | |
| --- | --- | --- | --- | --- | --- | --- | --- | --- | --- | --- | --- |
| | EX_TAB | SH_TAB | EX_INT | SH_INT | EX_PAGE | SH_PAGE | UP_PAGE | EX_ROW | SH_ROW | UP_ROW | SH_NKL |
| EX_TAB | yes | yes | yes | yes | yes | yes | yes | yes | yes | yes | yes |
| SH_TAB | no | yes | no | yes | no | yes | no | no | yes | no | yes |
| EX_INT | no | no | yes | yes | x | x | x | x | x | x | x |
| SH_INT | no | no | no | yes | x | x | x | x | x | x | x |
| EX_PAGE | x | x | x | x | yes | yes | yes | x | x | x | no |
| SH_PAGE | x | x | x | x | no | yes | no | x | x | x | no |
| UP_PAGE | x | x | x | x | no | yes | yes | x | x | x | no |
| EX_ROW | x | x | x | x | x | x | x | yes | yes | yes | no |
| SH_ROW | x | x | x | x | x | x | x | no | yes | no | no |
| UP_ROW | x | x | x | x | x | x | x | no | yes | yes | no |
| SH_NKL | x | x | x | x | no | no | no | no | no | no | no |

FIG. 7D

LOGICAL LOCK CONFLICT TABLE 705

| lock held | requested mode | | | | | | | | | | |
| --- | --- | --- | --- | --- | --- | --- | --- | --- | --- | --- | --- |
| | EX_TAB | SH_TAB | EX_INT | SH_INT | EX_PAGE | SH_PAGE | UP_PAGE | EX_ROW | SH_ROW | UP_ROW | SH_NKL |
| EX_TAB | yes | yes | yes | yes | x | x | x | x | x | x | x |
| SH_TAB | yes | no | yes | no | x | x | x | x | x | x | x |
| EX_INT | yes | yes | no | no | x | x | x | x | x | x | x |
| SH_INT | yes | no | no | no | x | x | x | x | x | x | x |
| EX_PAGE | x | x | x | x | yes | yes | yes | x | x | x | no |
| SH_PAGE | x | x | x | x | yes | no | no | x | x | x | no |
| UP_PAGE | x | x | x | x | yes | no | yes | x | x | x | no |
| EX_ROW | x | x | x | x | x | x | x | yes | yes | yes | no |
| SH_ROW | x | x | x | x | x | x | x | yes | no | no | no |
| UP_ROW | x | x | x | x | x | x | x | yes | no | yes | no |
| SH_NKL | x | x | x | x | no | no | no | no | no | no | no |

FIG. 7E

LOGICAL LOCK DOWNGRADE TABLE 706

REQUESTED MODE

| LOCK HELD | EX_TAB | SH_TAB | EX_INT | SH_INT | EX_PAGE | SH_PAGE | UP_PAGE | EX_ROW | SH_ROW | UP_ROW | SH_NKL |
|---|---|---|---|---|---|---|---|---|---|---|---|
| EX_TAB | NL | SH_TAB | NL | NL | x | x | x | x | x | x | x |
| SH_TAB | NL | x | NL | x | x | x | x | x | x | x | x |
| EX_INT | NL | x | NL | x | x | x | x | x | x | x | x |
| SH_INT | NL | x | x | x | x | x | x | x | x | x | x |
| EX_PAGE | x | x | x | x | NL | SH_PAGE | SH_PAGE | x | x | x | x |
| SH_PAGE | x | x | x | x | NL | x | SH_PAGE | x | x | x | x |
| UP_PAGE | x | x | x | x | NL | x | SH_PAGE | x | x | x | x |
| EX_ROW | x | x | x | x | x | x | x | NL | SH_ROW | SH_ROW | x |
| SH_ROW | x | x | x | x | x | x | x | NL | x | x | x |
| UP_ROW | x | x | x | x | x | x | x | NL | SH_ROW | x | x |
| SH_NKL | x | x | x | x | x | x | x | x | x | x | x |

FIG. 7F

EXAMPLE OF SPACE USAGE OF SEGMENT ON TWO CLUSTERED SERVERS

DISTRIBUTED DATABASE SYSTEM PROVIDING DATA AND SPACE MANAGEMENT METHODOLOGY

CROSS REFERENCE TO RELATED APPLICATIONS

The present application is related to and claims the benefit of priority of the following commonly-owned, presently-pending nonprovisional application(s): application Ser. No. 10/904,263, filed Nov. 1, 2004, entitled "Distributed Database System Providing Data and Space Management Methodology", of which the present application is a Divisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to data processing environments and, more particularly, to a distributed database system providing optimized data transfer, space management, timestamp management, and deadlock detection with optimal messaging 2. Description of the Background Art Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information using database management systems. These systems have long since moved from a centralized mainframe environment to a de-centralized or distributed environment. One or more PC "client" systems, for instance, may be connected via a network to one or more server-based database systems (e.g., SQL database server), to form a client/server database system. Multiple tier database systems including clients, application servers, and database servers connected by networks are also currently in wide use.

As computer systems and networks become increasingly complex and critical to business operations, the need to have high availability of these systems is becoming correspondingly important. Data networks, and especially the Internet, are uniting the world into a single global marketplace that never closes. Employees, sales representatives, and suppliers in far-flung regions need access to mission-critical systems every hour of the day. Furthermore, increasingly sophisticated customers expect twenty-four hour per day sales and service from a Web site. As a result, tremendous competitive pressure is placed on businesses to keep their systems running continuously.

Today, an increasing number of users need their systems to be continuously available, with no downtime. However, while current "high availability" solutions provide high levels of availability, these solutions do not currently provide continuous availability. Instead, current high availability solutions require some amount of downtime for performing maintenance, adding upgrades, and the like. For example, if a high availability system is resource constrained, it would typically need to be brought down to allow for adding additional CPU and/or memory resources. A better approach providing increased levels of availability is desired.

Another recent trend is towards the use of "blade servers", which is an architecture that provides for modular, efficient, and cost-effective systems. This type of architecture typically includes virtualized storage and a network using a high speed interconnect switched fabric. Blade servers may, for instance, be implemented using Intel processors and the Linux operating system. The Linux operating system has matured in terms of reliability, availability, scalability, and manageability, so as to facilitate administration of the blade servers. The price/performance of the Intel/Linux platform makes it a compelling platform for running mission critical applications like database servers and enterprise resource planning (ERP) applications in a distributed fashion. However, this type of environment requires that the DBMS engines have the ability to provide the necessary scalability and transparent availability.

What is needed is a solution that enables a customer to run applications at multiple clustered servers with the clustered servers accessing data in databases shared amongst the servers in the cluster. For example, suppose that a customer runs into a scalability problem with a database system because the customer runs out of CPU power in the machine(s) on which the database system is operated. The clustered server solution should enable the customer to quickly and easily address this scalability problem by simply adding another machine to the configuration. The solution should be easily expandable, so that customers may simply add additional servers in order to increase system capacity and provide improved performance without major data restructuring and the associated system downtime that is common in current systems. This type of solution enables the customer to purchase hardware in smaller increments as needed to keep up with growth. This is advantageous compared with buying larger machines in advance based on anticipated future demand for resources (e.g., disk, memory, CPU, and the like).

The solution should also provide for transparent, continuous availability of the applications run on the cluster with instantaneous fail-over amongst servers in the cluster. When one server is down (e.g., for upgrading the CPU) the applications should be able to operate using the remaining machines in the cluster. Even if one node fails, applications should be able to access the other nodes, so that a continuously available solution is provided.

At the same time, the solution should provide transparency to users so that they need not be concerned with all of the internal details of running multiple database servers. For instance, the solution should provide a single server appearance to applications. Also, an infrastructure should be provided which enables server processes to run against shared disks while resolving cache coherency issues in transparent fashion. Ideally, the solution should facilitate operational administration of the infrastructure necessary to manage the distributed database environment while also minimizing the number of messages sent between nodes so that such messages do not adversely affect system performance. The operational administration that is provided should include detection of deadlocks between nodes competing for shared resources and efficient management space utilization and timestamps in the distributed system. The present invention provides a solution to these and other needs.

SUMMARY OF INVENTION

A distributed database system providing data and space management methodology is described. In one embodiment, for example, in a distributed database system having an allocation page for tracking allocation and deallocation of data pages, the allocation page including a deallocation bit for tracking deallocation of a data page, a method of the present invention is described for determining when to clear the deallocation bit during recovery, the method comprises steps of: during runtime operation of the distributed database system, generating log records recording allocation and deallocation of data pages, setting the deallocation bit during deallocation of a data page by a transaction, and clearing the deallocation bit after the transaction has committed; during recovery of the distributed database system following a failure, identifying a particular log record corresponding to the deallocation bit set in the allocation page during deallocation of a given data page; determining whether the deallocation of the given data page recorded in the particular log record committed prior to the failure; and if the deallocation of the given data page committed prior to the failure, clearing the deallocation bit.

In another embodiment, for example, a system of the present invention for tracking allocation and deallocation of database pages in a distributed database system having a plurality of database servers sharing access to data pages is described that comprises: an allocation page for tracking allocation and deallocation of data pages in the database system, the allocation page including a deallocation bit for tracking deallocation of a data page, an allocation module for setting the deallocation bit during deallocation of a data page by a transaction, and clearing the deallocation bit after the transaction has committed during runtime operation of the distributed database system; a log module for generating log records recording allocation and deallocation of data pages during runtime operation; and a recovery module for identifying, during recovery of the database server following a failure, a particular log record corresponding to the deallocation bit set in the allocation page during deallocation of a given data page, clearing the deallocation bit if the deallocation of the given data page recorded in the particular log record committed prior to the failure and redoing the deallocation and performing any necessary undo action if the deallocation was not committed prior to failure.

In yet another embodiment, for example, in a distributed database system including a plurality of servers sharing access to data, an improved method of the present invention is described for post-commit processing of transactions, the method comprises steps of: maintaining an allocation page timestamp on an allocation page which allocation page timestamp is updated when pages are deallocated; when data pages are deallocated during operation of the distributed database system, setting a deallocation bit on the allocation page; creating log records identifying the deallocated data pages and the allocation page timestamp before and after the deallocation; during database recovery operations following a failure, determining whether to perform post-commit processing for a committed transaction based on examining the log records to determine if the data page deallocation committed and the deallocation bit was set as a result of the data page deallocation reflected in the log records; and performing any post-commit processing determined to be necessary to return the database to a consistent state.

BRIEF DESCRIPTION OF DRAWINGS

FIGS. 7A-F illustrate six tables which are used for lock management in the currently preferred embodiment of the present invention.

DETAILED DESCRIPTION

Glossary

Figure 1:
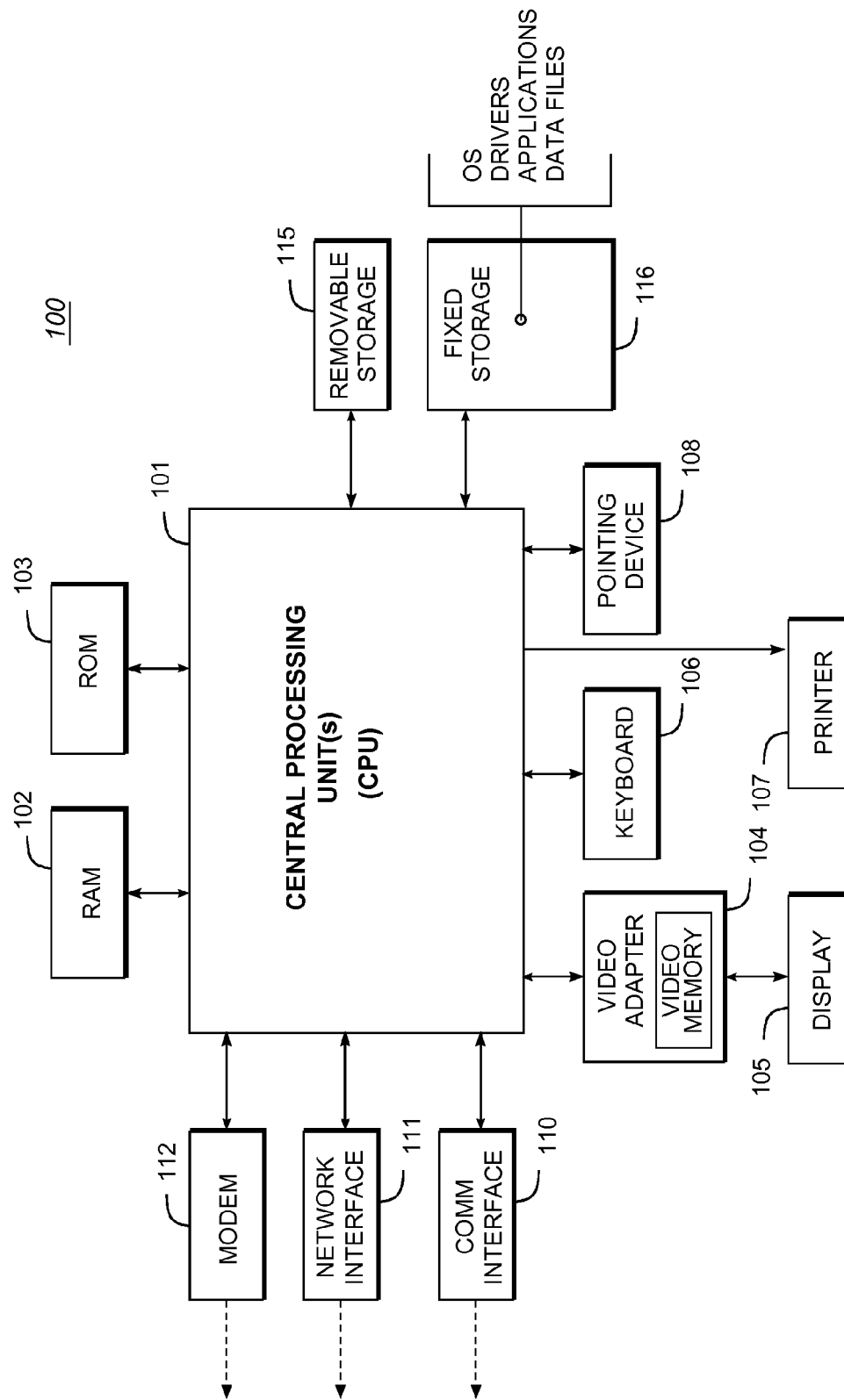
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Allocation Page: The allocation page (AP) is the first page in an allocation unit (chunk of 256 contiguous pages) that keeps track of the data pages that are allocated, being deallocated, and free. A pair of bits, the alloc bit and the dealloc bit in the allocation page represent the state of the data page.

AST: AST refers to the ASynchronous Trap used by the cluster lock manager (CLM) to deliver an asynchronous completion notification to the lock requester for non-blocking requests. The ASTs can be delivered through client's callback handler in CLM daemon's context or in the client context through polling.

BAST: BAST refers to the Blocking ASynchronous Trap used by the cluster lock manager (CLM) to deliver an asynchronous blocking notification to the lock owner when another clustered server in the cluster is requesting for the lock in conflicting lock mode. The BASTs can be delivered through client's callback handler in CLM daemon's context or in the client context through polling.

Buffer: Buffer refers to metadata information to maintain a page on disk in memory.

CES: The cluster event service (CES) is a cluster infrastructure component of the present invention that provides global and local event subscription and publishing services.

CLM: The cluster lock manager (CLM) is a server module of the present invention that provides the distributed locking service to allow the sharing of logical locks, global objects, and cached database data and metadata among the clustered servers.

CLR: CLR refers to compensation log record, which is an "undo" record logged during transaction rollback. CLRs are usually redo-only log records which are not undone.

Cluster: Cluster refers to a collection of more than one networked (and usually homogeneous) nodes, which function as a single system. Each node usually contains its own CPU and memory. All the nodes in the cluster communicate with each other, typically through private interconnects.

Cluster Coordinator: The coordinating clustered server that is responsible for view updates at cluster membership changes. The clustered server that bootstraps the cluster is the default cluster coordinator. A new coordinator may be selected in the event of a coordinator failure.

Cluster Configuration File: A cluster configuration file contains a clustered server configuration to run in a shared disk cluster environment. The cluster configuration file typically includes information about path name to quorum disk and cluster and member server definitions including the primary and secondary interprocess communication (IPC) configuration.

Clustered Server: A clustered server refers to a database server which runs on a shared-disk cluster and jointly manages a single installation of the databases on the shared disks. Currently, a clustered server is identified by a clustered server number, which is a number uniquely identifying a named clustered server in a shared disk cluster. The clustered server number is assigned to a named clustered server as part of the cluster configuration. Currently, the number can range from one to maximum configurable clustered servers and, similar to the clustered server name, cannot be changed while the cluster is running.

Cluster View: A cluster view is a runtime data structure about active clustered servers in the cluster and server states.

CMS: The cluster membership service (CMS) is the module of the cluster infrastructure of the present invention that supports the cluster configuration and membership management for a shared disk cluster environment.

Crash Recovery: Crash recovery refers to the recovery that follows after a database cluster is shutdown normally or abnormally.

Disk Piece: A disk piece is a unit of contiguous database storage, which is currently described by a single entry in master.dbo.sysusages and by a single entry in the databases disk map.

Dedicated Log Segment: A dedicated log segment refers to the disk pieces that belong to the log segment and are not for any other segment (i.e., space on the disk pieces that is only used for the log).

INDOUBT: An INDOUBT state is one of the possible states for a lock resource. A lock can be marked as INDOUBT during a cluster-wide lock re-master and rebuild if it was held in exclusive mode by a failed clustered server, or its resource master failed and its lock state cannot be reconstructed from the surviving clustered servers.

Interfaces File: Interfaces file refers to a standard database interfaces file or any other directory control layer (e.g., LDAP or the like) from which connection related information for a dataserver (such as the database server name, host name/IP address, protocol, port number, security options, and so forth) is obtained.

Local Lock Manager (LLM): A Local Lock Manager supports logical lock, physical lock and object lock API for local clients, manages local lock queues with task ownership, and interacts with Cluster Lock Manager to acquire, downgrade and release the retention locks with node ownership.

Logical Cluster: Logical cluster refers to a logical cluster feature which facilitates logical partitioning of the database shared disk cluster into smaller functional groups of clustered servers, with each functional group serving a distinct set of client application and databases.

Mixed-log-data database: In a mixed-log-data database, the disk pieces that belong to a log segment are also used for other segments. In other words, a mixed-log-data database has no fixed space dedicated for the log and one allocation unit can have extents allocated to both data and log.

Nested Top Action (NTA): A nested top action is a part of a transaction that is committed or rolled back independent of the transaction. Nested top actions are typically used by the index manager for page splits and shrinks.

Node Recovery: The terms node recovery and failover recovery refer to the recovery that follows after a node (clustered server) is shutdown normally or abnormally due to a hardware or software fault. Typically, another node recovers the server running on the failed node.

OAM: OAM refers to Object Allocation Map, which is a map maintaining information about the allocation of an object.

GAM: GAM refers to Global Allocation Map, which is a map maintaining information about allocation of a database.

OCM: The Object Coherency Manager (OCM) is a server infrastructure module of the present invention that deals with the coherency issues related to sharing and transferring metadata and global variables/data structures among different clustered servers in a shared disk cluster environment Object Lock: An object lock is a lock maintained by the cluster lock manager to establish ownership of a metadata object such as a dbtable or a global data structure/variable.

Page: A page refers to a physical page on disk. All data in a typical database system is stored in pages on a secondary storage device, usually a hard disk. Typically, these pages may range in size from 2 Kb to 16 Kb, with the most common page sizes being 2 Kb and 4 Kb.

Physical Cluster: Physical cluster refers to the database shared disk cluster as defined in the cluster configuration file, with specific quorum disk, member servers, and interconnect information. All servers in the physical cluster have direct access to a single installation of the databases and are monitored and managed by the cluster membership service.

Physical Lock: A physical lock is a lock maintained by the cluster lock manager to establish ownership of a page in the shared disk cluster environment. Physical locks are server-specific and are held by a clustered server as long as there are no conflicting requests in the cluster.

PRTS: PRTS refers to a page's timestamp the first time it is dirtied and before it is flushed. The PRTS value is maintained so that recovery can know the appropriate re-start point for that page.

PTS: PTS refers to a page's current timestamp. The PTS value is maintained to ensure validity of the page.

Recovery checkpoint: Recovery checkpoint refers to the last successful checkpoint record written to the transaction log of the database before a database server was shutdown normally or abnormally.

Recovery vbit map: A variable bitmap used by recovery where each bit in the map corresponds to one allocation page is referred to as the recovery vbit map. This map is used during recovery to keep track of the allocation pages requiring a cleanup of its deallocation bits in its extents.

Redo Pass: The redo pass is a recovery pass where all log records encountered in the scan starting from the oldest active transaction pointed to by the recovery-checkpoint record until the end of the log are redone, regardless of the ending status of the transaction that the log record is part of.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

Resource Master or Lock Master (RM): The Cluster Lock Manager that is responsible for managing the global lock queue with node ownership, including resolving conflicts, reclaiming locks from the owning servers (i.e., the Lock Owner), and granting locks to the requesting servers (or the Lock Requester).

Retention Lock: A retention lock refers to a global lock that has clustered server ownership and can be acquired and retained by the clustered server. Retention locks are managed by cluster lock manager.

SEMAWAIT queue: A Lock Manager uses a SEMAWAIT queue to maintain all local locking requests for an object. SEMAWAIT defines a position in the queue, the LOCKREC corresponds for a particular task's lock request. Since there can be shared locks, there might be more than one request at a given queue position—in other words there might be more than one LOCKREC on a SEMAWAIT.

Shared Disk Cluster: In this document, the term shared disk cluster shall (unless otherwise indicated) refer broadly to a cluster configuration where all nodes have direct access to a shared disk subsystem. The distributed database system of the present invention, in its currently preferred embodiment, runs on a hardware shared disk cluster, with all of the clustered servers having direct access to the set of database devices and jointly managing a single installation of the databases. The clustered servers on each node communicate with each other through redundant private interconnects and synchronize their database accesses using a shared buffer cache and distributed lock management. The system provides very high availability, since the database is available as long as there is at least one clustered server is alive. Shared database device fault tolerance can also be obtained by implementing RAID on the shared disk subsystem.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Undo Pass: The undo pass is a recovery pass in which log records from transactions that did not complete are undone. Compensation log records (CLRs) are logged for each log record that is undone Introduction Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic system hardware and software (e.g., for desktop and server computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
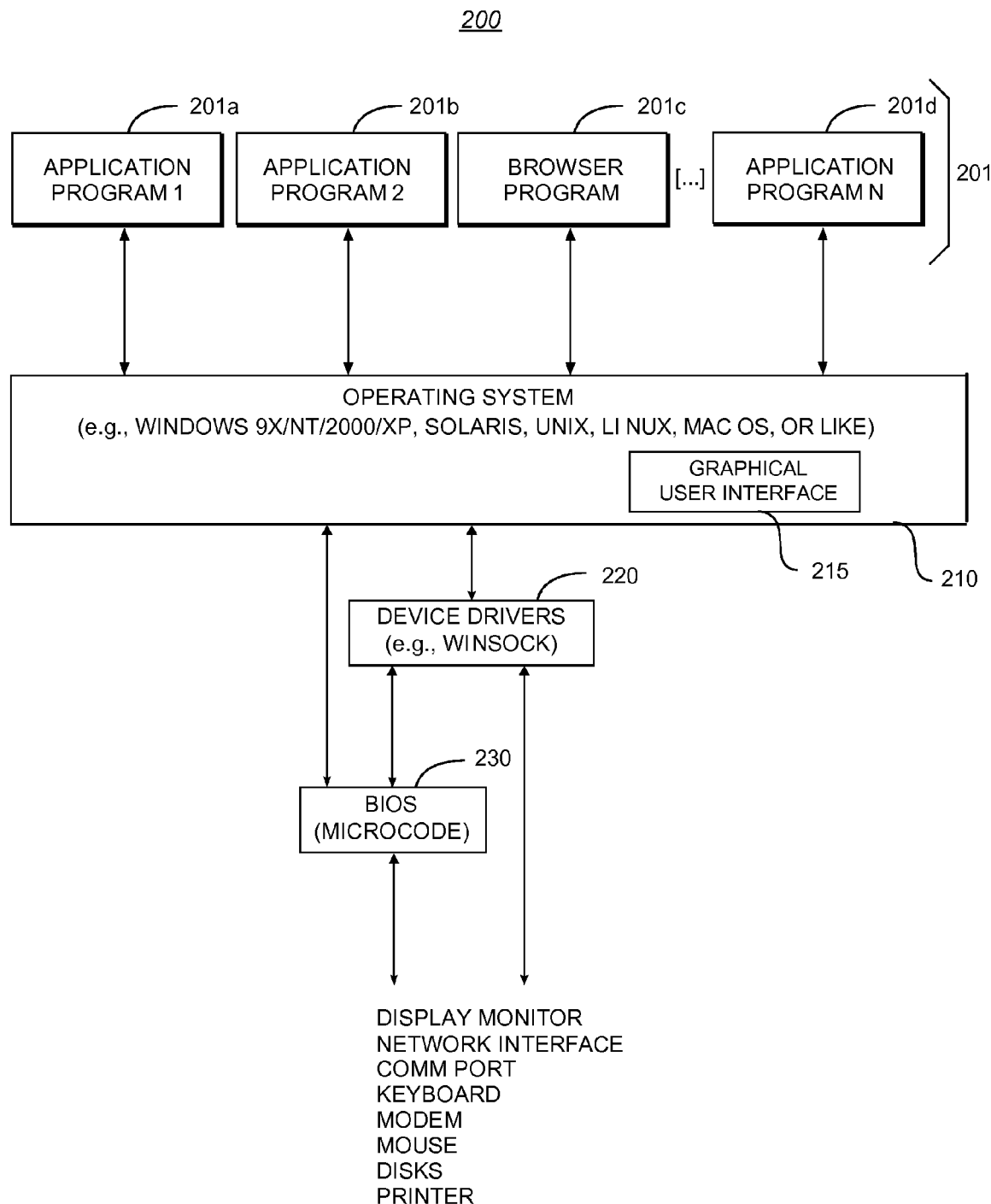
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client/Server Database System

Figure 3:
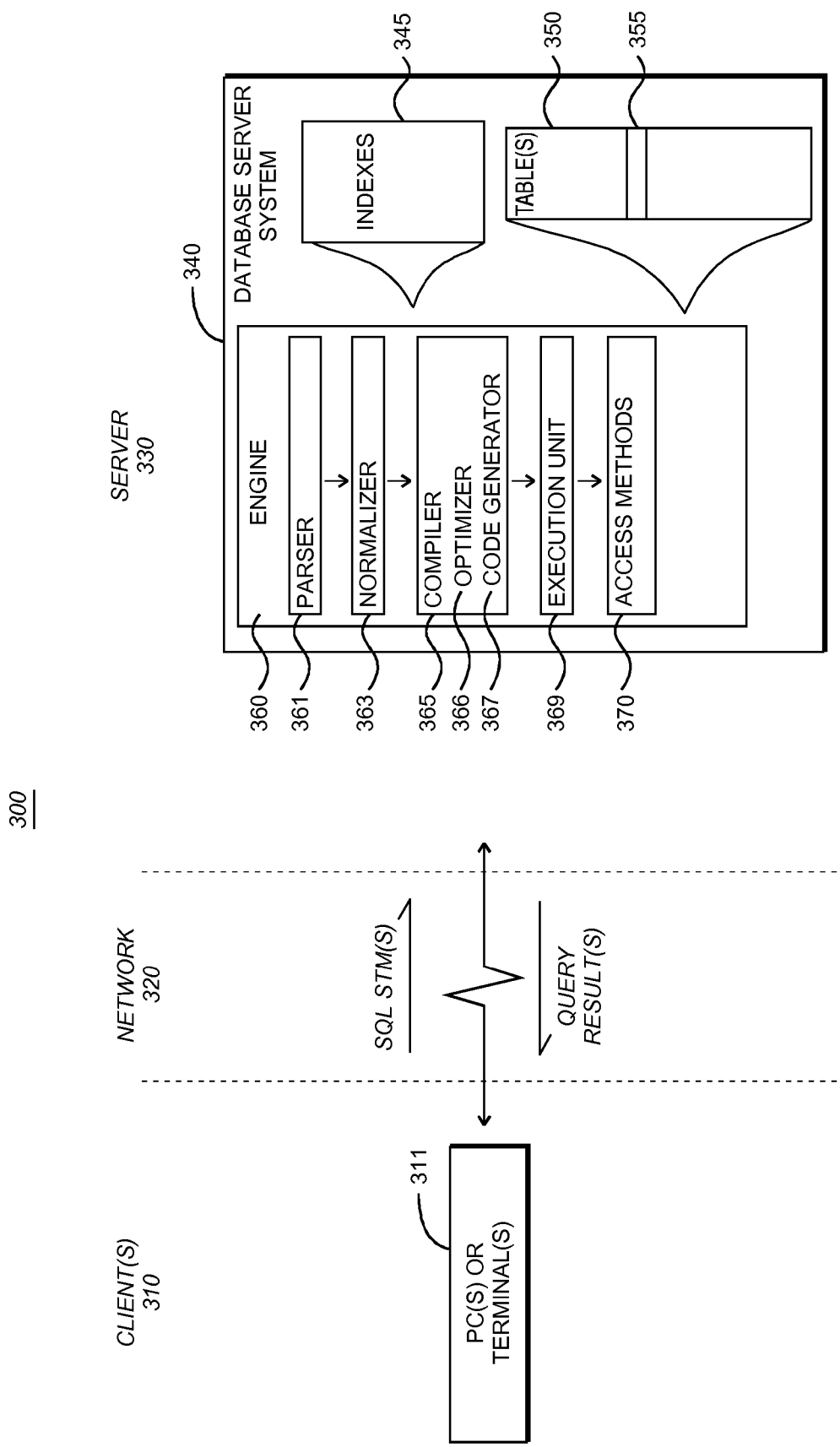
FIG. 3 illustrates the general structure of a client/server database system.

FIG. 3 illustrates the general structure of a client/server database system 300. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft*) Windows client operating system (e.g., Microsoft® Windows 95/98, Windows 2000, or Windows XP).

The database server system 340, which comprises Sybase® Adaptive Server Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase® branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 2 Kb to 16 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists at least one "server" (e.g., database server) that communicates with one or more "clients" (e.g., personal computers such as the above-described system 100). The present invention, however, is not limited to any particular environment or device configuration. Instead, the present invention may be implemented in any type of system architecture or processing environment capable of supporting the methodologies of the present invention presented in detail below.

Overview of Shared Disk Cluster Database System

Figure 4:
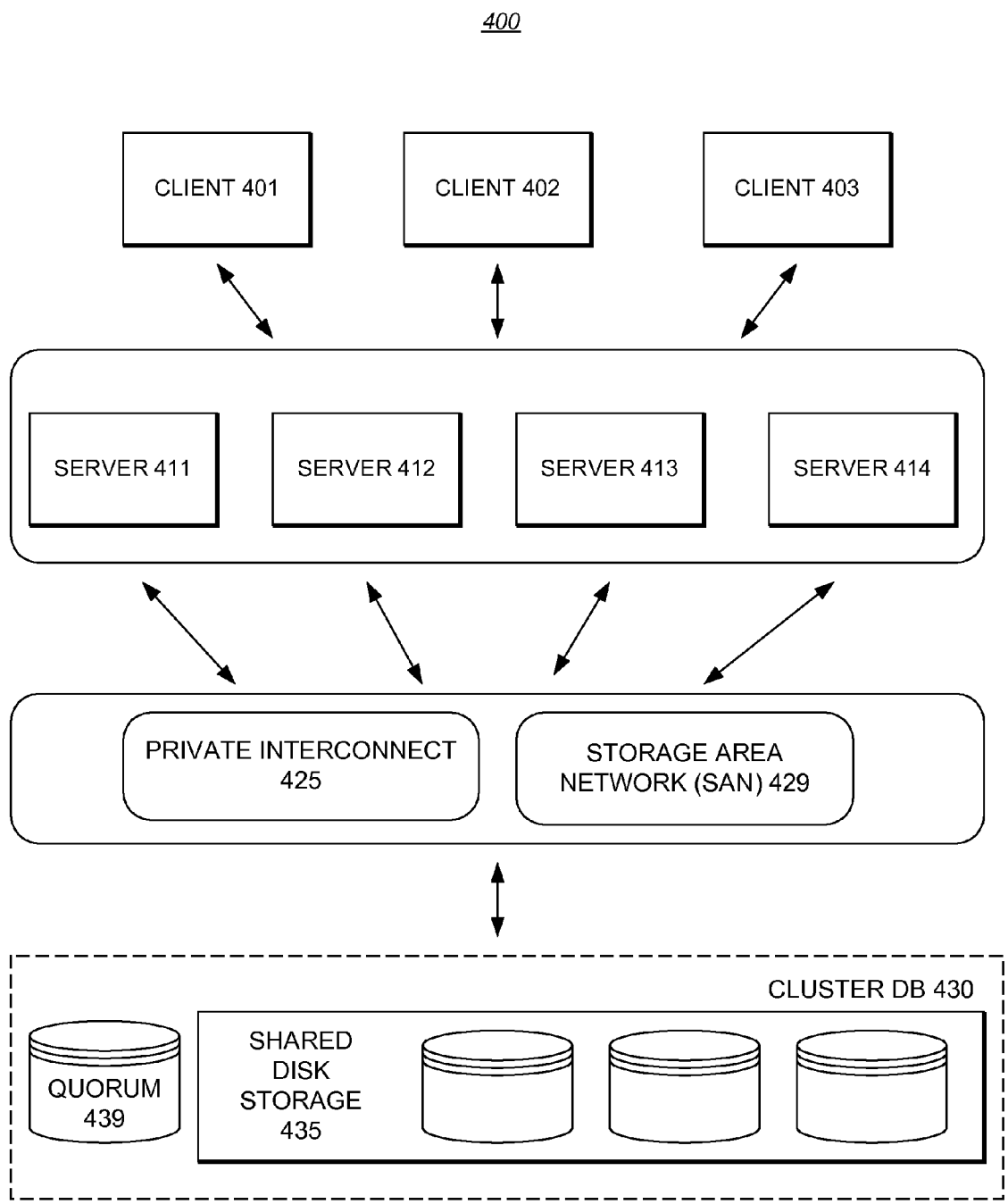
FIG. 4 is a high-level block diagram of an environment illustrating an example of a four node shared disk cluster accessed by a plurality of clients.

The present invention provides a shared disk cluster solution in which the clustered servers share access to databases on a disk subsystem. FIG. 4 is a high-level block diagram of an environment 400 illustrating an example of a four node (servers 411, 412, 413, 414) shared disk cluster accessed by a plurality of clients (clients 401, 402, 403). The term "cluster" refers to a collection of more than one networked (and usually homogeneous) nodes, which function as a single system. Each node generally contains its own CPU and memory resources. The term "clustered server" refers to a database server (currently implemented using Sybase® Adaptive Server® Enterprise ("ASE") available from assignee Sybase of Dublin, Calif.) which runs on a shared-disk cluster (cluster DB 430) and jointly manages a single installation of the databases on the shared disk storage 435. As shown, the environment 400 also includes a quorum disk 439. The quorum disk is a shared disk device used for cluster membership arbitration. The quorum disk also maintains a history of run time cluster view changes.

The shared disk cluster solution can be implemented using low cost "blade servers" such as Intel/Linux machines. In the presently preferred embodiment, nodes in the cluster communicate with each other through private interconnects (e.g., private interconnect 425). As shown at FIG. 4, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 429) or with a file system support (e.g., through use of a clustered file system such as those from Veritas or Polyserv).

The shared disk cluster solution of the present invention provides several advantages compared to prior art systems. Among these advantages are that the clustered server system is expandable. Customers may easily add additional servers in order to increase system capacity and provide improved performance without major data restructuring and the associated system downtime. This enables the customer to purchase hardware in smaller increments as needed to keep up with growth.

Other advantages of a shared disk cluster architecture include lower total cost of ownership (TCO), continuous availability, high performance, and single system presentation. The present invention provides for transparent, continuous availability with instantaneous fail-over amongst servers in the cluster. Even if one node fails, applications are able to access the other nodes. The shared disk cluster solution also provides transparency to users so that the users do not need to worry about all of the internal details of running multiple servers against disks maintaining shared data. It provides a single server appearance to applications. The system of the present invention also includes an infrastructure enabling server processes to run against shared disks while resolving cache coherency issues in transparent fashion.

In its currently preferred embodiment, the present invention is implemented using an engine-based architecture in which each of the database engines is implemented using a single operating system (OS) process. Other database systems generally do not have this type of engine-based architecture. In other database systems, every thread typically becomes a process which means that the database system has to depend on the operating system to manage the system's resources. The system of the present invention generally performs its own scheduling without having to rely on the operating system. This is an advantage as it provides the database system with greater control over its resources. For example, if a database system leaves scheduling to the operating system, the operating system may perform some operations inefficiently, thereby adversely affecting database system performance.

The engine-based architecture utilized by the present invention provides advantages in more efficiently managing resources, as the database manages its own resources. In implementing the system, it is generally recommended that one OS process should be spawned for each CPU. For instance, suppose a customer had a machine with 8 CPUs. In this case it is recommended that only 8 processes be spawned, with each process bound to one of the CPUs. In operation, this enables the CPU and other resources to be managed by the database system in an intelligent fashion. The above-described engine-based architecture also enables more efficient implementation of some of the features and methods of the present invention as hereinafter described.

The present invention includes several features or aspects for implementation of a distributed database solution in a shared data cluster environment. These include mechanisms for optimized distributed deadlock detection with minimal messaging, efficient implementation of distributed timestamps, data and lock transfer optimizations, and improved space and threshold management in a cluster system. Each of these features or aspects will next be briefly summarized.

In a shared data cluster or other distributed database environment, multiple servers may compete for the same data. For example, a first server/process may request a lock on page 10 and then request page 20. A second server/process may request a lock on page 20 and then ask for page 10. This may create a deadlock situation unless a mechanism is provided to detect and avoid it. In a simple non-distributed system, it is relatively easy to detect deadlocks by traversing the system's lock records and looking for a loop indicating a deadlock condition. The deadlock condition can then be resolved by "killing" one of the processes (e.g., the second process which is selected as the "victim") and granting a lock on these pages to the other (first) process. Once the first process is done, the second process can resubmit the transaction and obtain access to the page(s).

Efficient deadlock detection is, however, more difficult to perform in a distributed system. In a distributed system, the locking of pages is managed in a distributed manner. In this environment, information must be obtained (exchanged) to detect occurrence of a deadlock. It is desirable to exchange information in an efficient manner so as not to slow the performance of the distributed system. The present invention includes mechanisms for optimized distributed deadlock detection which provide for efficiently sending messages between nodes in a distributed environment.

Another problem in implementing a shared disk cluster relates to the updating of pages by different nodes. In a database system, a database server accesses underlying data which is typically maintained in fixed-size units referred to as "pages". In a distributed system, access to data pages is shared by multiple nodes and changes to the data needs to be coordinated to ensure data consistency. For example, one node may update a certain page and subsequently another node may update the same page. To provide for proper database recovery (e.g., in the event of a system crash), the database system records (or logs) information about these operations in log records. When logging is performed, the timestamp on the page being updated is typically tracked so that one can determine, in the event of a system crash, precisely the point at which one needs to start recovery operations.

In a distributed database system, a mechanism is needed to give a consistent timestamp on pages. In particular, if a page moves from one node to another node a mechanism is needed to give a consistent timestamp on the page. One existing approach is to utilize a "global" timestamp. In other words, every time a node modifies a page, the node needs to go to a common place to get a "global" timestamp. A drawback with this approach is that obtaining a global timestamp can become a very expensive operation (in terms of system performance) in a distributed database system that has a number of nodes.

Another existing approach is to provide a timestamp local to each page. Every time a change is made to a page, one or more local timestamps for the page are updated or incremented. This approach works satisfactorily as long as no truncate table or drop table operations are performed. However, if a table is dropped or truncated, this operation may affect (e.g., delete) multiple pages. As a result, one may have no context for determining what is the timestamp that one should start with the next time the page is read from disk.

The present invention provides a solution to this problem of distributed timestamps, enabling timestamps to be applied in a consistent manner while avoiding the use of a "global" system-wide timestamp. The present invention can be used in a distributed environment in which one or more of the nodes may be performing truncate table and drop table operations.

In a distributed system, the components of the system must also communicate with one another so that action is taken in a consistent, coordinated manner. Components of a distributed system generally use messaging to communicate. For example, one node may use messaging to obtain information from another node. However, if a large number of messages are sent the efficiency of the system can be adversely impacted. Accordingly, efficient messaging is important to providing good performance in a distributed system. The present invention provides methodology for optimizing messaging between nodes of the cluster. This methodology includes optimizing the number of messages sent amongst nodes as well as "piggybacking" messages so that multiple messages can be delivered to a node in one packet.

The present invention provides methodology to avoid copying in the user space while transferring a page from buffer cache in one database server to another buffer cache in another database server. If a socket transport mechanism is utilized, the page transfer mechanism simulates remote direct memory access using sockets. After receiving the lock request the resource master passes the address of the page to the owner. The owner sends the address as a short message and the page as an IO vector. At the node waiting for the page to be transferred, the CIPC (cluster interprocess communication) thread reads the small message and then uses the address passed in to receive the page. This methodology avoids an extra copy in the user space in addition to avoiding an extra message. In addition this has a minimum number of context switches.

Another concern in a database system is managing space utilization. In a cluster or other distributed system, a particular concern is with the allocation of pages across multiple nodes (e.g., all nodes of the cluster). This problem may be illustrated by example. Assume, for instance, that a database may have 100 data pages, with 60 of those pages allocated. In other words the database has only 40 pages free. The present invention includes threshold management methodology for tracking the number of free pages and comparing the number of free pages to certain "thresholds" for determining when certain actions should be taken. For example, when the number of free pages goes below a threshold of 30 pages, the system may take action by alerting the system's database administrator (DBA) and informing him or her that the system is running low on space. The DBA may then take action by freeing up some space or adding more resources to the system.

As another example, the system of the present invention currently includes a "last chance" threshold. This "last chance" threshold provides for putting all the database processes to sleep when the "last chance" threshold (limit) is reached. For instance, the last chance threshold may be configured to be 10 free pages. Assume that the DBA is notified when the first limit of 30 pages is reached but no action is taken to remedy the problem. If the number of free pages then goes below the configured "last chance" threshold (e.g., 10 pages in this example), the system puts the database processes to sleep (i.e., in a stall state) until the space limitation problem is addressed by the DBA.

The space and threshold management features of the present invention also provide that when one node runs low on space, a determination is made as to whether space may be available from another node. The present invention provides an optimized solution for maintaining user defined thresholds on space usages of these database devices. The solution minimizes the number of clustered database server instances involved in balancing the space usage. This is achieved by having a fixed partner for each server instance, and when the space usage on any server instance goes beyond the pre-assigned safe range, it will seek help from its partner. This is done in a manner that does not affect the ongoing transactions at any of the nodes. The information exchange (messaging) between nodes in allocating space is also optimized in an intelligent manner. Also, the present invention provides for determining available space in an optimal fashion. For example, when a node starts (e.g., after fail-over) the system of the present invention does not simply put the entire database on hold while calculating the available space. The components of the currently preferred embodiment of the present invention and the operations of these components is described below in greater detail.

System Components

Figure 5:
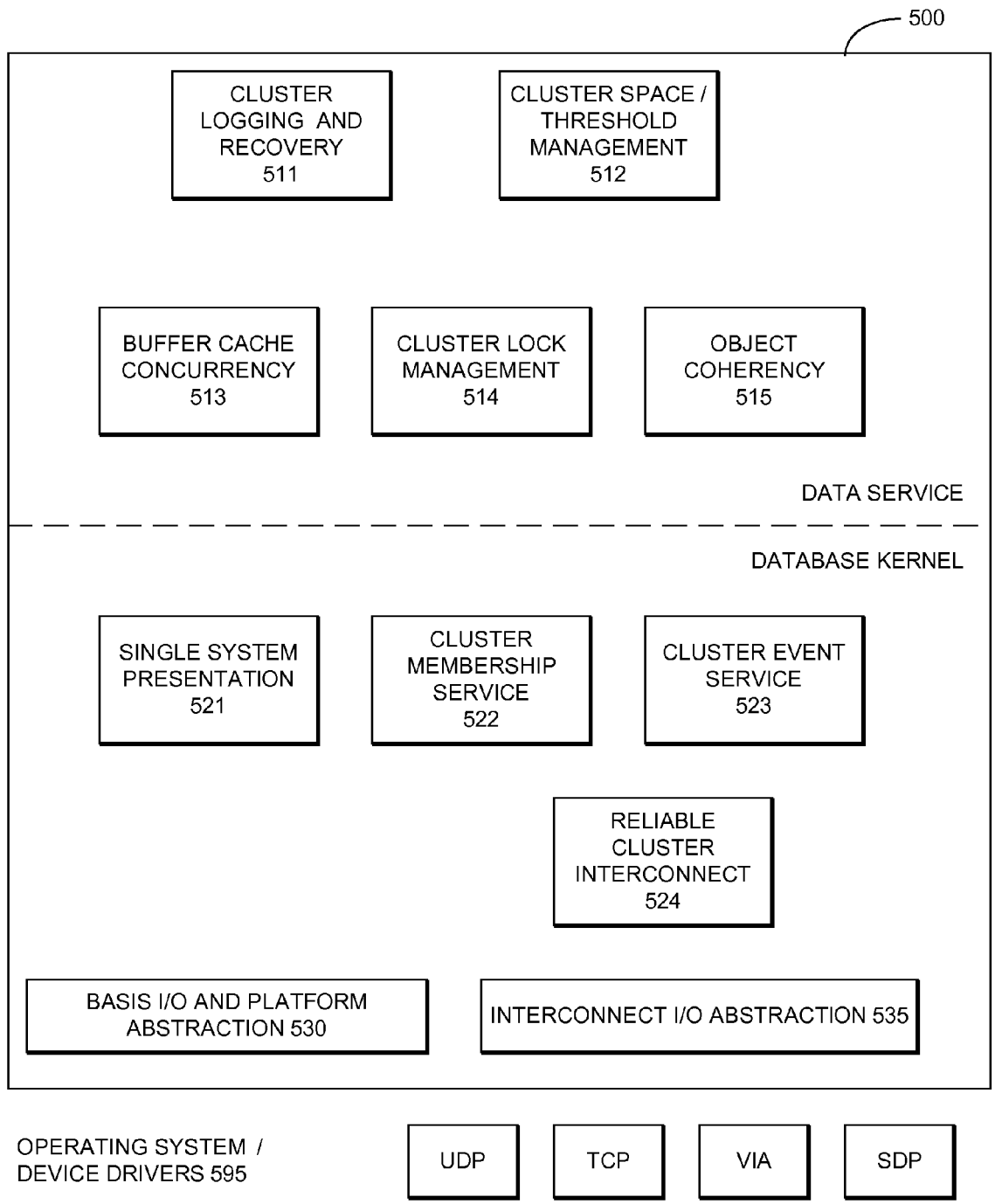
FIG. 5 is a block diagram illustrating components of an instance of a clustered database server implementing the shared disk cluster system and methodology of the present invention.

FIG. 5 is a block diagram illustrating components of an instance of a clustered database server 500 implementing the shared disk cluster system and methodology of the present invention. As shown, components of an instance of a clustered database server 500 includes data service level components and database server kernel level components. For simplicity, other conventional modules of the database system which have not been modified for implementation of the shared disk cluster system of the present invention are not shown at FIG. 5. Also, the diagram shown at FIG. 5 does not attempt to illustrate the inter-dependencies among the cluster-aware components in a data server and in the kernel.

The components provided at the database kernel level include a single system presentation 521, a cluster membership service module 522, a cluster event service 523, and a reliable cluster interconnect module 524. These components are native cluster infrastructure components that enable the clustered database servers to run in a shared disk cluster environment. The cluster membership service module 522 maintains cluster membership and detects member failure. A responsibility of cluster membership service 522 is to detect cluster membership changes and maintain a reliable and consistent run time cluster view to all clustered servers. The cluster interconnect module 524 provides messaging services and an interconnect abstraction layer to allow clustered servers to communicate with each other via redundant interconnects. The cluster event service 523 supports a generic event publishing and subscription mechanism for cluster-wide events. The single system presentation module 521 supports single database presentation to clients and redirects client connections based on workload of the clustered servers and/or other criteria, such as application partitioning.

The database kernel level components also include a basis I/O and platform abstraction module 530 and an interconnect I/O abstraction module 535. An I/O abstraction layer is provided on top of the cluster platform specific private interconnects. It also supports redundant cluster interconnects (if available) with automatic fail-overs in the event of a link failure. The redundant cluster interconnects can be used to achieve both load balancing and high availability. As also shown at FIG. 5, several protocols are also supported under the I/O abstraction layer, including UDP (datagram socket), TCP (stream socket), VIA (Virtual Interface Architecture) and SDP (Socket Direct Protocol for Infiniband).

At the database data service level, components include a cluster logging and recovery module 511, a cluster space/threshold management module 512, a buffer cache coherency module ("BCM") 513, a cluster lock management module 514, and an object coherency module ("OCM") 515. The cluster lock management module 514 (or cluster lock manager which is sometimes referred to herein as the "CLM") supports distributed locking for coherency control across the shared disk cluster. The buffer cache coherency module 513 deals with the coherency issues related to shared buffer cache and cache to cache page transfer for allocation pages, index pages, data pages and OAM/GAM pages. The object coherency module 515 deals with the coherency issues related to sharing and transferring metadata and global variables in the shared disk cluster environment. The cluster logging and recovery module 511 deals with the issue of single logging from all clustered servers and fail-over database recovery. The cluster space and threshold management module 512 handles space utilization and implements threshold management methodology of the present invention. The operations of these modules in implementing methodology of the present invention are described below in greater detail.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Introduction to Distributed Deadlock Detection and Resolution Methodology

The present invention includes deadlock search and detection methodology for detecting and resolving deadlocks in a distributed database system. Before describing the methodology of the present invention for deadlock detection in a distributed system environment, the general process used for detection of deadlocks in a standalone database system will be described.

A typical search method for detecting deadlocks in a standalone database system provides for searching for deadlocks by detecting cycles in a transaction wait-for graph (TWFG) involving the task (or transaction) that initiated the search. The method treats a family of threads as a single node in the lock wait-for graph, as the database server system uses a parallel model of query execution.

The method generally works as follows. When a task is about to be blocked waiting for a lock regulating access to data, it obtains the next sleep sequence number and is appended to the end of a "sleeptask" queue. A process initiates a deadlock search either at the deadlock timer expiration or at the time of blocking. When the search starts, the sleep sequence number of the initiator is updated to the latest sequence number. The sleep sequence number is used to detect and discard edges that were formed after the search started. Any entry added to the queue after the search started will have a sequence number greater than the sequence number when the search started.

The initiator creates a list of sleeping owners from the owners of the lock records at the head of a "semawait" queue. The search is then recursively performed for each of the sleeping owners, to create the next level of sleeping owners list from its blocking lock. The search may, for example, recurse up to 20 levels.

A task is recorded as a sleeping owner if the following conditions are met:
1) It has a granted lock record on this semaphore;
2) It went to sleep on another lock before the deadlock search started; and
3) This is the first time it is being encountered by the search.

When a deadlock cycle is found, a "victim" (i.e., a task to be suspended or killed) is selected from the list of tasks involved in the cycle. The victim is typically selected based on criteria such as the following:
1) If the maximum number of possible deadlocks for this initiator has been exceeded, choose the initiator as the victim in order to break all the cycles together;
2) The victim cannot be a backout task; and
3) The victim should have consumed the least amount of CPU time within its transaction or statement. Parallel query option considers the cumulative family CPU time for a deadlocked thread belonging to a family of threads.

Although the above-described approach can detect deadlocks starting at all levels, it usually detects only up to a maximum of two cycles of deadlock involving the initiator in order to contain the cost of the search. This type of deadlock detection method works well in a standalone database server as the TWFG can be easily constructed from the lock queues in the global shared memory segment, and the monotonically incremented local sleep sequence number can be used to limit the depth and width of the TWFG to only include edges which existed before the start of the search.

In the shared disk cluster distributed database system of the present invention, however, all database servers share the responsibility for managing all lock resources in the cluster and tasks/transactions on any server can issue requests for logical locks that are mastered by any server in the cluster. Accordingly, the responsibility for managing logical locks is divided, with the local lock managers managing local lock queues with locally owned tasks/transactions and the resource master CLMs (cluster lock managers) managing the cluster lock queues with server ownership.

As the lock queues in a cluster are distributed in nature, the construction of the TWFG for an initiator also needs to be distributed across the servers. When a local task/transaction is blocked waiting for a remote lock, the construction of the TWFG must be extended beyond the local server to access remote lock queue information. Remote messaging is needed to explore the number of edges and nodes in the next level and continue the construction of the TWFG at the remote servers with granted locks. Specifically, a local lock manager (LLM) with a blocking task/transaction must first consult the resource master CLM for the granted servers information in the cluster lock queue before it can consult the granted servers for the sleeping owners information in their local lock queues.

Correct deadlock detection requires that all deadlocks should eventually be detected, and every detected deadlock should really exist. The design of a deadlock detection feature in a cluster environment must also consider its impact on database system performance, in terms of the number and size of remote messages, and its resource usage, in terms of the space required to maintain and construct the global TWFG. A centralized deadlock detection approach typically involves the construction of the global TWFG at one server, which may satisfy the correctness requirement but is too costly on system performance in most environments as it requires a series of request/reply messages to discover the remote edges and nodes in the TWFGs, and also considerable space to merge the TWFGs from the remote servers. The present invention provides a distributed methodology that satisfies the correctness requirement but only follows those paths potentially leading to cycles yields better performance and reduced resource usage. The optimized distributed deadlock detection methodology of the present invention is described below.

Global TWFG Construction

Figure 6:
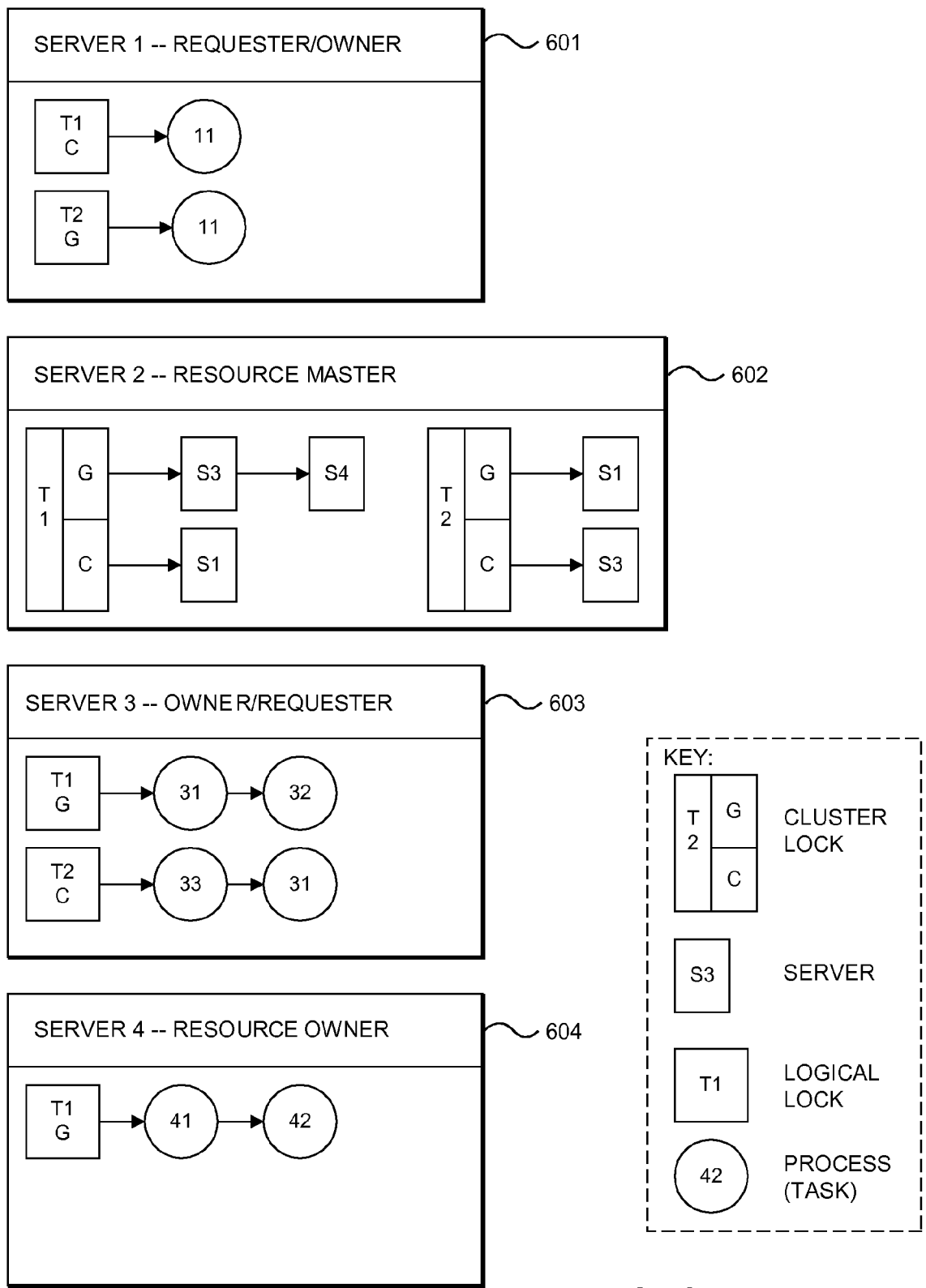
FIG. 6 is a block diagram illustrating the distribution of the lock queues and lock management information in a shared disk cluster environment.

FIG. 6 is a block diagram illustrating the distribution of the lock queues and lock management information in a shared disk cluster environment. As shown, the environment includes four severs: (requester/owner) server 601, (resource master) server 602, (owner/requester) server 603, and (resource owner) server 604. For ease of reference in the following discussion, these four servers are referred to as server S1 (or S1), server 2 (or S2), server 3 (or S3), and server 4 (or S4), respectively. Also note that in the following discussion notation such as G(31) refers to task 1 on server S3. In FIG. 6, the cluster-wide table locks T1 and T2 are mastered by server S2 (resource master), with lock T1 owned by servers S2 and S4 and requested by (requester/owner) server S1, and lock T2 owned by server S1 but requested by server S3. Within server S1, the local lock manager (LLM) maintains a local lock queue for lock T1 with a pending locking request from task 11, and a local lock queue for lock T2 with a granted lock to task 11. The LLM for server S3 maintains a local lock queue for lock T1 with granted locks to tasks 31 and 32, and a local lock queue for lock T2 with pending locking requests from tasks 33 and 31. Within server S4, the local lock manager maintains a local lock queue for lock T1, with granted locks to tasks 41 and 42.

As shown in FIG. 6, there is a cycle from task 11 of server S1 to task 31 of server S3 and back to task 11 of server S1. In this cycle, task 11 of server S1 owns table lock T2 but is blocked waiting for table lock T1. Task 31 of server S3 owns table lock T1 but is blocked waiting for table lock T1. In order to construct the TWFG to detect such a cycle, all four clustered servers (i.e., servers S1-S4) are traversed.

The following notation is used to describe the task dependency information. Tn denotes Table lock n, G (sn, tm) denotes granted owner information, and C (sn, tm) denotes blocking task. Also, sn denotes task n on server s, and tm denotes task m on server t.

T1: G(31,32,41,42) C(11)
T2: G(11)C(31,33)

When the deadlock detection method is initiated by the sleeping task 11 at server S1, a remote message needs to be sent to the resource master server S2 to locate the servers that currently have the granted lock for T1, (i.e., servers S3 and S4). Two remote messages are then sent to servers S3 and S4 to find all the tasks/transactions that are at the head of the semawait chain of the granted lock T1. Server S3 locates tasks 31 and 32 and finds that task 31 is blocked on the cluster lock T2. Server S4 locates tasks 41 and 42 and finds that they both are not blocking. Server S3 sends a message to the resource master server S2 to locate the server that currently has the granted lock for T2, (i.e., server S1). When the message is finally sent back to server S1 to locate the owner of T2, a cycle from task 11 of server S1 to task 31 of server S3 to task 11 of server S1 is detected.

The sequence for constructing the global TWFG is as follows:

```
At server S1:
Construct 11 -> T1/S2 (TWFG-1)
Send 11 -> T1/S2
At server S2:
Received 11 -> T1/S2
Found S3 and S4
Send 11 -> T1/S3
Send 11 -> T1/S4
At server S3:
Received 11 -> T1/S3
Found 31 and 32
Construct 11 -> 31 -> T2/S2 (TWFG-2)
Send 11 -> 31 -> T2/S2
Construct 11 -> 32 (non blocking)
At server S2:
Received 11 -> 31 -> T2/S2
Found S1
Send 11 -> 31 -> T2/S1
At server S1:
Received 11 -> 31 -> T2/S1
Found 11
Construct 11 -> 31 -> 11 (TWFG-3)
Cycle found!!
At server S4:
Received 11 -> T1/S4
Found 41 and 42
Construct 11 -> 41 (non blocking)
Construct 11 -> 42 (non blocking)
```

The global TWFG that leads to the detection of the cycle 11/S1->31/S3->11/S1 is dynamically constructed as the deadlock detection message traverses from the initiators to resource masters to granted servers. As explained in the example above, a distributed deadlock search can detect a cycle by simply following the paths in the TWFG that can potentially lead to a cycle. Other paths that do not potentially lead to a cycle are discarded. As the deadlock detection message traverses to each server, the server can look up the lock in question and construct the local TWFG from the list of sleeping owners on those locks. At the end of the local TWFG construction, the server does one of the following:
1) Stops the traversal if either no sleeping owners can be found or none of them are blocked waiting for cluster locks;
2) Stops the traversal if the server that initiated the deadlock search received the detection message and a cycle involving the initiating task is found;
3) Forwards the message to all servers with a granted cluster lock, if the server that receives the message is the resource master for the lock in question; or
4) If a sleeping owner is blocked waiting for a cluster lock, the server appends the local path to the path originated from the initiator and forwards the message to the resource master of the cluster lock.

While a cycle can be detected by simply following the paths that can potentially lead to a cycle involving the initiator, several additional issues need to be resolved. These issues include detecting the end of a deadlock search, whether to allow more than one initiation of global deadlock searches in the cluster, how to avoid false deadlocks, whether to resolve deadlocks that do not involve the initiator, and how to select a deadlock victim in a cycle.

The following discussion presents these issues and the solution provided by the present invention using several examples. Some alternative approaches are also discussed. In this scenario, T1 is granted to task 21 and 41 and waited by task 11, T2 is granted to task 11 but waited by task 21 and 31, and T3 is granted to task 31 and waited by task 41 as illustrated below:
T1: G(21,41)C(11)
T2: G (11) C (21, 31)
T3: G(31)C(41)

One issue concerns how to detect the end of a deadlock search. Although a distributed deadlock search can detect a cycle by following the paths of the global TWFG that can potentially lead to a cycle, the initiator does not know when the search ends. This is because the depth and width of the global TWFG is explored dynamically and is unknown when the search starts.

It is important for the initiator to know the end of a search so that a new search can be initiated for the next sleeping task in a server. Even if a second search starts without waiting for the first one, one still needs to know when a deadlock search ends to avoid the detection of a false deadlock. A false deadlock can happen if the same cycle is detected by multiple initiations of a deadlock search. Once the cycle is broken by one initiator, the same cycle detected by the other initiators is no longer valid.

One possible solution to this problem is to carry the depth and width information along the path and require each server at the end of a path to send a path-traversed message along with the depth and width information back to the initiator. In this case, the initiator and the intermediate servers append the depth and width information as the deadlock search message traverses from one server to another. The depth is only incremented when the dependency graph must span across a server boundary. Servers with sleeping owners waiting for remote locks would record the number of remote locks as the width at the next level, and lock masters would record the number of granted owners as the width at the next level. All servers that terminate the paths need to send a path-traversed message with the depth and width information to the initiator. This would allow the initiator to detect the end of a deadlock search once it receives all expected path messages.

The following example will use the previously depicted scenario to illustrate the solution.
The scenario is as follows:
T1: G(21,41)C(11)
T2: G (11) C (21, 31)
T3: G(31)C(41)

Assume a deadlock search starts on server S1 for task 11. As task 11 is waiting on lock T1 that is currently granted to two servers S2 and S4, the path 11->T1 with the width information up to the current level 1->2 is sent to both servers S2 and S4.

Task 21 on server S2 is waiting on lock T2 that is currently granted to server S1. Accordingly, the path 11->21->T2 with the width information 1->2->1 is sent to server S1. At server S1, a cycle is detected since the initiator (i.e., task 11) owns the lock T2. From the path message, server S1 also knows that the deadlock detection search has not ended as there is another path at level 2.

Task 41 on server S4 is waiting on lock T3 that is currently granted to server S3. Therefore, the path 11->41->T3 with the width information 1->2->1 is sent to server S3. Server S3 in turn sends the path 11->41->31->T2 and the width information 1->2->1->1 to server S1. At server S1, another cycle is detected and server S1 also detects the end of deadlock detection for task 11 since it has received all expected messages.

With respect to whether more than one initiator of a global deadlock search in the cluster may be allowed, in the cluster environment both the sleep task queue and deadlock check timer are maintained locally to avoid penalizing tasks/transactions that are blocked by local owners. The initiation of a local deadlock search continues to be serialized as in prior art systems (e.g., SMP server systems). Serializing a deadlock search across a cluster, however, is not desirable. One reason this is undesirable is because of the fact that performing deadlock searches for some tasks can take a long time when the searches span across servers. Each server must independently make forward progress in detecting deadlocks involving the local sleeping tasks. Allowing all servers to initiate deadlock searches, however, may lead to the detection of false deadlocks.

This false deadlock problem can be illustrated using the above scenario as follows:

```
T1: G (21, 41) C (11)
T2: G (11) C (21, 31)
T3: G (31) C (41)
If server S4 initiates a search for task 41:
41 -> 31 -> 11 -> 41
41 -> 31 -> 11 -> 21
and server S3 initiates a search for task 31:
31 -> 11 -> 41 -> 31
31 -> 11 -> 21
and server S2 initiates a search for task 21:
21 -> 11 -> 21
21 -> 11 -> 41 -> 31
and server S1 initiates a search for task 11:
11 -> 41 -> 31 -> 11
11 -> 21 -> 11
```

In this example, each server can detect one or more deadlock cycles at the end of the search. Each server can also potentially choose to victimize a distinct task to break the cycle. However, as soon as one of the servers chooses a task (e.g., task 11) as the victim to break the cycle, all the other cycles become invalid (i.e., false deadlocks).

The present invention provides a solution to this false deadlock problem by keeping track of the tasks in the path of a global deadlock search and terminating a new search leading to a task in the path of an earlier deadlock search. The general approach of the present invention is as follows: When a server must extend a search path to a remote server at the next level, it sets all processes in the path in a search bitmap. When a deadlock search is performed at a server, the search bitmap is checked to discard edges leading to a task that is currently in the path of the other global deadlock search. Additionally, when the initiator of a global deadlock search detects the end of a search, it broadcasts the paths to all servers involved in the deadlock search, which then clears the global scan array accordingly.

Distributed Deadlock Detection and Resolution Operations

The following is a high-level description of the distributed deadlock detection and resolution methodology of the present invention. Each node (clustered server) includes a deadlock check timer which periodically checks if all processes have performed a deadlock search. If there are still processes that have not yet performed the search, the timer sets the waiting spid in rdlc_inprogress, sets STCHECKDEADLOCK, clears PL_SLEEP, and wakes up the blocking process. After being awakened with STCHECKDEADLOCK, the process sets PL_SLEEP, clears STCHECKDEADLOCK, sets STDONE, and finally updates its sleep sequence number and global rdlc_lockwait_seqno with the latest sequence number so that the most recent dependency graph is checked for cycles.

Each server has an array of search bitmaps (one for each server in the cluster and a global search bitmap). The per server search bitmap records all local processes traversed by the global deadlock search initiated from that server. The global search bitmap contains the union of all server search bitmaps to facilitate a fast lookup.

After a deadlock search is initiated at a server, the initiator follows the blocking dependency to build the local TWFG. When a search path leads to a sleeping owner blocking on a remote lock, all tasks in the search path are noted in the per-server search bitmap and the global search bitmap. The initiator then sends a message to the resource master with the blocking server and remote lock information. The recursion for this search path is considered terminated at this level. Once the deadlock check for all sleeping owners at level 1 is terminated, if all paths were terminated locally, the deadlock search is completed without a cycle. If a local cycle is detected involving the initiator, the initiator attempts to resolve the local cycle. Otherwise, the deadlock search must have been spanned across remote servers. The task remains at the head of the sleep queue and is marked as a deadlock search pending. The task can be taken out of the pending state if the lock is granted or if the task is aborted before the remote deadlock search is completed. If the task is woken up prior to the completion of the deadlock search, the task broadcasts a message to all servers to discard the current global deadlock search.

When a remote master receives the deadlock search request, it looks up the lock object. Since the grant and deadlock check messages could race, the master returns with no deadlock immediately. Otherwise, the master looks up all owners from the grant queue and forwards the request to each of the granted owners. Note that there may be more than one message sent since the lock could be held in a shared mode by more than one server. The master attaches the width and depth information to allow the initiator to detect the end of a deadlock search.

When a server receives the deadlock search request, it looks up the lock object and checks to determine if there is any sleeping owner. If no sleeping owner can be found, the server sends a message back to the initiator with the path traversed and current width and depth information. Otherwise, the server would start the deadlock search for the remote request by traversing the TWFG for each sleeping owner, when no other deadlock search is active.

A search path is terminated if either no sleeping owner can be found or if a sleeping owner is found in the global search bitmap (i.e., in the path of a global deadlock search started earlier). After all local dependencies for all sleeping owners are explored by the server, a message is sent to the initiator if all of the paths are terminated without a sleeping owner or if one of the paths was terminated prematurely from visiting a task that is already part of another deadlock search (i.e., in global TWFG). The initiator must retry the deadlock search at a later time for the latter case.

If a sleeping owner is found blocking on a remote lock, the edges in a local dependency graph leading to the remote lock are appended to the end of the global search path and forwarded to the resource master of the remote lock. If a cycle is formed while following the local dependency, the server terminates that search path but continues to complete the remote global deadlock search request.

The initiator eventually detects the end of a deadlock search using the depth and width information sent from the servers at the terminal nodes of the global TWFG. One or more cycles may be detected when the search ends. If one or more cycles is detected, the initiator proceeds with choosing a victim to break the cycles. At the end of the deadlock detection and resolution, the initiator broadcasts a message to all servers to clean up the global search bitmap before starting the next deadlock search.

An example of the format of a distributed deadlock detection message is as follows:

```
 1: /*
 2: ** CLM_DLCHECK_REQ
 3: **
 4: ** This message is used during a distributed deadlock search to
    carry the information about the search path in the TWFG graph. It is
    used for conducting the search from Initiator to Lock Master, from
    Lock Master to Lock Owner, and from the next Sleeping Owner to its
    Lock Master. At each hop, the server appends its own information to
    the message and forwards the entire message to the next server. The
    message is eventually forwarded back to the initiator, when either a
    cycle is formed or when a leaf node detects no deadlock on that
    path.*/
 5: typedef struct clm_dlcheck_req
 6: {
 7:     struct clmhdr lmhdr;         /* message header that identifies
    the next granted
 8: ** lock to perform a deadlock search
 9:                                  */
10:     void      *lmopaque;         /* opaque carried for the initiator */
11:     CSVRMAP   lmedgemap;         /* bitmap for edgeid info */
12:     char      lmstatus;          /* status of the deadlock search */
13:     BYTE      lmrmtdepth;        /* current number of remote hops */
14:     BYTE      lmdlclevel;        /* current recursion level */
15:     BYTE      lmrmtedges[MAX_HOPS];      /* # edges at each hop */
16:     BYTE      lmrmtedgeid[MAX_HOPS];     /* edge id at each hop*/
17:     int16     lmrmtpgid[MAX_HOPS];       /* history info for TWFG */
18:     struct    clmdlcpath lmdlcpath[MAX_HOPS];   /* history info
    for TWFG */
19: } CLM_DLCHECK_REQ;
20:
21: typedef struct clmdlcpath
22: {
23:     csvrid_t waitercsvrid;       /* waiter server id */
24:     spid_t waiterspid;           /* waiter process id */
25: } CLMDLCPATH;
```

Distributed Timestamps

In prior art database systems, the database timestamp is typically synchronized by means of a SPINLOCK. However, this approach does not scale well in a distributed environment (i.e., in the shared disk cluster environment of the present invention). Accordingly, the present invention provides an alternative approach. Initially, in addressing the problem of providing timestamps in a distributed environment, it was observed that it is not necessary that database timestamps be unique across the database. A timestamp that is unique across the database could be useful in enabling timestamps to serve as a stand-in for the log sequence number (LSN). However, with the use of a private log cache (PLC) in the currently preferred embodiment of the present invention, timestamps are not ordered in the log anymore. For recovery semantics it is only necessary to ensure that timestamps are increasing throughout the life of a page. There is no strict requirement that timestamps be unique across the database.

A log record that captures a change to a page generally contains a "before" timestamp, an "after" timestamp, and the change made to the page. A log record is applied to a page if the page timestamp is the oldest timestamp in the log record. The real requirement in recovery is that the new timestamp (on the updated page) be greater than the old timestamp (before the update). The monotonically increasing unique timestamp is an easy way to ensure that rule. That, however, does not preempt using means other than a unique timestamp to enforce the same rule.

One approach is to use a cluster sequence generator to generate a cluster wide timestamp. A cluster sequence generator is a cluster lock manager (CLM) construct which uses an object lock. The sequence value is stored in the value block of the lock. To obtain the next sequence value the CLM is invoked, which internally acquires an instant duration exclusive lock on behalf of the client on the object, increments the sequence value, releases the lock, and returns the incremented sequence number to the client. Thus the sequencer lock combines the lock-unlock call with the setting/getting of the value. This involves two messages: a lock request and a value return from the CLM. As the timestamp is one of the hot spots in the database, this approach is too expensive in terms of its impact on system performance.

The approach of the present invention makes use of a local timestamp. A local timestamp is a sequence maintained in the local DBTABLE. For each database each node has its own timestamp sequence. Timestamps can be granted locally on the node under a SPINLOCK, as in prior art database systems (e.g., SMP systems). The issue to be addressed then is how to ensure that timestamps retain their integrity for database recovery without an attempt to keep them synchronized via messaging.

Other than recovery uses, there are two other uses of the unique timestamp. Both are optimizations. A "commit timestamp" is used to rapidly establish whether the data on a page is committed (i.e., no need to get a lock on the page). A "last log page timestamp" is used as a high bound to quickly determine the highest timestamp in the rest of the log chain. When there is a need to instantiate the database timestamp during recovery, only the last log page header and the log records in that page are scanned to determine the highest timestamp so far logged in the database.

Each node maintains its own timestamp sequence independent of other nodes, (i.e., no messages are generated in the cluster when a timestamp is grabbed locally in a node). Synchronizations of timestamps across nodes via messaging happen only in the rarest of cases. The simple timestamp check for redoing a log record still holds good, and timestamps do not go back on a page, even for undo. The methodology of the present invention for implementing distributed timestamps is described below.

High-Level Methodology for Implementing Distributed Timestamps

At the outset, all of the nodes have their local timestamp (dbts) set to the same value, which is the highest timestamp across all the nodes (e.g., all nodes start off with 1000). Recovery can determine the highest timestamp at each node, and then find the highest among them.

When a page is updated, the next timestamp from the local dbts is grabbed and put on the page. For example:

```
getnewts( ){
dbts++; return dbts
}
```

If the node timestamps do not progress uniformly, the timestamp on a page regresses.
For example:
Node1 dbts=5000, Node2 dbts=2000
Page P1 has timestamp 100.
Node1 updates P1. After the update,
P1 timestamp=5001, Node1 dbts=5001.
Node2 updates the page. After the update,
P1 timestamp=2001. Node2 dbts=2001.
The timestamp on P1 has regressed.

To solve the problem of the regressing timestamp, the node inflates the local timestamp to a value required to ensure that the page timestamp does not regress. An updater passes the current timestamp on the page as the input timestamp when it asks for a new timestamp. If that current timestamp is higher than the node's timestamp, the node timestamp gets incremented to the input timestamp. In this way, the passed in timestamp is a floor to the node's timestamp. For example:

```
getnewts (in_ts){
if (dbts < in_ts) then dbts = in_ts;
dbts++; return (dbts)
}
```

As shown above, if the dbts (local timestamp) is less than the input timestamp (in_ts), the dbts is set to equal the input timestamp and is then incremented. In the above example, after the update in Node2, the P1 timestamp is equal to 5002 and the Node2 timestamp is also equal to 5002.

Another issue concerns what happens when there is no input timestamp when allocating and deallocating a page. For example:
Node1 dbts=5000, Node2 dbts=2000
Page P1 has timestamp 100 (e.g., on disk)
Node1 updates P1. After the update,
P1 timestamp=5001, Node1 dbts=5001

Node1 now deallocates the page and the buffer is destroyed. Assume that the page was never flushed, and page P1 on disk has timestamp equal to 100. Node2 now allocates the page. Allocation does not read the page from disk. After allocation, P1 has a timestamp equal to 2001 and Node2 has a timestamp equal to 2001. The page timestamp has regressed. One simple solution to this problem is to flush the page when it is deallocated, and read the page when it is allocated. In this manner the node always gets the floor value. The problem with this solution is that it adds the cost of an I/O to both allocation and deallocation, which is not an acceptable solution.

A better solution is to set a cluster-wide deallocation floor. The deallocation floor is a cluster object, and it maintains a timestamp, which is called the "deallocation clock". On startup, the deallocation clock is set to the highest value of the timestamp across the cluster (along with the timestamp for all nodes). Whenever a deallocation happens, the deallocator first grabs a timestamp from the deallocation clock, passing in the page's timestamp at the time of deallocation as the floor value. This floors the deallocation clock to the page's current timestamp (i.e., the timestamp at the time of its deallocation). Therefore, the deallocation clock has a timestamp higher than that on any page that has been deallocated. There is no free page in the database with a timestamp higher than the deallocation clock. It should be noted that there could be pages in the database with a higher timestamp than the deallocation clock, but none of those pages are free.

The deallocation clock (Dclock) is set when the allocation page is modified (i.e., after the deallocation is logged). For example, assume the following at startup:
Node1 dbts=2000, Node2 dbts=2000, Dclock=2000
Later, after some activity assume that:
Node1 dbts=5000, Node2 dbts=2000, Dclock=2000
Page P1 has timestamp 100.
Node1 updates P1. After the update:
P1 timestamp=5001, Node1 dbts=5001
Node1 deallocates P1. The deallocation grabs a timestamp from the Dclock. After deallocation:
Node1 dbts=5001, Node2 dbts=2000, Dclock=5002 (because it is floored with P1's 5001). The buffer is destroyed. The page was never flushed, and P1 on disk has timestamp=100.

Another issue that is addressed is that page deallocation needs a global sequencer and two messages to set the deallocation clock. Allocation with the deallocation clock involves the following procedures. With the premise as previously discussed that all free pages have a lesser timestamp than the deallocation clock, when a page is allocated a timestamp is grabbed thereby passing in the value from the deallocation clock as the floor value. Continuing the example from above assume that Node2 now allocates a page. The allocation reads the Dclock value of 5002, and passes in that value as the floor value when grabbing the page's new timestamp. Then:
Node2 timestamp=5003. (floored with Dclock's 5002)
P1 timestamp=5003. Dclock=5002

Alternatively, a timestamp may be grabbed from the Dclock also passing a floor value of zero, instead of reading the Dclock. In this instance, the Dclock lock does not have to deal with readers and writers. In that case the allocation grabs a timestamp from the Dclock. After allocation, it passes zero as the floor value.
P1 timestamp=5004. Dclock=5003,
Node2 timestamp=5004. (floored with Dclock's 5003)

The allocation page must be latched and the Dclock value grabbed. Write-ahead logging dictates that the allocation be logged first. A message is sent and one must wait for a reply while holding the allocation page latch. This should be distinguished from deallocation. To log the allocation the Dclock value must be known. Even if one were able to solve this problem and send the message without holding the latch, the messaging cannot be eliminated.

The deallocation clock does not represent an event time line. It only acts as a high watermark timestamp value, above which a newly allocated page can be safely assigned timestamps. A deallocation clock is significantly above the timestamp of the page being deallocated. For example, a page P1 with timestamp 2000 and a page P2 with timestamp 5000 are being deallocated, in nodes N3 and N4. The deallocation clock is at 1000. If P2 gets deallocated first, the Dclock is set to 5001 (floored with P1's 5000). Assume that P1 is subsequently deallocated. In this event, the Dclock value is set to 5002 (floored with 2000, so there is no inflation to the floor value).

Additionally, a node timestamp is already above the deallocation clock. For example, let P1 be allocated in node N2 and assume that the N2 timestamp is at 6000. The Dclock value passed in as the floor when grabbing the timestamp for the page allocation is 5002. After allocation of P1, the N2 timestamp is equal to 6001 and the P1 timestamp is also equal to 6001 (floored with 5002, so there is no inflation).

An issue with the deallocation clock is the messaging involved in deallocation and allocation, especially during allocation as messaging happens while holding the allocation page latch. To address this issue the deallocation clock is localized. The localization of the deallocation clock is done via the ALLOCATION PAGE. Each allocation page (and hence each allocation unit) has a timestamp that is called the "aclock". This consumes eight bytes in the allocation page. Everything else remains the same as the deallocation clock, except that instead of utilizing the Dclock the aclock is used when deallocating and allocating a page. The basic axiom still applies with respect to an allocation unit basis, (i.e., there is no free page in the allocation unit with a timestamp higher than that in the allocation unit's aclock). There could be pages in the allocation unit with a higher timestamp than the aclock, but none of them are free. The advantage of this solution is that the allocation page is always available locally when a page is being allocated and deallocated. There is no messaging involved when a page is allocated or deallocated. There is no SPINLOCK needed for the aclock, as the allocation page latch enforces concurrency rules.

The following example illustrates the aclock workings. At startup:
Node1 dbts=2000, Node2 dbts=2000
Allocation page for P1 is API, with aclock=50
Page P1 has timestamp 100.
Node1 updates P1. After the update:
P1 timestamp=5001, Node1 dbts=5001

Assume that Node1 deallocates page P1. The deallocation includes grabbing a timestamp from API's aclock. After deallocation:
Node1 dbts=5001, Node2 dbts=2000, API's aclock=5002
  (because it is floored with P1's 5001)

Assume that the buffer is destroyed, the page was never flushed, and P1 on disk has timestamp equal to 100. Subsequently, Node2 now allocates the page. The allocation reads the timestamp from API's aclock. After allocation:
P1 timestamp=5003, aclock=5002, Node2 timestamp=5003
  (floored with aclock's 5002).

An exception to the above discussion involves the use of messaging in the case of deallocations without accessing the page (e.g., truncate table, drop table, drop index, or the like). The same difficulty arises with both the Dclock and aclock methods: one may not know the timestamp of the page being deallocated. Reading the pages is not viable, as many pages would have to be read. To solve this situation one needs to determine the highest timestamp in the database and use it as a substitute for the page timestamp for all the pages which are being deallocated.

In a situation involving the use of an aclock, a logical lock protecting the pages (e.g., the EX_TAB in the case of DROP TABLE) is first obtained. Next, the method provides for getting the highest timestamp across the cluster (high_ts). Note that this need not be coherent (i.e., there is no need to freeze the timestamps and get the highest value). One needs to ensure that the timestamp values are obtained after getting the logical lock. In this example, at this point there is no page with a timestamp higher than high_ts in the pages that have been locked under the logical lock. When grabbing the timestamp from aclock, high_ts is then used as the page timestamp. Additionally, the aclock may be advanced more than is actually required to ensure correctness, but this is not an error.

In the case of the Dclock, similar to the discussion of the aclock above, the pages are protected by first getting the logical lock and then getting the highest timestamp across the cluster (i.e., high_ts). The highest timestamp (high_ts) is then used as a substitute for the page timestamp, when grabbing the timestamp from the deallocation clock. After recovery the highest timestamp in each node needs to be reestablished in order to subsequently determine the highest timestamp across all nodes.

There is no special initialization needed for aclock at the time of database creation, as the allocation page is initialized to zero. The only requirement is that the database's highest timestamp be established and used as the starting point for all of the node timestamps before distributed access to the database is allowed. The same constraint applies when an old dump is loaded or during recovery.

During recovery, the determination of the highest timestamp is inherently tied to the logging scheme used (i.e., multiple logs (one per node) or single log (appended to by all nodes)). In the multiple log scheme, the highest timestamp in each node is found, and then the highest timestamp among the nodes is selected as the starting point for all nodes. In a single log scheme, one needs to find the last log page allocated by each node and examine all other records logged after that page because, potentially, one node can append into partially full log pages that have been allocated by another node. In some instances it can forever be a "freeloader" by living on log pages allocated by other nodes without ever allocating a log page. This scenario can be addressed by scanning the log and looking at each log record during either an analysis and/or a redo pass.

For replication purposes it is desirable to have the log page timestamps in increasing order. Replication uses the log page timestamp and the row ID of the log record as log record markers for replication needs (e.g., restarting a replication agent (RepAgent) scan). The log page timestamps are maintained in increasing order by using the current last log page's timestamp as the floor value if that value is greater than the aclock value. For example:
Node1 has allocated the current log page LP0 and has given it a timestamp of 900.
Node2 is trying to allocate a new log page LP1 from an allocation page API that has aclock set to 600.
Node2 timestamp is currently at 500.

Applying traditional logic, one would (erroneously) read the aclock value of 600 first, and use it as a floor value when grabbing the new timestamp for the newly allocated log page. After grabbing the timestamp one will end up with:
Node2 timestamp=601, LP1 timestamp=601.

Therefore, in this scenario LP1 has a lower timestamp than LP0.

To prevent this type of error, the methodology of the present invention provides that, after reading the aclock value, the aclock value is compared with the timestamp on the current last log page (11p_ts). If the aclock value is less than the timestamp on the current last log page (11p_ts), then the aclock value is discarded and the 11p_ts is used as the floor when grabbing the timestamp for the new log page.

Determining the timestamp for certain DDL operations

The operations that need to determine the highest timestamp in the cluster are the dropping of objects and the altering of object level properties such as the locking scheme or the estimate row length. The methodology of the present invention for determining the timestamp for each of these operations is described below.

Dropping of Objects

An operation dropping an object needs to find the highest timestamp that was used on the object. This timestamp is not available other than by reading all the pages themselves, as there is no update to the allocation page or the object descriptor for every update to the pages of an object. To avoid reading all the pages, the present invention provides for 1) determining a safe timestamp for the drop object operation; and 2) using the safe timestamp as the floor value for logging the drop operation. The safe timestamp is one which is guaranteed to be at least equal to the highest timestamp present on the pages belonging to the object.

The dropping node obtains an exclusive logical lock on the object being dropped. This blocks all changes to the object by any other activity on any node. The dropping node (requester) then broadcasts a get timestamp request to all nodes. The get timestamp request returns the current local timestamp value of each node timestamp. Every node reads the current value of its own local timestamp at the instant the message is processed in that node. The read value is sent back to the requester. Timestamp generation is not blocked at all other than during the instant it is read locally.

The requester calculates the highest of all the returned values (including its own local value) and sets this as the safe timestamp for the drop operation. The drop operation, as described earlier, does not read all the pages of the object being dropped, but only marks the allocation page to indicate that the pages are free. This change is made using the safe timestamp as the floor value.

Altering of Objects

Altering of an existing object requires that all subsequent operations are logged with a higher timestamp than the highest timestamp that existed on any of the pages of the object before the object was altered. This is necessary so that when redoing the log, by comparing the timestamp in the log record and the object alteration timestamp, the log record can be interpreted to match the object state that existed at the state indicated by the log timestamp. The basic approach is to bump up the timestamp on every page to this highest value. The present invention provides a methodology for alternating objects which avoids this.

The alter object methodology of the present invention is as follows:
1) Obtain an exclusive logical lock on the object.
2) Determine the safe timestamp for the object (in the same manner as described above for dropping of objects).
3) Increment the safe timestamp by one, to get the new value. This is the "alter timestamp" for the object.
4) Broadcast a timestamp set request to all nodes. This will floor the timestamp in every node with this alter timestamp. The altering node will broadcast the alter timestamp to all nodes and every node when processing the message, will floor their local timestamps with the alter timestamp. Thus all nodes will get to have a timestamp which is at the least equal to the alter timestamp value.
5) The object lock is released.

Any further update to any of the pages of the altered object in any node is guaranteed to have a higher timestamp, as all nodes now operate with a higher timestamp than the alter timestamp.

Node Joining

When a node joins the cluster, it is necessary to ensure that all set timestamp broadcasts are covered. The following protocol is followed to initialize the local timestamp of the node, before allowing any update activity in the node:
1) The node initializes its local timestamp to zero.
2) The node then starts accepting all set timestamp messages.
3) The node then obtains a safe timestamp (in the same manner as described above for dropping of objects).
4) After obtaining a safe timestamp, the node floors the local value with the safe timestamp.

Node Leaving

When a node leaves the cluster, it cannot reply to any subsequent timestamp get messages, as it does not exist in the cluster anymore. Thus, the leaving node has to ensure that all other nodes are aware of the timestamp at the time it left, which is the highest timestamp that was consumed in that leaving node. The following protocol is followed as a node leaves the cluster:
1) Wait until all update activity in the leaving node is completed.
2) Stop accepting set timestamp messages broadcast by other nodes.
3) Read the local timestamp value—this is the last timestamp used in the node.
4) Send a set timestamp broadcast with the last timestamp value.
5) All other nodes, on receipt of this broadcast will floor their local values with this last timestamp value, thereby incorporating that into their local timestamps.

Node Failure

When a node fails, it is not possible to determine the highest timestamp in the cluster, until the failed node's log is recovered. Thus, all requests to obtain a safe timestamp have to block until failover recovery is complete.

Node recovery will calculate the highest timestamp that was logged by the failed node by reading the log. It will then perform a set timestamp broadcast with this highest logged value, and thus the failed node's timestamp gets incorporated to all the other nodes' local timestamps. This timestamp recovery is done during the analysis phase of the recovery, and happens before the undo or redo phase of the recovery.

An operation performing a get timestamp broadcast will be blocked during a node failure by the cluster membership manager, until timestamp recovery is complete. Once timestamp recovery is complete, the failed node's timestamp is already incorporated into the local timestamp of the other nodes, and the operation doing the get timestamp can proceed. If the node failure happens during the get timestamp broadcast, the broadcast itself will fail, and the operation will retry after timestamp recovery is completed.

Cluster Boot

When the first node of the cluster is booted, the timestamp for that node is established from the log. No node can join the cluster till the first node is completely booted and recovered, and the highest timestamp is established from the log.

Timestamp Broadcasts

Currently, all timestamp message broadcasts are synchronous (i.e., the initiator of the broadcast waits until every other node replies before proceeding).

Cluster Lock Management

In the shared disk cluster environment, all database devices are directly accessible to all clustered servers and database pages and metadata objects are cached and shared among all clustered servers. Coherency control to the shared buffer cache, metadata cache and global variables presents a major challenge. A Cluster Lock Manager (CLM) of the present invention provides a distributed locking service to allow the sharing of global objects and cached data/metadata among the clustered servers. The Cluster Lock Manager distributes the lock management workload among clustered servers, determines how to locate the clustered server that provides locking service for a lock object, and minimizes remote messaging introduced by distributed locking. This is in addition to the role of the CLM in detecting distributed deadlocks as described above.

The CLM uses the concept of a retention lock. Retention locks are cluster-wide locks that are granted to the clustered servers with lock ownership shared among all processes on the granted clustered servers. Retention lock ownership can be retained until another cluster server requests for a conflicting lock mode or when the resource associated with the lock need to be reclaimed. Retention locks reduce the need for frequently acquiring and releasing the locks by the clustered servers and thus reduce remote messaging.

Each retention lock object is generally associated with a unique name, a lock value block and the lock queues. The name of a retention lock object can correspond to a database table, object, page or row for the support of logical locks across the Shared Disk Cluster. The name of a retention lock object can also correspond to a physical page in the shared buffer cache, or correspond to any arbitrarily named object for concurrency control of the metadata and global variables. The lock value block is provided for sharing of object specific information among the locking clients across the shared disk cluster environment. The Cluster Lock Manager maintains the status of the lock value block as NOVALUE and INDOUBT to facilitate the initialization and recovery of the object protected by the lock, in the event of a clustered server join or failure events. The lock queues maintain the lock records associated with the requesting clustered servers and are for distributed lock management purpose.

Three types of retention locks are supported by the Cluster Lock Manager. These three types are physical locks, logical locks, and object locks. Physical locks are locks maintained by the Cluster Lock Manager to establish ownership of a page in the shared disk cluster environment. Physical locks are also used to facilitate cache-to-cache transfer of pages via private interconnect if the lock is owned by another clustered server. Similar to latches in an SMP server, physical locks in the distributed database system of the present invention are held on pages to ensure physical consistency. Unlike latches, acquiring physical locks may also incur a page transfer from the clustered server that owns the latest copy of the cached page. Physical locks are held by the clustered server as long as there are no conflicting requests in the cluster. The following six lock modes for physical locks are supported in the currently preferred embodiment of the present invention:

NL—Null mode locks grant no privilege to the lock holder
CR—concurrent read mode locks allow unprotected read access
CW—concurrent write mode locks allow unprotected read and write accesses
PR—protected read mode locks allow read access and guarantee no other writer
PW—protected write mode locks allow read/write accesses and guarantee no other writer
EX—exclusive mode locks allow read/write access and guarantee no other reader/writer Logical locks are jointly managed by the local lock manager and the Cluster Lock Manager. The logical locks managed by the local lock manager have task, cursor or transaction ownership. The logical locks managed by the Cluster Lock Manager are retention locks and the granted lock mode is shared among all tasks, cursors or transactions on the clustered server.

Object locks are locks maintained by the Cluster Lock Manager to establish ownership of a metadata object such as dbtable or a global data structure/variable. Similar to physical locks, object locks facilitate the cache-to-cache transfer of metadata cache among all clustered servers via private interconnect if the lock is owned by another clustered server. Access to a metadata object and/or a global variable normally requires object lock protection. Object locks can be acquired in one of the six lock modes as provided for the physical locks.

FIGS. 7A-F illustrate six tables which are used for lock management in the currently preferred embodiment of the present invention. The lock sufficiency tables 701, lock conflict table 702, and lock downgrade table 703 shown at FIG. 7A, FIG. 7B, and FIG. 7C, respectively, provide for support of physical and object locks. The lock sufficiency table 701 shown at FIG. 7A is used for lock sufficiency checking based on the lock held by an instance and the lock requested by the instance. The lock conflict table 702 shown at FIG. 7B is used for lock conflict checking based on lock held by another instance and the lock requested by the instance. The lock downgrade table 703 is shown at FIG. 7C. The lock master will request a lock owner to downgrade a lock to a lock mode looked up from the BAST lock downgrade table 703. As shown, table 703 is based on the lock held and the lock requested.

A set of tables for supporting logical locks is illustrated at FIGS. 7D-F. These include a logical lock sufficiency table 704, a logical conflict table 705, and a logical lock downgrade table 706 as shown at FIG. 7D, FIG. 7E, and FIG. 7F, respectively. The local lock manager uses a logical lock sufficiency table and a logical lock conflict table to grant the locks with task/transaction ownership to the local requesters. A Cluster Lock Manager uses a logical lock conflict table to grant locks with instance ownership and uses a logical lock downgrade table to reclaim the lock ownership. More particularly, the logical lock sufficiency table 704 shown at FIG. 7D is used to determine if the lock held is sufficient to cover the new locking request. The logical lock conflict table 704 shown at FIG. 7E is used when searching for a compatible SEMAWAIT to queue the locking request. In the normal LOCK_ACQUIRE mode, the local lock manager starts at the tail of the SEMAWAIT queue looking for a compatible SEMAWAIT to queue the new LOCKREC structure on. In LOCK_REQUEUE mode, the local lock manager searches forward in the queue, from the current position of the LOCKREC, to look for a better position to queue the LOCKREC. The lock master will request the lock owner to downgrade the lock looked up from the BAST logical lock downgrade table 706 as shown at FIG. 7F.

Data and Lock Transfer Triangle Optimization

The components of the distributed database system of the present invention use messaging to communicate with each other so that action is taken in a consistent, coordinated manner. Efficient messaging is important to providing good performance in a distributed system. The present invention optimizes messaging between nodes of the cluster, including optimizing the number of messages sent amongst nodes as well as "piggybacking" messages so that multiple messages can be delivered to a node in one packet.

The present invention includes an optimization for reducing the number of messages and the latencies involved in a shared disk cluster environment which is referred to herein as a "triangle optimization". This triangle optimization is used when obtaining a typical cluster lock (i.e., from the CLM master) and the corresponding data (from the node currently owning the cluster lock which has the latest data) being protected by the cluster lock. The triangle optimization applies to the various types of locks supported by the CLM, including logical locks, physical locks, and object locks.

Figure 8:
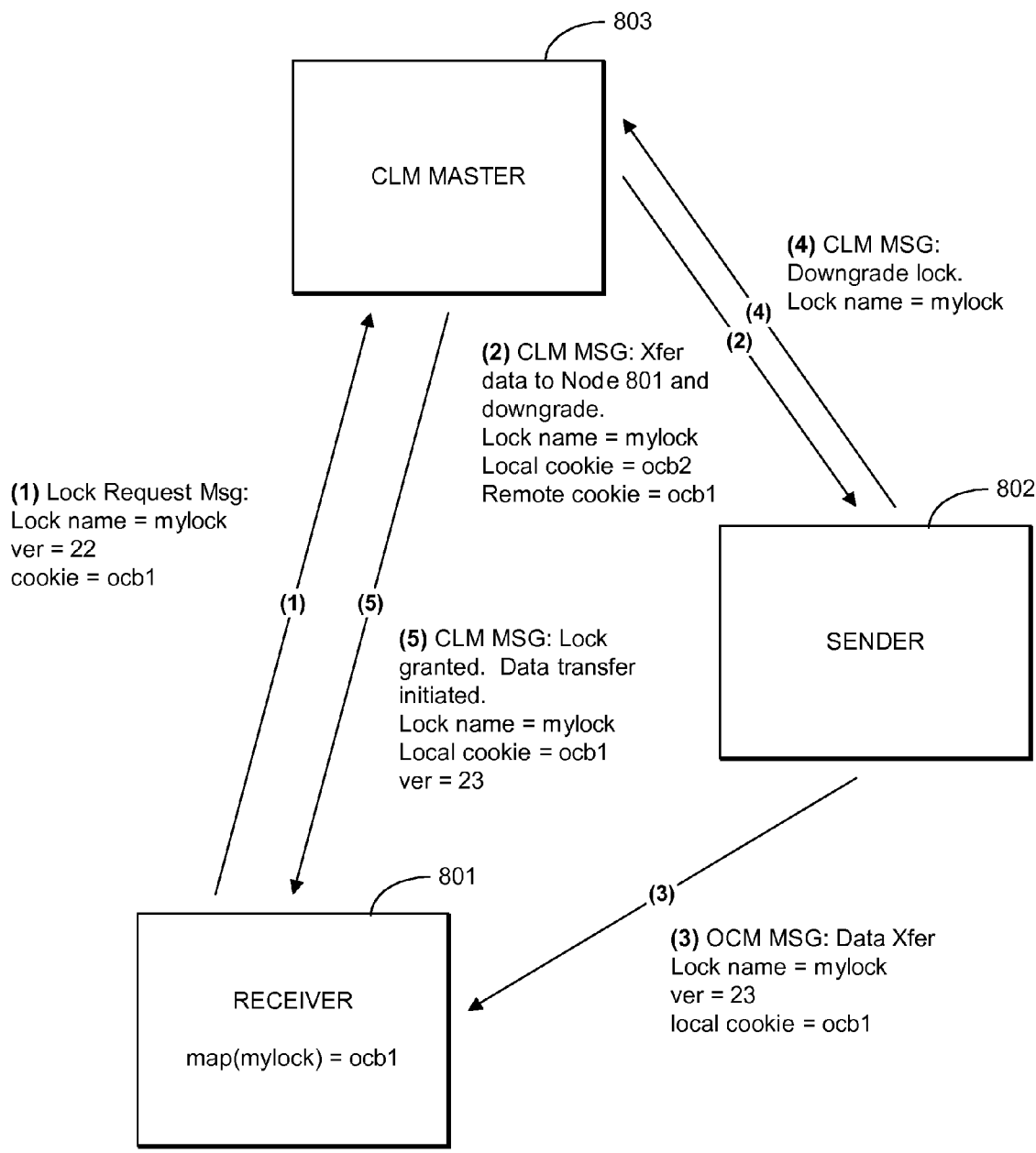
FIG. 8 is a high-level flow diagram illustrating the "triangle optimization" provided by the present invention.

FIG. 8 is a high-level flow diagram illustrating the "triangle optimization" provided by the present invention for object locks (managed by the OCM). As shown at FIG. 8, the "receiver" is node 801 which is trying to obtain the object and corresponding latest data, the "sender" is node 802 which currently owns the object lock of interest and has the latest data, and the "CLM master" is node 803 which is the CLM master for the object lock. Note that, the CLM master is designated as a different node from the sender or receiver in this example. However, the CLM master could also be implemented on either the receiver or sender nodes. Without the triangle optimization, the process of obtaining the object lock and corresponding data will generally include the following six messages:

1. The receiver sends message (1) to the CLM master requesting ownership for the object lock; which is typically EX mode to get read and write access, and PR mode to get read-only access.
2. The CLM master sends message (2) to the sender (i.e., the current lock owner) to downgrade the lock mode (to NL or PR as needed for the requested lock mode), so that it can grant the lock to the requesting node.
3. The sender downgrades the lock, resulting in another message (message (3)) to the CLM master.
4. The CLM master sends message (4) to the receiver granting the object lock, and informing the receiver which is the sender node that has the latest data.
5. The receiver sends message (5) to the sender requesting the latest data.
6. The sender sends message (6) to the receiver with the latest data.

The triangle optimization provides an improved approach by reducing both the number of messages and the latency involved in obtaining the lock and data at the receiver node. It is summarized as follows. As shown at (1) at FIG. 8, a first node 801 sends a lock request message to the Cluster Lock Manager (CLM) at node 803. In response, at (2) at FIG. 8 the CLM Master issues a CLM message to node 802 instructing it to transfer data to Node 801 and to downgrade its lock. At (3), node 802 issues an OCM MSG for data transfer to node 801. At (4), a CLM message is sent from node 802 to the CLM Master node 803 to downgrade the lock. At (5), node 803 issues a CLM message to node 801 indicating the grant of the lock and initiation of data transfer.

The triangle optimization eliminates one message and reduces the latency of obtaining the latest data at the receiver node by three messages. Further, this optimization also helps in eliminating additional house-keeping effort at the sender node to maintain the latest data at least until it is requested by the receiver node, even though the sender node is not holding a valid lock. Additionally, the efficiency of this optimization is increased as CLM of the present invention includes a provision to attach a "remote cookie" with the cluster lock to pass any relevant information from the receiver to the sender. Typically, the processing modules on the receiver and the sender are same, such as OCM for object locks, and the "remote cookie" is used to contain control information for the required data transfer. For example, for object locks, the OCM sends the address of the OCB (which is a data-structure maintained by the OCM for a given object lock) in the remote cookie to avoid unnecessary processing when it receives the data transfer from the sender node. Also, for physical locks, the BCM stores the address at which the to-be-received data transfer page is supposed to reside in the requesting node.

This triangle optimization is a base optimization on top of which additional lock type specific (Physical/Logical/Object locks) optimizations are made. These optimizations are described below in more detail.

Page Transfer Mechanism

In the currently preferred embodiment of the present invention, the page transfer mechanism uses the Virtual Interface Architecture (VIA), if available, or sockets as the transport mechanism. The Virtual Interface Architecture (VIA) defines a high-bandwidth, low-latency networking architecture that was designed for creating clusters of servers and SANs (Storage Area Networks). The VIA is an attempt to standardize the interface for high-performance clustering. The interface specifies logical and physical components, as well as connection setup and data transfer operations. The VIA includes support for a remote direct memory access (RDMA) model where the sender directly writes to a specified region in the target space.

With either transport mechanism (i.e., VIA or sockets) one basic approach for page transfer is as follows. The client obtains a physical lock before accessing a page. When the lock is granted the lock manager indicates if the node is available to be read on the network and also returns the owner of the page. The client uses this information to request a page from the owner. A disadvantage of this approach is that it involves two round trips to get a page (the first to the resource master to get the lock, and the second to the owner node to get the page). Accordingly, the present invention includes an optimization that provides initiation of page transfer simultaneously (in parallel) to granting the lock request. When a client requests a physical lock, it also passes in the address at which the page is supposed to reside in the requesting node. The lock manager passes this along to the owner of the page in parallel with granting the lock request to the client. If the transport mechanism is VIA, once the page becomes available on the owner, the BCM thread can directly write to the requesting node.

If a socket transport mechanism is utilized, the page transfer mechanism simulates remote direct memory access on top of sockets. After receiving a lock request the resource master passes the address of the page to the owner. The BCM on the owner sends the address as a short message and the page as an I/O vector (using scatter gather I/O). At the node waiting for the page to be transferred, the CIPC (cluster interprocess communication) thread reads the small message and then uses the address passed in to receive the page. This approach avoids an extra copy in the user space in addition to avoiding an extra message. In addition, this mechanism has the least number of context switches possible both at the sender and receiver nodes with sockets.

The following discussion details the operations on the sending and receiving side during a page transfer. On the sending side, once the page becomes available the BCM thread queues the page on the CIPC queue. Once the buffer is queued the BCM thread can either downgrade the lock request or indicate to the lock manager that the page transfer is complete. The lock manager can then grant the lock to the receiving side. The buffer is not available for re-use until the CIPC thread sends the page across the network. All client tasks can access the buffer in a compatible mode. However, upgrade/downgrade requests are queued behind the current lock request. Once the CIPC manager is done sending the buffer (and receives acknowledgment that the page is queued on the receiving side), it executes a notification routine to indicate that the transfer is complete. The buffer is now available for re-use on the sending side.

On the receiving side, the client task goes to sleep waiting for the buffer. After receiving the page, the CIPC thread executes the completion routine. The completion routine marks the buffer as available and notifies all tasks waiting on the buffer. All clients have a time-out mechanism, and a check is made to determine if the client has been granted the lock. If the lock is not granted, the client task goes to sleep. Otherwise, if the lock is granted, the client task checks if the node is down. If the node is down the client task issues a CIPC flush call to flush all buffers in the CIPC queue from the failed node. It is possible that after the flush the page that the task is waiting on is already on the node. In this case there is nothing more to do. If the page has not been received, then the lock is released and the whole page transfer is initiated again. Except for the very first call, all other calls are lightweight and may potentially involve verification.

Obtaining OCM Locks and Data Faster

The present invention provides a solution for improving the process of obtaining OCM locks and data by utilizing an implicit lock granted message or removing a lock granted message if the OCM can convey the message to local CLM on the receiver node (depending the design of the CLM). The Object Coherency Manager (OCM) uses a CLM's object locks, and are referred to as "OCM locks". As CLM object locks have node level ownership, the OCM manages sharing the obtained CLM locks among various tasks in a node, and coordinates with the CLM to share the object locks across multiple cluster servers. On top of the base triangle optimization, the following enhancements to OCM locks reduce network messages and speed up the resumption of tasks waiting for locks/data at the receiver node.

Generally, the receiver waits until it receives both lock granted and data transfer messages. This is done for two reasons: to receive first hand information from the CLM that the lock is granted, and to obtain the latest version number from the CLM to validate the transfer message. Typically, following the sequence of messages as explained above in the discussion of the triangle optimization, the data transfer message reaches the receiver before the lock granted message (unless the messaging/networking channels are loaded differently and impact the message delivery latencies). The sender directly sends the data transfer to the receiver at message (3) as illustrated in FIG. 8, while the lock granted message reaches the receiver node at message (5) as shown in FIG. 8. As the transfer is initiated by the CLM (at message 2), the transfer message also conveys that the CLM is processing the receiver's lock request, and the lock is about to be granted. Thus, the present invention provides for implying the granting of a lock granted from the data transfer message (3), and wakes up the client tasks as soon as it receives the latest data (instead of waiting for the actual lock granted message from the CLM).

The second reason to wait for both the lock granted and data transfer messages is to validate the transfer message received. The version number cannot be used for this validation because it is inefficient to wait for the lock granted message (which gives the latest version number). The present invention provides for the receiver to accept a transfer message from the sender if the version number in the message is greater than the local version. A strict restriction is required to ensure that no duplicate (and hence stale) messages are floating around in the system. This is achieved by following an OCM level protocol for sending the data transfer messages between the receiver and the sender, and by flushing the messaging/networking channels in the case of errors or crashes to properly remove or complete the processing of in-transit messages.

An advantage of this approach is that the client tasks obtain locks and data, and resume faster, by a time equivalent to the latency of two network messages. The following discussion describes how the present invention handles various crash scenarios.

Sender Node Crash

If the sender node crashes there are two general scenarios depending upon whether OCM locks are acquired in EX or PR modes. If the sender node is holding an EX lock at the time of crash, there are four possible cases depending on what is the status of the messages (i.e., messages 3 and 4 as shown at FIG. 8) that are sent by this node at the time of crash. Note that messages 1 and 2 as shown at FIG. 8 must have been successfully delivered before the crash, otherwise the crashed node would not be considered as a "sender" node. These four possible cases involving a sender node holding an EX lock at the time of crash are summarized as follows (with all references referring to messages (3) and/or (4) referring to the messages illustrated at FIG. 8):

1) Message (3) and message (4) not received. The first case is if both the data transfer message (3) to the receiver and the downgrade message (4) to the CLM master are not received. In this case the CLM master notices that sender has crashed holding an EX lock, and marks the object lock INDOUBT. The receiver continues to wait for the lock/data. After recovery, when the INDOUBT state is cleared, the CLM will grant the lock to receiver with NOVALUE in the lock value block. The receiver node will initialize, generate, or read the latest recovered data from disk.

2) Message (3) not received and message (4) received. The next case is if the data transfer message (3) to the receiver is not received, but the downgrade message (4) to the CLM master is received. The CLM grants the lock to receiver, and the lock will not be marked INDOUBT. When receiver times out waiting for the data, it suspects that the sender is crashed. Then, before taking any error-recovery actions, the OCM on the receiver waits until the CMS confirms that the sender node has indeed crashed and is removed from the cluster view. Otherwise, it may not be possible to distinguish the difference between a sender crash, and message delay because of system load. Further, note that as long as the sender and the receiver are alive, the messaging channel (e.g., CIPC messaging channel) between them will make sure that the data transfer message is successfully delivered. Once it is confirmed that the sender has crashed, the OCM flushes its CIPC end-points to the sender node and makes sure the awaited data transfer message is not already received. Then it sends a broadcast message to all of its OCM peers on other nodes to inquire if they have latest data of the lock. In this manner, the latest data can be obtained if any of the other nodes were granted a PR lock just before the crash, and may have received the data transfer. If no other node in the cluster has valid data, then the OCM client's callback is invoked to initialize or generate the lock-data.

3) Message (3) received, but message (4) not received. In the case that the data transfer message (3) is received, but the downgrade message (4) to the CLM master is not received, the CLM assumes that the sender has crashed holding the EX lock and marks the object lock INDOUBT. The receiver node resumes various tasks as the data transfer is received and the lock is implicitly granted. During recovery of the sender node, the INDOUBT state of the lock is cleared and the lock is granted to the receiver node. The present invention also provides another improvement (described below) for eliminating much of this complexity where OCM on the receiver node informs CLM that it has received data transfer and is implicitly assuming a lock granted message. With this improved approach, the CLM does not mark the object lock INDOUBT as it is aware of the new owner, thus avoiding most of the complexity of this mechanism.

4) Message (3) received and message (4) received. The receiver resumes its tasks as soon as it receives the data transfer, and the CLM grants the lock to receiver.

The second scenario is that the sender node is holding a PR lock at the time of crash. In this case, the object lock will not be marked INDOUBT. However, one interesting situation is when the data transfer reaches the receiver but the downgrade message does not reach the CLM master. In this event, the receiver will resume its tasks, but the CLM may initiate another data transfer if it finds another sender node that has the latest data. Thus, depending on whether the second sender has data or not, and whether the receiver has already received the data transfer from the first sender, the receiver node may end up receiving the data twice. Alternatively, it may never receive the data. If the data is not received, an OCM error-recovery process will initiate as described above (i.e., in the above discussion of case (2)). If the data is received twice, the second data transfer that is received is ignored.

Receiver Node Crash

In the event a receiver node crashes, a new version of the data may or may not have been created before the crash, depending upon whether or not the data is received and the tasks are resumed on the receiver node. Thus, when the receiver node crashes before the CLM master has actually sent the lock granted message (message 5 as illustrated in FIG. 8), one problem is to decide whether or not to mark the corresponding object INDOUBT. This is decided as follows:

1) If the sender node has not yet sent the data transfer, then CLM master will cancel the receiver request, the sender will cancel the data transfer, and the object lock is not marked INDOUBT.
2) If the sender has already sent the data transfer to the receiver node, then the object lock marked INDOUBT only if the receiver has requested the lock in EX mode. Otherwise the object lock is not marked INDOUBT.

Exception to Implicit Lock Granted Message

One interesting case, which forms an exception to the scheme of implicit lock granted messages, is when a receiver node is requesting an EX lock (currently holding NL lock) and the sender (and possibly other nodes in the cluster) are holding a PR lock. In this case, the receiver cannot implicitly assume the lock is granted when the data transfer is received from the sender node, because the transfer implies only that the sender node has downgraded the lock to NL. However, there may be other nodes in the cluster which have not yet downgraded their PR locks to NL mode. Accordingly, the receiver node must wait for the explicit lock granted message from the CLM in this situation. To identify this case on the receiver end, the sender node includes the lock mode it is holding when sending the data transfer. If that lock mode is EX, then the receiver can assume an implicit lock granted message. Otherwise, the receiver must wait for the explicit lock granted message from the CLM, unless the receiver itself is requesting the lock in PR mode.

In the above optimization discussion where a lock granted message is implied from the data transfer message, the lock granted message is still sent. This means that even though client tasks on the receiver node are woken up before actually receiving the lock granted message, the receiver OCM still receives the message and processes it. Another optimization is to remove this message as OCM does not need the message. But note that the CLM may want to send the message to the receiver node to update the local CLM on the receiver node. In this case the message can be avoided by OCM on the receiver node informing its local CLM that it has received the data transfer (and hence to mean that lock is granted).

Distributed Space and Threshold Management

The space management that is currently performed in prior art database systems is enhanced in the system of the present invention to support the cluster system design. In prior art systems, space management information is kept and managed by an in memory structure for each database with access to this information synchronized by a threshold spinlock. In the shared disk cluster system of the present invention, the use of space by each of the clustered servers also needs to be globally managed as all clustered servers get space from the same set of devices (i.e., the shared disk storage). However, the space management mechanism should be performed in the memory of the local clustered server as much as possible, so as to avoid the transmission of external messages each time space is needed by a given server.

The present invention includes space and threshold methodology that localizes space management as much as possible in the context of a shared disk cluster system. The methodology of the present invention includes thresholds defined based on space usage by all clustered servers. The system uses thresholds to monitor free space in databases enabling appropriate action to be taken when space gets low. Thresholds are generally defined per segment. A segment is a logical grouping of "disk pieces" and each disk piece can be assigned to store data for zero or more segments. A "disk piece" refers to one unit of contiguous database storage, which is currently described by a single entry in master.dbo.sysusages and by a single entry in the database's disk map. Database objects may be assigned to a particular segment, meaning that new space allocations for that object can only be obtained from disk pieces that can store that segment. For instance, the disk pieces that are assigned to a dedicated log segment are not for use by any other segment (i.e., the assigned space on the disk pieces is only for the log). Currently, each database can have up to 32 segments. Also, each database currently has three segments by default which are referred to as the system segment, the default segment, and the log segment. Each segment can have zero or more thresholds.

While one clustered server is being recovered, there will usually be online activities in the same database from other surviving clustered servers. The present invention provides that the following principles are maintained: (1) the thresholds are active and maintained even at recovery time; (2) the log space that the failed clustered server had already reserved is not used by other online activities (i.e., the recovery process does not run out of space); and (3) the total unreserved page count is made correct by the end of recovery without too much interference to other online activities. Performance is another issue to consider. The database fail-over process will necessarily involve some rearrangements of the space management information, during which time the online activities and recovery process will be affected. Accordingly, the solution should minimize this impact as much as possible.

In a cluster environment, the present invention provides that "segacct" and "unreserved map" structures, which are constantly updated during space usage, are maintained locally. Each segment in a database is represented by a "segacct" structure. Some of the information regarding a segment is kept coherent across the clustered servers, (e.g., the current two thresholds active on the segment). Some other information is only for the local clustered server (e.g., a sg_unreservedpgs field). The segacct structure is discussed below in greater detail.

The unreserved map structure is a list of unreserved page counts, one for each disk piece. When a change to a disk piece occurs, the corresponding entry in the map needs to be updated. Therefore, the unreserved map structure is used to keep track of space changes at physical disk level. When the dbtable is scavenged or when the cluster is being politely shutdown, the unreserved map is written back to Sysusages. Since that is not a frequent event, the system can aggregate some of the unreserved counts from all clustered servers before writing to disk when it occurs.

Examples of Space and Threshold Management Methodology

The following discussion will use an example to illustrate the space and threshold management mechanisms of the present invention. This example assumes that there is one user defined segment name "user seg" (segment number is 3) with an unreserved count in the segment of 1000 pages. This segment contains two disk pieces (Disk 1 and Disk 2), with Disk 1 having 400 unreserved pages and Disk 2 having 600 unreserved pages. Also assume that each disk piece contains three allocation units and that the segment has two thresholds with levels of 400 and 1500. In addition, in this example the cluster includes three clustered servers (referred to herein as server 1 (or S1), server 2 (or S2), and server 3 (or S3). Also assume that clustered server 1 initially serves as the coordinator.

The methodology of the present invention provides for maintaining thresholds based on the free page count (sg_unreservedpgs) in the segacct structure. All of the clustered servers share the same set of disks, and therefore share segments. Accordingly, thresholds are based on the total space usage of the segments. This design reduces the external messages between clustered servers while maintaining the thresholds.

The present invention includes a distributed control with pre-assignment methodology for threshold management. A distributed control approach is utilized rather than a dedicated cluster server coordinating free pages on the clustered servers. The clustered servers communicate with each other or with a fixed partner. Pre-assignment refers to pre-assigning free pages to each clustered server instead of keeping an absolute free page count only at a coordinator server and deltas at other clustered servers. The distributed control with pre-assignment methodology of the present invention enhances runtime performance while addressing implementation complexity and recovery issues as described below. Before discussing this methodology in greater detail, a general buffer zone optimization provided by the present invention will first be described.

Buffer Zone Optimization

In order to maintain the thresholds used by the present invention, some limits are maintained on the space usage on each clustered server. When the space usage reaches any of these limits, at least the space usage on this segment on this clustered server is put on pause (i.e., frozen). These limits ensure that even if all of the clustered servers reach the limits at the same time, the total free page count will not go far beyond the threshold level (exactly how far depends on the tolerance level on the threshold). When a segment is in a frozen (or "Freeze") state, the activities on the clustered servers will not be affected except for the processes that need to update the space usage.

If the space usage is not equally distributed among all clustered servers, it is possible that when one clustered server reaches a limit other clustered servers can rescue this server out of the Freeze state by performing a space adjustment. Performance of the system can be improved by reducing the frequency and duration of the Freeze state and the number of clustered servers that are involved in the adjustment. In addition, the pre-assignment of free pages methodology provides that when the free page count is approaching the limits (i.e., thresholds) there are an increasing number of adjustments between clustered servers. These adjustments may cause a lot of messages between the clustered servers and thereby impact system performance. Accordingly, a mechanism is provided to reduce this oscillation.

The present invention uses the following buffer zone optimization to resolve both the Freeze state and oscillation issues. Initially, a fixed buffer zone is defined for the limits. When space usage goes into the buffer zone, the clustered server takes appropriate actions without use of a Freeze state to get out of the buffer zone. Traditionally, if before the action is taken the space usage on the requesting clustered server reaches the limit, the segment would be put to a Freeze state. This would ensure that the space usage never got beyond the hard limit. The present invention provides for the clustered server to call for help before it reaches the limit, enabling space adjustment to be performed without putting the server into a Freeze state.

If all clustered servers are in the buffer zone, the present invention uses one of two approaches. The first approach provides for declaring the threshold to be crossed. The second provides for implementing a serialized way of using the space while the threshold level is strictly maintained (e.g., in case of the last chance threshold). Each of these alternatives will be briefly described.

If the threshold is declared crossed, the maximum distance between the real free page count and the hard threshold limit is (B*N), where B is the size of the buffer zone and N is the number of servers in this cluster system (e.g., three servers). When the threshold is considered crossed, the maximum distance between the user defined threshold level and the real total free page count is called the "tolerance level of the threshold".

Figure 9A:
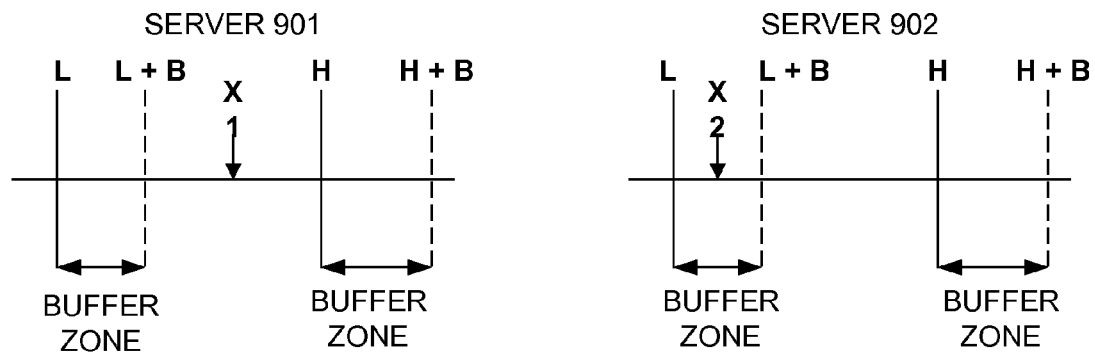
FIG. 9A is a diagram illustrating an example of the space usage of a segment on two clustered servers.

FIG. 9A is a diagram illustrating an example of the space usage of a segment on two clustered servers (server 901 and server 902). Each server has a low limit count L, a high limit count H, a buffer zone size B, and a local free page count X. As shown at FIG. 9A, the free page count on clustered server 902 (i.e., X2) is already in the buffer zone of the low limit (i.e., between L (the lower limit) and L plus B (the lower limit plus the buffer).

It is suggested to set the buffer zone limit to be close to the hard limits to avoid unnecessary adjustments or messages. For example, in the currently preferred embodiment ten logical pages is used as the size for the buffer zone given these considerations, although those skilled in the art will appreciate that other buffer zone sizes may be used, as desired. This buffer zone size is sufficient so that the clustered server will usually receive adjustment responses back before actually reaching the hard limit.

The distance between two thresholds is another consideration which influences the size of a buffer zone. Current systems usually require at least 128 logical pages between two thresholds on the same segment. With the buffer zone optimization provided by the present invention, a threshold is triggered at maximum (B*N) logical pages away from the actual user defined threshold level. When there are many clustered servers in a cluster system, (B*N) can be more than 128 logical pages. Thus, to prevent a threshold from being triggered when the free page count is above the next higher level threshold, the distance between the two thresholds is another factor which should be considered in determining the buffer zone size. Based on this consideration, another buffer zone size (B) calculation is made as follows: B=(distance between two thresholds)/N (where N is the number of servers in the cluster system).

In the currently preferred embodiment, the smaller of the above two results is used as the buffer zone size. For example, for two thresholds T1 and T2, where the threshold level of T1 is lower than T2, if the distance between T1 and T2 is 200 pages and the number of servers in the cluster system is 32, the buffer zone size based on the distance is (200/32)=6. Since 6 is smaller than 10, 6 will be used as the buffer zone size when the total free page count is between T1 and T2. (This implies that the buffer zone size can be changed when the threshold pointers are moved because one of the two thresholds is crossed.)

Figure 9B:
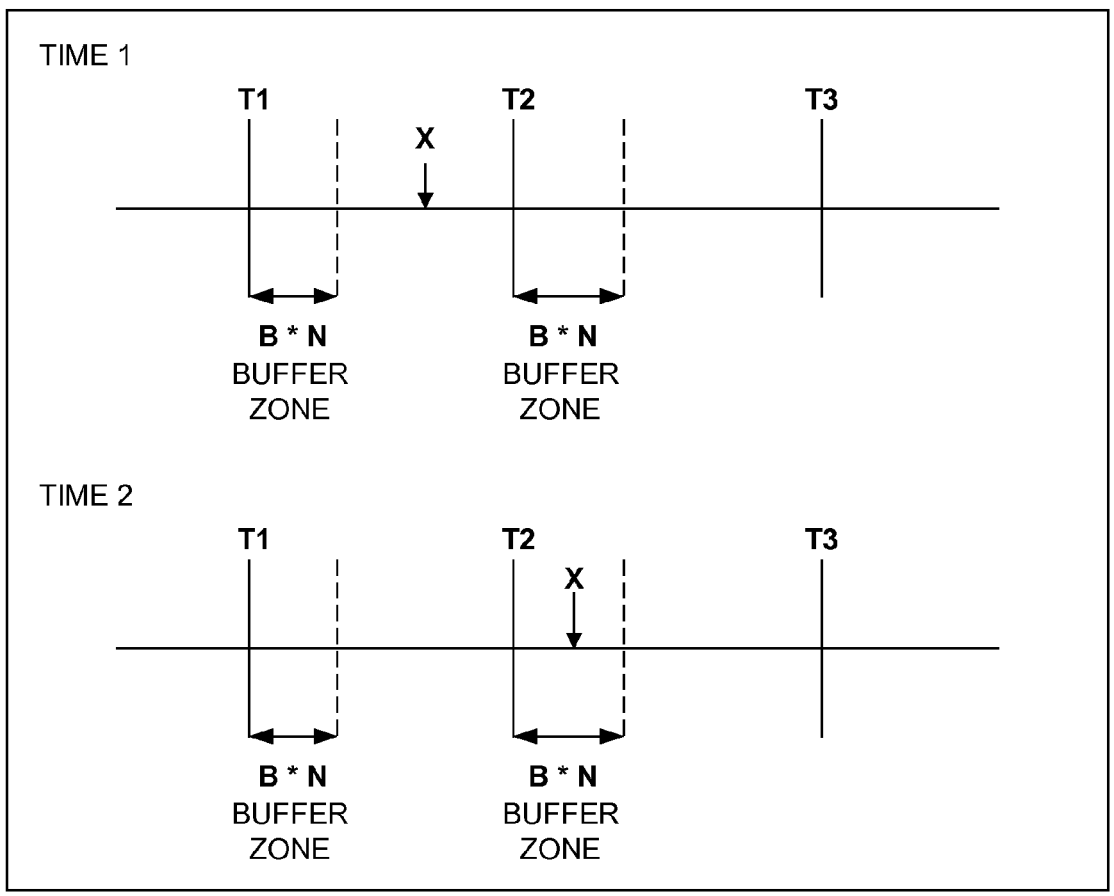
FIG. 9B illustrates three user defined thresholds and a free page count at two different times.

The present invention also provides that when a high threshold is crossed, the high threshold is made the new low threshold, and the threshold with the next higher level is made the new high threshold on the segment (if there is a higher level). The present invention also includes mechanisms to avoid oscillation. The total buffer zone for the hard limits is (B*N), and when the free page count drops below (B*N+low_threshold_level), the low threshold is considered crossed. If the same buffer pool is used for the high threshold, the following situation could occur. FIG. 9B illustrates three user defined thresholds (T1, T2, T3) and a free page count (X) at two different times (time 1 and time 2). As shown, if (B*N) is used as the buffer zone for the high threshold, threshold T2 is considered crossed when the free page count goes between T2 and the buffer zone as shown at time 2 at FIG. 9B. T2 will then become the new low threshold and T3 will become the new high threshold. In this case, without any space usage, the current free page count (X) is actually already in the buffer zone of the new low threshold (T2), and it is considered crossed.

To resolve this, a high threshold is not considered crossed and enabled as the new low threshold unless the current free page count is at least more than (B*N+high_threshold_level). However, even with this approach oscillation could continue to occur. If the total free page count equals (th_level+B*N), the high_threshold will be considered crossed and therefore it is made the new low threshold. The very next "net deduction of free space" could make every clustered server freeze and trigger this new low threshold. In order to avoid oscillation, a hysteresis cutoff is used when the high limit for each clustered server is calculated. In the currently preferred embodiment of the present invention, 64 pages is used as the predefined hysteresis cutoff value. Thus, the high limit on each clustered server is (B+(high_threshold_level+hysteresis)/N), and the low limit is (low_threshold_level/N), where N is the number of clustered servers.

The high limit is given a buffer zone for the same reason as the low limit was given a buffer zone. For example, if the buffer zone is B, when the high threshold is considered crossed and made the new low threshold, the distance between the real time free page count and the user-defined high threshold level is between (B*N+hysteresis) and (2(B*N)+hysteresis). The tolerance level for the high threshold is therefore (2*(B*N)+hysteresis).

Figure 10:
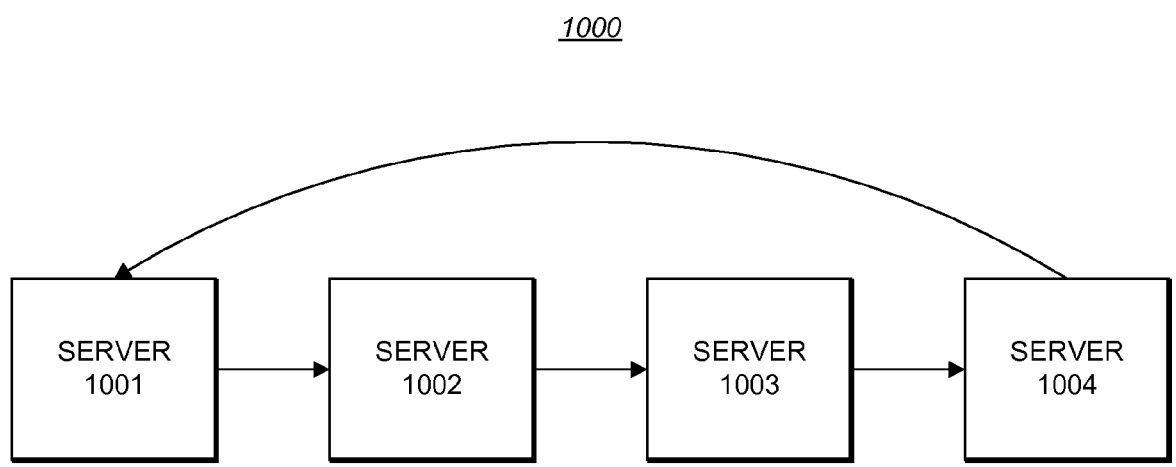
FIG. 10 is a block diagram illustrating the clustered servers and the direction of adjustment request messages among clustered servers.

The present invention provides for runtime threshold management to be maintained using a distributed control scheme with pre-assignment of free pages. The scheme has no coordinator, and each clustered server has a fixed partner to communicate with when there is a need for adjustment. FIG. 10 is a block diagram illustrating the clustered servers and the direction of adjustment request messages among clustered servers. As shown, the cluster 1000 includes four servers 1001, 1002, 1003, 1004. The arrows shown at FIG. 10 indicate the direction of adjustment request messages among the four servers. For example, server 1001 sends adjustment messages to server 1002. Most of the time, the thresholds and segments are managed locally within each clustered server (i.e., each clustered server works within their pre-assigned range of free pages). Each clustered server sends adjustment requests to its partner only when either the free page count is within a buffer zone (referred to as a "normal request"), or the free page count hits a "hard" pre-assigned limit (referred to as an "emergency request"). The purpose of these adjustment messages (i.e., normal requests and emergency requests) is to balance the free pages so that the activities on all clustered servers can continue until the total free page count crosses the threshold. When a normal request is sent out, the space usage activities do not stop. However, before an emergency request is sent out, the space usage on the affected segment is put into a Freeze state. The segment will be cleared from the Freeze state when the free page count is back within the allowed free page range. This can only happen upon receiving an adjustment reply message. The state of the segment is controlled in a status field in the segacct structure.

If the free page count goes into the buffer zone, a clustered server will send a "normal request" message to its partner for adjustment to balance the clustered servers pro-actively, thereby reducing the chance of a Freeze. The space usage on this clustered server will continue up to the limit. When a clustered server picks up a normal request message, it looks at its own free page count, and assumes the "worst case" on the requester when it does the calculation. The "worst case" on the requester is that when the calculation is performed, the free page count on the requesting clustered server is assumed to have hit the hard limit (i.e., L for lower bound, and H+B for higher bound). If the free page count on the receiving clustered server can enable both clustered servers to be out of the buffer zone, the receiving server will give half of the free pages to the requester. However, if the free page count on the receiving clustered server does not enable it to help (i.e., provide pre-allocated free pages to) the requester, the recipient will reply with 0 (zero) as the delta adjustment. No request forwarding is performed for normal requests.

In the normal request process, each clustered server sends an adjustment request to its partner only when the free page count is within a buffer zone. This communication requests an adjustment to balance the free pages so that the activities on all clustered servers can continue until the total free page count crosses the threshold. A normal request does not cause the space usage activities to stop. For example, the free page count on server 1001 (as shown at FIG. 10) may go into the lower bound buffer zone (i.e., the free page count x1<=(L+B)). In response, server 1001 sends a normal request message to server 1002. When server 1002 picks up the adjustment request message from server 1001, it looks at its own free page count (x2) under spinlock. Server 1002 assumes at this point that the free page count on server 1001 has hit the low limit L. Accordingly, if (x2+L)>2*(L+B), it can help by sharing half of its extra free pages (x2−(L+B))/2 with the requester (server 1001). If this is the case, server 1002 reduces its free page count to (x2−delta) and sends a reply message to server 1001 containing a delta (additional free page count for server 1001). When server 1001 picks up the reply message it applies the delta in the message to the current free page count (under spinlock).

As described in the above example, if a "partner" server can assist a requester, the partner generally calculates the delta by distributing the extra free pages equally between itself and the requester. The partner then sends an adjustment reply message(s) to the requester containing the delta to apply to the free page count on the requester. A problem may arise, however, when the partner itself is very close to (or in) the buffer zone, and therefore cannot assist the requester. Assume for example, the partner (e.g., server 1002 in FIG. 10 using the same example as above) receives an emergency request (e.g., from server 1001) when the partner itself is in (or near) the buffer zone. The present invention addresses this problem by providing for the partner (server 1002 in the above example) to bundle its own request with the original emergency request (from server 1001) and forward the bundled request to the next clustered server (e.g., server 1003 as shown at FIG. 10). Note that the intermediate clustered servers are not put into a Freeze state (i.e., non-freeze propagation). Since the intermediate clustered servers are not in a Freeze state when the emergency request is bundled and forwarded, it is possible that when the threshold is determined to be crossed, the real-time total free page count is actually more than the "tolerance level". The spinlock is released right after the threshold is determined to be crossed and the space count is updated immediately. Therefore, when a user sees the action of the threshold procedure, the real time free page count has already changed and can be beyond the threshold level.

Since an intermediate clustered server will still be updating the space usage, it can not contribute all of its current "extra" free pages (i.e., "extra" free pages=current free pages—the hard limit) in response to the request because this would have the same effect as putting the intermediate server into a Freeze state. Alternatively, if the intermediate server does not contribute any of its extra free pages, the whole cluster system will lose too many free pages. Therefore, the present invention provides that the intermediate clustered server contributes its current extra free pages until its free page count is B/2 away from the hard limit. This makes the space usage go into the buffer zone, but since the segment already has an outstanding request pending (the forwarded emergency request), no adjustment request message is sent out in this circumstance. In the request message a count is maintained of accumulated extra pages contributed by the intermediate clustered servers. When a server receives such a request and performs the check to see if it can help the requesters, it will count both the accumulated extra pages and the total free pages from all requesters. Since the intermediate server was not put into a Freeze state, the worst case is assumed which is that by the time the partner receives the request, the requester has reached the Freeze state. In other words, the limit value is used as the current free page count; although at that time the server still is B/2 away from the limit.

Figure 11:
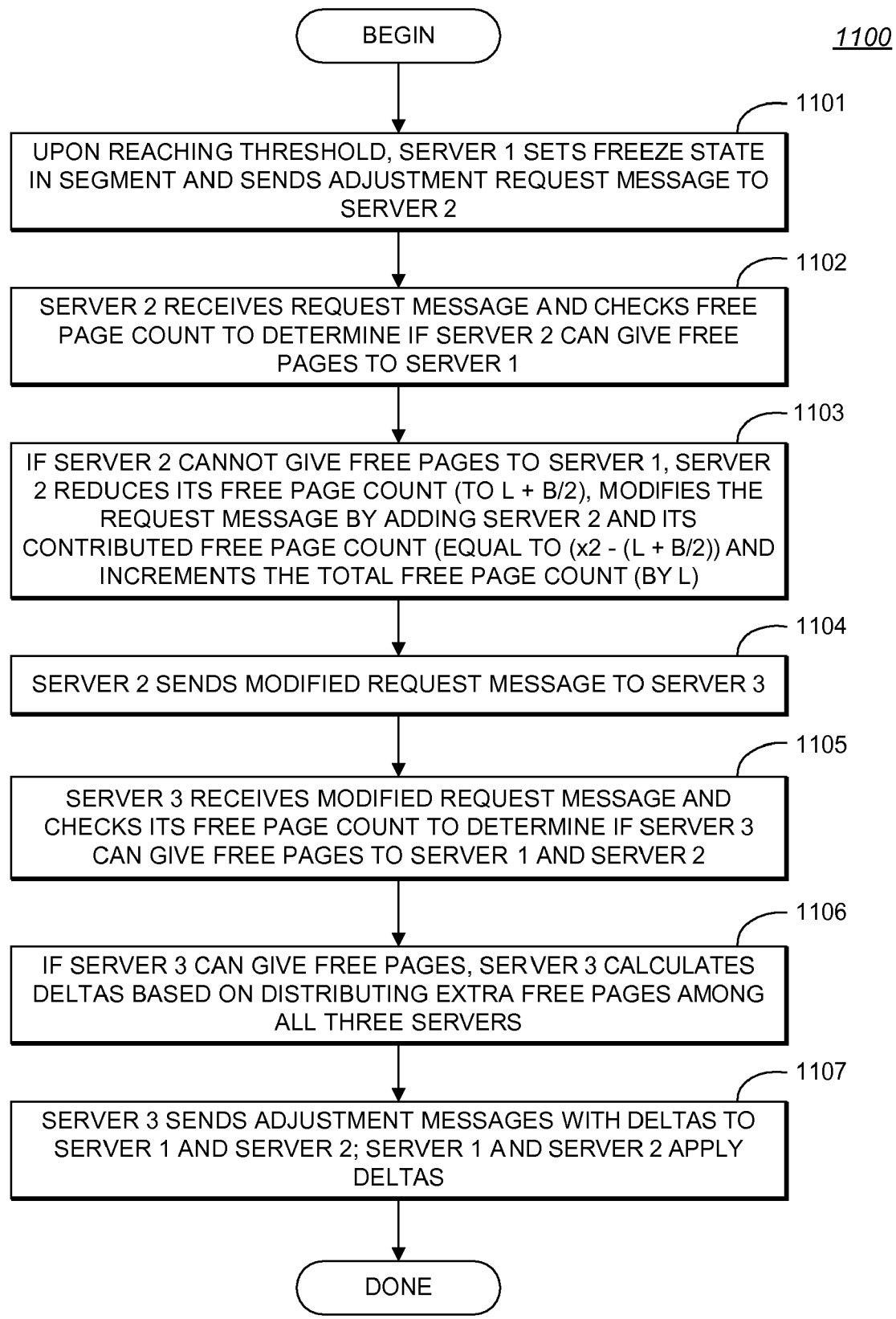
FIG. 11 is a flowchart illustrating an example of the handling of an adjustment request (e.g., emergency request) sent by a clustered server.

FIG. 11 is a flowchart 1100 illustrating an example of the handling of an adjustment request (e.g., emergency request) sent by a clustered server. The clustered server may, for example, send the request when the free page count hits a pre-assigned threshold. In the following example, there are three servers which are referred to as server 1, server 2, and server 3. In the following discussion x refers to the free page count, L refers to the low limit value (threshold), H refers to the high limit value (threshold), and B refers to the size of the buffer zone. Assume at the outset that server 1 has a free page count that reaches its low limit (i.e., x1=L). At this point, clustered server 2 is still in the allowed range: (L+B)<x2<H. Clustered server 3 is also still in the allowed range: (L+B)<x3<H.

In response to reaching the low level limit value (threshold), at step 1101 server 1 sets the Freeze state in the segment and sends an adjustment request message (emergency request) to server 2. The adjustment message (R1 (server 1, x1, 0)) includes the source of the message (server 1), and the free page count at server 1 (x1). At step 1102, when the threshold daemon thread on server 2 picks up the message R1, it looks at its current free page count (i.e., the current free page count x2 at server 2) to determine if it can help clustered server 1. Assume in this case that server 2 cannot help because it does not have sufficient free pages calculated as follows: (x1+x2+0)<=2*(L+B). At step 1103, server 2 reduces its free page count (by an amount equal to (L+B/2)), modifies the message with its contributed free page count (which is equal (x2−(L+B/2)), increments the total free page count by L, and records server 2 in the requester bitmap (i.e., the request bitmap of the modified message). At step 1104, server 2 sends the modified request message to server 3. The modified message (R1') now includes the following: ((server 1, server 2), x1+L, (x2−(L+B/2))).

At step 1105, server 3 picks up (receives) the modified request message and looks at its own free page count to determine if it can help (i.e., give free pages to) the other two servers (server 1 and server 2). More particularly, server 3 checks to determine if it can give free pages to the two requesters based on the following: if totalpgs_in_requesters+ (x2−(L+B/2))+x3)>3*(L+B)). If server 3 can help, at step 1106 server 3 calculates the deltas by distributing its extra free pages plus the accumulated extra free pages (i.e., those indicated in request message) amongst all three servers. At step 1107, server 3 sends adjustment messages directly to server 1 and server 2 with the delta for each of them. Server 1 and server 2 pick up the reply message (i.e., the adjustment message sent by server 3) and apply the delta indicated in the message. The Freeze state in the segment is cleared if the new free page count is in the allowed range (i.e., (L+B)<x<H).

It should be noted that the propagation of requests among clustered servers will stop when one clustered server finds out that its partner is actually one of the previous requesters. In this case, the clustered server will check with the threshold level and consider the threshold crossed. For instance, using the same example described above, assume that clustered server 3 determines that it does not have free pages that it can give to server 1 and server 2 (i.e., if (totalpgs_in_request+ (x2−(L+B/2))+x3)<=3*(L+B), server 3 cannot help the other servers). In this case, server 3 reduces its free page count to (L+B/2), modifies the request message to contain its request, and sends the modified request message (R1") to server 1. The modified message includes the following: ((server 1, server 2, server 3), x1+2L, x2+x3−2(L+B/2)). When server 1 picks up this message, server 1 determines that it is actually one of the previous requesters. Therefore, server 1 checks the total free page count in the request and compares it with the threshold level to determine that the threshold is crossed. Server 1 will apply the accumulated extra free pages to its local free page count and then it will fire the procedure, adjust the thresholds, and calculate the new limits. Server 1 will then send a reply message to all the requesters (i.e., server 2 and server 3) with the new threshold index numbers and the new limits. If there is no remaining threshold to adjust, it will set the new limits to the absolute low (i.e., 0) and absolute high (i.e., the segment size) for the segment.

At any time, a clustered server can have multiple adjustment requests that it needs to send out (i.e., to other server(s)). For instance, when a clustered server receives an emergency request it is possible that the same server has sent out a request and is waiting for a reply (the request could be an emergency request in which case the segment will be in a Freeze state, or a normal request). In another case, after a clustered server has sent out a normal request and before it gets the adjustment to move out of the buffer zone, it may reach the hard limit (threshold) which requires the server to send an emergency request. In both cases, when the clustered server tries to deal with the second request, the result of the calculation can be made invalid because of the reply to the first request. In other words, the clustered server cannot necessarily make a correct decision about whether it can give free pages in response to the second request until it receives a reply to the first request.

Consider the following scenario in which a clustered server has multiple requests that it needs to send. The same example of three clustered servers is used for purposes of this discussion. At the outset, assume that server 1 and server 3 are within the allowed range (i.e., $(L+B)<x1<H$ and $(L+B)<x3<<H$, with $x3==L+3B$). Also, clustered server 2 has reached the hard limit, with $x2==L$. When server 2 reaches the lower limit, it sends an emergency message R1 to clustered server 3 (R1 (server 2, x2)).

Meanwhile, the free page count on server 1 goes into the buffer zone and server 1 sends a normal adjustment message to server 2. Since server 2 is in a Freeze state, it cannot help server 1, so server 1 goes on without any adjustment. Subsequently, server 1 also reaches a hard limit (e.g., $x1==L$) and sends an emergency request (R2) to server 2. When server 2 picks up the emergency request (R2), server 2 determines that it cannot help as server 2 is in Freeze state. Server 2 then modifies the emergency request message (now, R2') to include server 2 and sends the modified message to server 3 ((server 1, server 2), x1+2, 0). At the same time, server 3 picks up the first adjustment request message (R1) from server 2. In this case, server 3 has a number of free pages that can be provided to server 2 (i.e., since $(x2+x3)=2L+3B>2*(L+B)$, server 3 can give free pages to server 2 in response to R1). Accordingly, server 3 distributes the available free pages between server 2 and server 3 in response to the first request. As a result, x3 becomes L+1.5B and the reply sent to server 2 includes L+1.5B as the new free page count. When server 2 receives the reply, it applies the delta to its free page count (i.e., L+1.5B). After applying the delta, server 2 is out of the buffer zone and clears the Freeze state. At the same time, server 3 picks up the second request which was modified and sent by server 2 (R2'). Server 3 examines its free page count and determines that it cannot help (i.e., based on $(x3+x1+x2)=3L+1.5B<3*(L+B)$). Server 3 then forwards the request to server 1. Since server 1 is one of the previous requesters, the threshold is considered crossed. However, at this point the whole cluster system actually has 3L+3B free pages which is enough for all three clustered servers to run. In this case the decision made at server 2 to forward the second request (emergency request R2) was incorrect because the first request R1 was still pending.

The present invention provides a solution to the above-described problem of multiple requests. When there is a pending request on a particular clustered server, the particular server does not deal with an incoming request or send out a request until the pending request is resolved. In this way, the decision made on the particular server is based on a count that will not be changed by a reply to a pending request.

The present invention provides for different treatment of multiple requests depending on the circumstances. When a clustered server picks up an emergency request from the receive queue, and it already has a pending request, it stores the emergency request locally until the reply comes back for the pending request. Alternatively, if the second request is a normal request (instead of an emergency request), the clustered server does not wait for the reply for the pending request. Instead, it replies without any adjustment. If a client process determines that the hard limit is hit, and there is already a pending request for this segment, it sets the Freeze state to prevent other processes from using more space, and then waits until the pending request is resolved. When the pending request is resolved, the free page count is examined again to determine if the server needs to send an emergency request. If the process at a given server finds that it is in the buffer zone when there is already a pending request, it does not send out the request and simply continues.

Another issue addressed by the present invention is the possibility of deadlocks in the distributed threshold management process. For instance, using the same example of three servers, all three clustered servers may hit the hard limit in the same segment at the same time. Each server then sets the Freeze state, the pending request state, and sends an emergency message to its partner. This can result in a deadlock situation as follows. For example, clustered server 1 may pick up a request (R3) from server 3. Since server 1 is in a Freeze state and has a pending request, it waits for its request (R1) to be resolved. Clustered server 2 then picks up a request from server 1 (request R1). As server 2 is also in a Freeze state and has a pending request, it waits for its request (R2) to be resolved. However, clustered server 3 is also in a Freeze state and has a pending request, when it picks up a request (R2) from server 2. As a result, server 3 also waits for its request (R3) to be resolved. The result of these multiple requests is a deadlock as this group of clustered servers are arranged in a circular way in terms of request direction. The solution provided by the present invention to prevent this type of deadlock situation is that the request direction is predetermined to always be from the server with the smaller ID to the server with the bigger ID. An exception is the clustered server with the biggest ID whose partner will be the clustered server with the smallest ID. This request direction can be used to prevent deadlock.

The present invention also uses a status in the segment for solving this deadlock problem. When the space usage at a server hits a hard limit, the segment has the Freeze status set and an emergency request is sent. If an intermediate clustered server cannot provide free pages in response to its partner's emergency request, the intermediate server forwards the request to its own partner and a "Forward" status is set in the segment. When the clustered server with the smallest ID picks up an emergency request while having a pending request, instead of waiting for the pending request to be resolved, this server (i.e., the one having the smallest ID) broadcasts a poll message to all other servers to ask for their status on this segment. If all other clustered servers reply with either a Freeze status or a Forward status, this clustered server determines the threshold is crossed. Otherwise, it waits for resolution of the pending request. Some of the data structures used in implementing the methodology of the present invention will next be described.

Unreserved Map

A clustered server is chosen as the coordinator, which instantiates the unreserved map by scanning all the devices or directly loading the saved information (e.g., from Sysusages). The scan during boot time does not require the synchronization that is needed during fail-over recovery. The coordinator then makes all of the other clustered servers have 0 as the start value for the unreserved page count for each disk piece. At runtime, the clustered servers keep deltas of space changes on the unreserved map.

The following illustrates the unreserved map for both disk pieces, after boot. Clustered server 1, which is the coordinator, has an unreserved page count (dbt_dunresvd) of 400 on disk 1 and 600 on disk 2. Clustered server 2 and clustered server 3 both have an unreserved page count (dbt_dunresvd) of 0 (zero) on disk 1 and an unreserved page count of 0 (zero) on disk 2. The process of defining thresholds and distributing free pages will next be described.

Segacct Structure

All of the thresholds defined for a database system are loaded into a dbt_thresholds structure. The segacct structure for each segment is filled in the following way. The coordinator clustered server in the cluster system (e.g., server 1 in this example) calculates the number of free pages for each segment based on the unreserved counts. For each segment, the coordinator determines the two thresholds that are immediately above and below the free page count and sets the appropriate status bits in the thresholds. The indices of these two thresholds in the dbt_thresholds array are stored in the segacct structure. If no threshold is defined for a segment, these are not set. If there is only one threshold for a segment, both indices are the same. The coordinator also calculates the low and high limits based on the thresholds levels and the buffer zone size. The coordinator equally distributes the free pages to each clustered server. The cached thresholds as well as the two threshold indices and the two limits are also sent to all clustered servers.

An example of the segacct structure for a clustered server is as follows. For instance, at the end of boot recovery on clustered server 1:
1) All thresholds are loaded into an array dbt_thresholds. This is an array of structure THRESHCACHE. Each row in Systhresholds is converted to an element of the array. For instance, the two thresholds on "user seg" (the example referred to above in this document) with levels 400 and 1500 are stored in slots 2 and 3, respectively, in the array.
2) The segacct unreserved pages are calculated based on the unreserved map as follows: 400+600=1000.
3) Search for thresholds on this segment. When the two thresholds (i.e., 400 at slot 2 and 1500 at slot 3) are found, set sg_thbelow_idx to 2 and sg_thabove_idx to 3.
4) Calculate the high and low limits based on the threshold levels and the buffer zones. For example: sg_low limit=400/3=133; and sg_high limit=TH_BUF_ZONE+ (1500+hysteresis)/3=10+521=531.
5) Calculate the free pages to be distributed to each clustered server. For example: assigned_space=1000/3=333; and sg_unreservedpgs=1000−(333*2)=334 (the free page count on the coordinator).
6) The coordinator propagates these in memory structures including dbt_thresholds and the index number of the thresholds cached in the segment. The coordinator also sends each clustered server the assigned free space and the high and low limits. The following illustrates the above segacct structure on each cluster server based on the above example:

--- server 1: sg_low_limit 133, sg_high_limit 531, sg_unreservedpgs 334
server 2: sg_low_limit 133, sg_high_limit 531, sg_unreservedpgs 333
server 3: sg_low_limit 133, sg_high_limit 531, sg_unreservedpgs 333

---

After the assignment is done, each clustered server works within its assigned space until there is a need for adjustment. When the threshold is crossed, the clustered server that determined a threshold has been crossed adjusts the threshold's pointers, recalculates the limits, and broadcasts the information to the other clustered servers.

At runtime, each clustered server updates only its local unreserved map. For each allocation the count is decreased, and for each deallocation the count is increased. Note that normally the count change is at extent level, (i.e., eight pages at a time, or seven pages if the extent is the first extent in an allocation unit.) When the system is politely shutdown the local counts are aggregated and unreserved information is written to Sysusages. Additionally, unreserved count is aggregated and the result is returned when a user issues an explicit query on the current unreserved page counts using a built-in function "curunreservedpgs( )".

In the case of a shutdown, no synchronization is needed because the system is down and there is no online activity. The coordinator gets all the unreserved counts from the participating clustered servers and calculates the total unreserved count for each disk piece. In the case of a runtime query, the database's space accounting does not need to be put into a Freeze state during the period of query. Instead, each clustered server retrieves the corresponding unreserved count under spinlock, and sends the result to the clustered server from which the query was issued. That clustered server calculates the total count under spinlock. For example, the following steps occur when a user queries the current unreserved count for disk piece disk 1 from clustered server 2.
1) Clustered server 2 sends messages to all other clustered servers to ask for the current unreserved map for Disk 1.
2) Upon receiving such a message, all clustered servers, under spinlock, get the unreserved count for the disk piece and send the count back to server 2 in a reply message.
3) Clustered server 2 adds the counts up after receiving all replies.
4) Clustered server 2 then returns the results to the client.

A slight drawback of this approach is that the difference between the result and the real time count may be somewhat larger than in prior art systems because of the exchange of messages among clustered servers. However, this is a minor issue given that some difference already exists in prior systems and users expect some lag between the count returned and the real time count.

Runtime Threshold Management in the Segacct Structure

The methodology of the present invention for threshold management relies on maintaining space accounting information locally, with adjustments made based on the periodic exchange of adjustment messages among servers in the cluster. After initial assignment, each clustered server controls the space accounting locally. The following will illustrate an example of free page count adjustments for three clustered servers (server 1, server 2, server 3). For example, assume the established thresholds include a low limit (L) of 133, a high limit (H) of 531, and a buffer zone size (B) of 10.

At the outset (time 0), assume that server 1 has 148 free pages (sg_unreservedpgs=148), server 2 has 400 free pages, and server 3 has 140 free pages. Based on the 140 free pages, the threshold of 133, and the buffer of 10, server 3 sets a "pending request" status bit and sends a normal request R1 to server 1, its partner. At time 1, server 1 picks up the request R1 and determines whether it can provide pages to server 3. It uses the "worst case" count for server 3 (i.e., the lower limit of 133) as follows: (148+133)<=143*2. In this case, it determines that it cannot help server 3, and replies to server 3 with 0 (zero) as the delta. Assume that at time 1, some deallocation also occurred at server 3 and its free page count is equal to 156.

At time 2, the count of free pages at server 1 is 140 (sg_unreservedpgs=140). Server 1 sets "pending request" and sends a normal request R2 to server 2. Server 2 continues to have sg_unreservedpgs=400. At server 3, it picks up the reply from server 1 at time 2 and clears the pending request bit. The count of free pages at server 3 is 156 at this point based on the delta (0) received in the reply (sg_unreservedpgs= sg_unreservedpgs+adjust_delta_pgs=156). At time 3, the count of free pages at server 1 drops to 132 and the "Freeze" bit is set in the segment. Since the "pending request" bit is on, server 1 waits for the reply to request R2 from server 2. Also at time 3, server 2 picks up request R2. Server 2 examines the local count of free pages and determines that it can give pages to server 1 (as 400+133>143*2). It calculates the free pages that can be allocated as follows: sg_unreservedpgs=(400+ 133)/2=266; and adjust_delta_pgs=400-266=134. Based on these calculations, server 2 sends a reply to request R2 to server 1.

At time 4, server 1 picks up the reply to request R2. It adds the delta indicated by server 2 to its count of free pages (sg_unreservedpgs=sg_unreservedpgs+adjust_delta_ pgs=266). The pending request bit is cleared at server 1 and the process that has been waiting (i.e., waiting for the reply to R2) is woken up. After the client process is woken up, the Freeze bit is cleared as the page count is now greater than the threshold (266>143).

Another example will illustrate the operations that occur when a "hard" threshold is crossed. In this example, assume that at time 0 server 1 has 132 free pages, server 2 has 148 free pages, and server 3 has 148 free pages. Based on the 132 free pages, the count at server 1 has crossed the threshold (lower limit) of 133 free pages. In response, server 1 sets a "Freeze" status in the segment and sends an emergency request R1 (server 1, 132, 0) to server 2, its partner.

At time 1, server 2 picks up the request R1 and determines whether it can provide free pages to server 1. Server 2 uses the count for server 1 (i.e., 132) and its own free page count (i.e., 148) for determining if it can help as follows: (148+ 132)<=143*2. In this case, it determines that it cannot help server 1, but it has extra pages it can contribute calculated as follows: 148-133-5=10. Server 2 sets its count of free pages to 138 (148-10=138) and creates a modified request R1' which includes the following information: ((server 1, server 3), 132+133=265, 10. Server 2 sends the modified request R1' to server 3.

At time 2, server 3 picks up the modified request R1' and determines that it cannot give free pages to server 1 and server 2 ((148+265+10)<=3*143). It creates a modified request R1" ((server 1, server 2, server 3), 265+133=398, 20) and sends the modified request R1" to server 1. Server 1 picks up the modified request R1" at time 3. Server 1 determines that it is one of the requesters. As a result, server 1 knows that all clustered servers have received the request. Server 1 checks the total free page count against the threshold level ((398+20- 400)<=3*10) and declares the threshold crossed. It applies the accumulated extra pages to the local free page count as follows: sg_unreservedpgs=132+20=152. Since there is no lower threshold, it makes the threshold of 400 the high threshold and calculates the new high limit=(400+64)/3+10=164. The new low limit is set to zero (0). These values are set in the local segacct structure. Server 1 then sends replies to the other requesters (i.e., server 2 and server 3).

At time 4, the lower threshold is set to zero and the higher threshold is set to 164 at all three servers. Also at this time the Freeze state is cleared as the count of free pages at all three servers is between the new low limit (0) and the new high limit (164). The adjustment is now complete and space usage may continue. The recovery time operations of the system will next be described.

Recovery Time

A threshold manager daemon thread provided by the present invention registers to receive notification of a NODE_DOWN affecting a clustered server. When a clustered server is down the threshold manager thread on each of the surviving clustered servers performs the following operations after CLM recovery:

1) sets a DBTH_FREEZE bit to suspend all activities involving space accounting and threshold management in the database.
2) a clustered server responsible coordinating for fail-over recovery is chosen. In the currently preferred embodiment, if the threshold coordinator server is still alive, it is selected as the clustered server responsible for fail-over recovery. If the failed clustered server was the coordinator, the new cluster coordinator server will coordinate the threshold manager recovery;
3) the chosen coordinator forms new requesting relationships among the clustered servers and broadcasts the coordinator information as well as the requesting relationship to all clustered servers;
4) each clustered server, when receiving the new relationship message, checks to see if its partner has changed. If a clustered server's partner has changed, this means that the old partner of this clustered server failed. This clustered server then checks each segment's status. For segments that are in a Freeze and Pending request state, this clustered server clears the pending request state and sets the Resend status, which makes it resend its request to its new partner after a short period of time if there is no other request going out; and
5) all clustered servers clear the DBTH_FREEZE bit to allow space usage to continue. During database recovery, activities involving space accounting are allowed to continue but the space accounting is handled differently than at runtime. A concurrent scan of all disk pieces is performed on the coordinator clustered server without blocking other activities. During the scan, special synchronization exists between the scanner and the other online activities. After the scan is complete, space accounting activities are suspended for a short period of time while the correct free space is calculated for each segment and the new assignment is preformed, after which the space accounting and threshold management are considered fully recovered and run as runtime.

The unreserved counts must be "recovered" to the correct values by the end of database recovery. During runtime operations, every clustered server, other than the coordinator, has only a delta representing the changes which happened locally since the last reset. The coordinator has the base value plus the local delta.

The correct total unreserved counts are calculated based on information from all of the clustered servers. Since a portion of the unreserved map on the failed clustered server was lost, either the delta value on the failed clustered server at the time of the crash needs to be "recovered" or all devices need to be scanned to count the total unreserved pages, as a system boot would accomplish. Halting all clustered servers while performing a scan of all devices is inefficient. Similarly, recovering the delta is very difficult because it is hard to establish a synchronous point in the log as a starting point to recover the counts. Therefore, the present invention provides for concurrent scanning of disk pieces with appropriate synchronization between the scanner and the concurrent updaters.

The following approach assumes that the disk pieces in the database are in the order of the logical page numbers. As previously described, each disk piece is a continuous block of physical storage containing one or more allocation units. Concurrent scanning dictates that the coordinator clustered server starts the scan after the redo pass of the database recovery is completed. The recovery process wakes up the threshold manager daemon thread to start the scan. (To avoid an external message, the clustered server for recovery and the coordinator clustered server are the same.) Before the scan starts, the coordinator sets the local unreserved count for each disk piece to the maximum free space the disk piece can have. The scan is performed by scanning the allocation units for each disk piece. The scanner maintains a "scan pointer" for each database (i.e., dbt_scan), which is the logical page number of the allocation page for the allocation unit that is currently being scanned or was just scanned. Each time the scan pointer is changed, the information is broadcast to all clustered servers which allows each of the clustered servers to cache it locally. The concurrent scan does not affect the performance of runtime activities.

The scan pointer is maintained in the following manner:
1) the scan pointer is set to MAXPGID during runtime. Before scan starts, the scan pointers on all servers are set to −1, the unreserved count on the server that does the scan are set to the total free space on the disk piece, and the corresponding unreserved counts for this disk piece on other servers are set to 0;
2) when the scan is active, the scan pointer is advanced under threshold spinlock to a new position after the scanner gets the SH_LATCH on the allocation page. The new scan pointer is broadcast to all clustered servers, and they subsequently update the local copy under threshold spinlock. Note that this broadcast is done asynchronously, (i.e., scan on this allocation unit starts without waiting for the responses to come back.) However, before a SH_LATCH on this allocation page is released, all responses must be received back;
3) the scan process updates the local unreserved count for the disk that contains this allocation unit. First it counts the number of reserved pages in this allocation unit. All pages in an extent are counted as reserved pages when the objid on the extent is nonzero, except for the first extent in the allocation unit. The allocation page itself is not counted even if the first extent is allocated. Second, under threshold spinlock, the unreserved count is decremented by this amount;
4) after the scan is complete on the current allocation unit the SH_LATCH is released, and the scan pointer remains unchanged until the next allocation page is latched; and
5) after all disk pieces are scanned the scan pointer is set to MAXPGID again.

The synchronization between the scanner and the updater (allocator/deallocator) is performed using the existing latching scheme on the allocation page. Before scanning an allocation unit, the scanner gets a SH_LATCH on the allocation page and holds the latch until the scan is done. Allocation and deallocation get an unconditional EX_LATCH on the allocation page before doing space accounting, and in the case of dedicated log databases the latch is not released until space accounting and the allocation page change are done. Thus, the latch is sufficient to block updaters from updating the space count for an allocation unit while it is being scanned.

The allocations/deallocations (i.e., updates) that occur during the scan are grouped into three potential categories. The synchronization and space accounting scenario for each category is as follows:
1) update is in the allocation unit that is being scanned. This is not possible because the latch on the allocation page that is held by the scanner blocks the change;
2) update is in an allocation unit that has been scanned. The scanner has performed the scan, updated the local unreserved count with the result of the scan, and released the SH_LATCH. The scan pointer is either advanced or is yet to be advanced to the next allocation unit. Thus, the allocation page number of this allocation unit is less than or equal to the scan pointer. Space accounting is done for this change (i.e., the local unreserved count is updated); and
3) update is in an allocation unit that is yet to be scanned. The allocation page number must be greater than the scan pointer. The space accounting will not be done for this change because the change will be counted by the scan later when this allocation unit is scanned.

In the currently preferred embodiment of the present invention the scan is started after the redo pass is completed. In the current allocation/deallocation scheme, recovery cannot make an assumption about whether the allocation page change was done at runtime or not when seeing an alloc-type (allocation type) record. In other words, when redoing such a record and trying to make a space change to an "already-scanned" allocation unit, recovery is unable to determine if the space change has already been counted by the scan, (in which case the allocation page change was on disk before the crash), or not. This is the case because the allocation page change is not timestamped. Even if a timestamp is applied to the allocation page change, since some locks on the allocation pages could be marked IN-DOUBT by the CLM recovery, and these IN-DOUBT locks can only be granted to recovery processes, the scanner will not be able to get these locks and therefore will be blocked. The IN-DOUBT locks are released at the end of the redo pass.

During recovery, the segment threshold guards the free space. One limitation this introduces is that during recovery, before the scan is complete, a user cannot query the current unreserved counts because the counts have not been recovered yet. The pseudo-code for a scanner is as follows:

```
 1: FOREACH_DISKMAP(DBT_DISKMAP(dbt), dmap, index)
 2: {
 3:     for (allocpg = DMAP_LSTART(dmap);
 4:          allocpg < DMAP_NEXT_LSTART(dmap);
 5:          allocpg += PGS_IN_ALLOC)
 6:     {
 7:         allocbuf = pg_get_alloc_page(alloc_sdes, allocpg, SH_LATCH);
 8:         P_SPINLOCK(dbt->dbt_thresh_spin);
 9:         dbt->dbt_scan = allocpg;
10:         V_SPINLOCK(dbt->dbt_thresh_spin);
11:
12:         async broadcast this change to all clustered servers.
13:         reservedpgs = pg_allocpg_extent_count(..);
14:         P_SPINLOCK(dbt->dbt_thresh_spin);
15:         local_unreserved_count −= reservedpgs;
16:         V_SPINLOCK(dbt->dbt_thresh_spin);
17:
18:         check to make sure the broadcast message has been successfully delivered;
19:         pg_release_alloc_page(alloc_sdes, allocbuf);
20:     }
21: }
22:
23: P_SPINLOCK(dbt->dbt_thresh_spin);
24: dbt->dbt_scan = MAXPGID;
```

-continued

```
25: V_SPINLOCK(dbt->dbt_thresh_spin);
26: broadcast this change to all clustered servers.
```

The pseudo-code for runtime allocation is as follows:

```
1: pg_allocate_near_target(..) or pg_allocate_log_pg(..)
2: {
3:   while (newpgno >= 0)
4:   {
5:     allocbuf = pg_get_alloc_page(alloc_sdes, allocpg, EX_LATCH);
6: ....
7:     if (allocated a new extent)
8:     {
9:       pg_th_reserve(..) to reserve 8 pages;
10:    }
11:  }
12: }
13:
14: pg_th_reserve(..)
15: {
16:   if (recovery process)
17:   {
18:     return;
19:   }
20:   verify allocation page is latched;
21:   th_accounting(..);
22: }
23:
24: th_accounting(..)
25: {
26:   P_SPINLOCK(thresh_spin);
27:   if (allocpgno <= dbt->dbt_scan)
28:   {
29:     update unrsvd count
30:   }
31:   check segment threshold;
32:   V_SPINLOCK(thresh_spin);
33: }
```

Note that the pseudo-code for runtime deallocation is similar, except that space accounting is handled in a different function, pg_th_unreserved.

Special Synchronization During Scan for Mixed-Log-Data Segment

The present invention provides for special synchronization during a scan for mixed-log-data (M-L-D) segments. In M-L-D segments, during allocation the latch on an allocation page is released after the count is updated and before getting the buffer for the new page. The latch is then reacquired and the allocation page change is made. This creates a window between the time when the count is updated and when the allocation page is made. For example, consider the following scenario with time flowing from time t0 to time t5:

t0: T1 tries to allocate a page. It latches the allocation page P1 and finds a new extent.

t1: T1 calls the threshold function to register this allocation. Since the scan pointer is lower than P1 (dbt_scan==P0), it does not update the unreserved count.

t2: T1 sets the reserved bit for this page in the extent which prevents the extent or page to be allocated by others. It then releases the latch on P1, and goes ahead and logs the allocation.

t3: The scanner moves to this allocation unit. The scanner gets the latch on P1 and starts reading the allocation page. Since the allocation by T1 has not modified the allocation page yet, it does not count that extent that was allocated by T1.

t4: Scanner completes the scan of P1 and releases the latch.

t5: T1 gets the latch on P1 again to modify P1 to reflect this allocation. However, it will not update the count for this allocation again.

The net result is that this allocation by T1 is not counted by the scanner. To address this problem, the system of the present invention provides a status bit that is used to prevent the scanner from starting a scan if an allocation on a M-L-D segment is in process.

A status field is provided in the physical lock object for allocation pages. Before an allocator releases the latch on an allocation page, it sets the PG_MLD_ALLOC bit in the status field in the lock value block in the physical lock for this allocation page. Before a scanner tries to get the latch on an allocation page, it first gets the lock value block for this page and checks on the bit. If the PG_MLD_ALLOC bit is set, it does not get the latch, but rather waits for some period of time and then retries. If the bit is not set, it gets the latch, checks the status in the lock value block again, and goes ahead and scans the allocation page.

Pseudo-code for data allocation in a M-L-D segment is as follows:

```
1: pg_allocate_near_target(..)
2: {
3:   while (newpgno >= 0)
4:   {
5:     if (MLD)
6:     {
7:       clm_get_value(lock_on_allocpg, status);
8:       if (status & PG_MLD_ALLOC)
9:       {
10:        goto retry;
11:      }
12:    }
13:    allocbuf = pg_get_alloc_page(alloc_sdes, allocpg, EX_LATCH);
14:    if (MLD)
15:    {
16:      clm_get_value(lock_on_allocpg, status);
17:      if (status & PG_MLD_ALLOC)
18:      {
19:        release latch on allocpg;
20:        goto retry;
21:      }
22:    }
23: ....
24:    if (allocated a new extent)
25:    {
26:      pg_th_reserve(..) to reserve 8 pages;
27:    }
28:  }
29: }
30: pg_allocate_completion
31: {
32:   pg_getpgbuf( ) to get the buffer for the new page;
33:   {
34:     if (MLD)
35:     {
36:       alloc_status |= PG_MLD_ALLOC;
37:       clm_set_value(lock_on_allocpg, alloc_status);
38:       release latch on allocpg;
39:     }
40:   }
41:   pg_log_page_allocation( ) to log the ALLOC;
42:
43:   if (MLD)
44:   {
45:     allocbuf = pg_get_alloc_page(alloc_sdes, allocpg, EX_LATCH);
46:
47:   }
48:
49:   pg_pgalloc( ) to modify AP to reflect this allocation.
50:
51:   if (MLD)
52:   {
```

-continued

```
53:      alloc_status &= ~(PG_MLD_ALLOC);
54:      clm_set_value(lock_on_allocpg, alloc_status);
55:    }
56:    release latch on allocpg;
57: }
```

Pseudo-code for the scanner is as follows:

```
1: FOREACH_DISKMAP(DBT_DISKMAP(dbt), dmap, index)
2: {
3:    for (allocpg = DMAP_LSTART(dmap);
4:            allocpg < DMAP_NEXT_LSTART(dmap);
5:            allocpg += PGS_IN_ALLOC)
6:    {
7:      retry:
8:      if (MLD)
9:      {
10:        clm_get_value(lock_on_allocpg, status);
11:        if (status & PG_MLD_ALLOC)
12:        {
13:          uppause(0.5 seconds);
14:          goto retry;
15:        }
16:      }
17:      allocbuf = pg_get_alloc_page(alloc_sdes, allocpg, SH_LATCH);
18:
19:      if (MLD)
20:      {
21:        clm_get_value(lock_on_allocpg, status);
22:        if (status & PG_MLD_ALLOC)
23:        {
24:          release latch on allocpg;
25:          uppause(0.5 seconds);
26:          goto retry;
27:        }
28:      }
29:
30:      P_SPINLOCK(dbt->dbt_thresh_spin);
31:      dbt->dbt_scan = allocpg;
32:      V_SPINLOCK(dbt->dbt_thresh_spin);
33:
34:      async broadcast this change to all clustered servers.
35:      reservedpgs = pg_allocpg_extent_count(..);
36:      P_SPINLOCK(dbt->dbt_thresh_spin);
37:      local_unreserved_count -= reservedpgs;
38:      V_SPINLOCK(dbt->dbt_thresh_spin);
39:
40:      check to make sure the broadcast message has been successfully delivered;
41:      pg_release_alloc_page(alloc_sdes, allocbuf);
42:    }
43: }
44:
45: P_SPINLOCK(dbt->dbt_thresh_spin);
46: dbt->dbt_scan = MAXPGID;
47: V_SPINLOCK(dbt->dbt_thresh_spin);
48: broadcast this to all clustered servers.
```

Segment Count Recovery

The present invention also provides a method for segment count recovery. When a clustered server crashes the current free page count (sg_unreservedpgs) in the local segacct structure is lost. However, the clustered server does not exceed the limits at the time of the crash. Since recovery does not require more space than what has already been accounted for at runtime, during recovery the failed clustered server is assumed to have reached the low limit. The surviving clustered servers perform the adjustments among themselves. The recovery process does not update the segacct space accounting for data segments because it is already accounted for. As for log segments, the redo pass of recovery will reserve space needed for rolling back incomplete transactions and the reserved space is remembered in dbt_plcspace, but the allocation/deallocation does not update the segacct structure.

After a redo pass, the scan starts and scans all the devices to get the correct unreserved page count for each disk piece. After the disk scan is complete, the database is set to a DBTH_FREEZE state again, the unreserved map is aggregated, and the coordinator calculates the unreserved page count for each disk piece as well as for each segment, after which a new assignment is performed by the coordinator. The methodology of the present invention allows the online activities to run while a failed clustered server is being recovered, but it could potentially cause false threshold firings because all of the last assigned space to the failed clustered server is considered reserved until the redo is complete.

Special Space Management for Log Segment

The present invention provides a special space management methodology for log segments. In addition to normal allocation/deallocation, another runtime activity also changes the free page count in the log segment, which is a log space reservation. At the end of fail-over recovery when the coordinator determines how much space to give to each clustered server for each segment, it considers the reserved log space for a log segment. The free space on the dedicated log segment is calculated and maintained differently than for other segments. Instead of using the unreserved counts of the disks belonging to this segment, an optimized approach is taken to measure the free space on the dedicated log segment. In the cluster system of the present invention this optimization is implemented as described below.

At runtime, a global object lock controls the end of the log in addition to the log semaphore, which controls concurrent access to the end of the log. The lock value block of this global object lock contains the value for dbt_logallocs field (i.e., "dbt_logallocs".) This field has type PERPETUAL_COUNTER (8 bytes).

When a clustered server acquires this lock, it gets the dbt_logallocs value from the lock value block and put it in local dbt. When log pages are allocated, the value of this field is incremented. When the object lock is released, the dbt_logallocs in dbt is copied back to the lock value block.

There are no changes at checkpoint time. When the checkpoint record is made permanent in the log (i.e., the node has already obtained an EX lock on this end-of-log object lock), the value in the dbt_logallocs in dbt is copied to dbinfo->dbi_logallocs_at_ckpt when the checkpoint marker is made to dbinfo->dbi_checkpt.

Log deallocation does not require much change compared to prior art systems. The log deallocation happens at the clustered server where the dump tran is issued and as part of the dump tran transaction, as does the update of dbi_logdealloc in dbinfo.

The runtime threshold management for dedicated log segments is the same as for other segments (i.e., after initial assignment each clustered server records the space usage locally). If the local limit is hit, adjustment is done or the threshold is fired.

The method for log space reservation at runtime remains similar to that of prior art systems (e.g., SMP systems). The space is consumed from the local sg_unreservedpgs from the log segment.

During fail-over recovery, all other steps taken for the log segment are the same as for other segments, except for how and when the total free space is calculated. For dedicated log segments, the log free space is calculated before the database recovery with the help from the cluster lock management (CLM). This calculation is performed at the coordinator clustered server. For mixed-data-log segments, the free log space is obtained the same way as other data segments (i.e., by scanning the disk pieces). However, an additional solution is needed to address the issue of the space usage by the log space reservation in log segments.

The space usage by the log space reservation is not accounted for by the disk piece scan (in the case of mixed-log-data) or by the value in dbt_logallocs (in the case of dedicated log segments). The value of free log pages is only what is available on disk. Some portion of this free space is taken away by the log space reservation and it needs to be accounted for as used space when the space is assigned to each clustered server. The number of log pages that are reserved in one clustered server is obtainable from dbt->dbt_plcspace. For runtime activities, the log space reservation is remembered in dbt->dbt_plcspace. This is done locally. The recovery process makes log reservations for the CLRs during the redo pass for each log record that belongs to an incomplete transaction. (Note there is no need to do log space reservation for PLCs because the records are already in the log.) The present invention provides that when the recovery process does the reservation it does not update the corresponding free page count (sg_unreservedpgs) in the log segment, but only updates the dbt->dbt_plcspace in the recovery clustered server.

The pseudo-code change for th_log_lct_reserve( ) is as follows:

```
1: th_log_lct_reserve( )
2: {
3:    P_SPINLOCK(thresh_spinlock);
4:    if (Not RECOVERY process)
5:    {
6:       segp = &dbt->dbt_seg[LOG_SEGMENT];
7:       th_check(...);
8:    }
9:
10:   dbt->dbt_plcspace += alloc;
11: ...
12: }
```

For other segments, the assigned space is calculated based on the total free page count and the threshold level. For log segments, the dbt->dbt_plcspace also plays a part in the calculation. Consider the following example which assumes the threshold level for the log segment is 100. In this example the free log space on disk on server 1 is 400 (i.e., sg_unreservedpgs=400 and dbt->dbt_plcspace is 10. On server 3, the free log space is not available as free log space is only calculated on the coordinator clustered server. Also, dbt->dbt_plcspace is 5 on server 3. The assigned log space on each clustered server is still calculated based on the free log space on disk (e.g., sg_unreservedpgs=400/2=200). However, among the assigned space the portion represented by dbt_plcspace is already used, so it is taken out of the free space on each clustered server (i.e., sg_unreservedpgs=assigned_space-dbt_plcspace (for a clustered server)). Accordingly, sg_unreservedpgs is equal to 190 for clustered server 1 (200-10=190) and is equal to 195 for clustered server 3 (200-5=195).

The process of calculating the free log space for a single log generally proceeds as follows:

1) before recovery starts (i.e., the database is in DBTH_FREEZE state and the CLM does not grant any locks) the coordinator clustered server calculates the most current dbt_logallocs while identifying the last log page. (The CLM has information on where the end-of-log object lock was when the crash happened). If the lock was held by the failed clustered server the CLM marks the lock IN-DOUBT. Then, a rec_logbounds( ) function is called to determine the correct last log page. It uses the stale value in the lock value block as the start of the scan and follows the log page chain to the end of the chain. It updates the local dbt->dbt_logallocs with the number of log pages it scanned and then uses it to update the dbt_logallocs in the lock value block. Otherwise, if the lock was not held by the failed server, the coordinator has the information about which clustered server is the current owner of the lock. In this case, the clustered server that owns the lock updates the dbt_logallocs field in the lock value block with the local dbt_logallocs value to give an exact number of log pages allocated. At this point, the dbt_logallocs in the value block of the global end-of-log object lock is set correctly and the end of the log is identified.
2) Next, the database's DBTH_FREEZE state is cleared. The database recovery process, as well as online activities, will continue to run. During this period of time, the threshold management of the log segment is similar to other data segments.
3) At the end of redo, disk pieces are scanned, new unreserved pages for all segments except the dedicated log segment are calculated, and the free space for the log is calculated.
4) For the dedicated log segment, the clustered server that does the reassignment (i.e., the new cluster coordinator server) will acquire the end-of-log object block, and therefore get the dbt_logallocs value from the lock value block. The free log pages are then calculated.

Overview of Improved Post-Commit Processing Methodology

Another challenge in a database management system is the management of data pages. It is common for a contiguous chunk of pages to be managed by a single page. Such an example is the allocation page in a database server that manages a contiguous chunk of 256 pages called an allocation unit. The allocation page (AP) keeps track of data pages that are allocated, being deallocated, and free. Typically, a pair of bits, the "alloc bit" and the "dealloc bit" in the allocation page, represent the state of a data page.

During runtime operation of the database, when a page is allocated, the alloc bit in the allocation page is set. During deallocation of the page, the dealloc bit is set and the alloc bit is cleared. When the transaction commits the dealloc bit is cleared. This is known as "post-commit work" or "post-commit processing". If the transaction were to rollback all that is needed is to clear the dealloc bit and set the alloc bit.

After a crash of a database, recovery has exclusive access to the database being recovered. Allocations and deallocations are handled by setting and clearing the alloc and/or dealloc bits in the allocation page during redo/undo passes of recovery. At the end of recovery, the dealloc bits are cleared. This approach for post-commit processing works well provided that recovery is the only one working on the database.

In a clustered database server environment, when an instance of a database server goes down, another instance typically recovers the server that went down. During such a recovery (called failover recovery), the databases continue to be online and other cluster servers continue to access the database. Hence data pages, notably the allocation page, continue to be accessed by other servers in the cluster of database servers. This presents a unique challenge for post-commit processing during recovery as recovery does not have exclusive access to the database. A fundamental problem to address in this type of distributed environment is how to determine when to clear the dealloc bits in the allocation page during recovery.

A simple, non-optimized, way to perform post-commit processing in a distributed environment is to log the post-commit processing. During runtime operation of the database, one can log the changes made to the allocation page as a result of clearing the dealloc bits after a transaction commits. During recovery, a decision can be made about whether post-commit changes have been affected or not by looking at the timestamp on the allocation page. However, this approach of using logging adversely impacts system performance as it necessitates logging for every allocation page affected for every transaction (as well as managing this process).

The present invention provides an optimized solution for post-commit processing that avoids logging. The system and methodology of the present invention applies a series of rules in managing the deallocation of pages in a running cluster system to take into account the fact that database server instances may occasionally crash. This approach is further optimized by making use of the above-described Cluster Lock Manager (CLM) to provide for maximum concurrency by storing relevant information to determine the state of the page in its life cycle at the time of the crash. This avoids movement of pages across the cluster and avoids the potential for deadlocks.

At a high level, the rules that are provided by the present invention for managing deallocation of pages can be summarized as follows. Initially, if the ownership of a dealloc bit in an allocation page (AP) can be established to a log record, and the dealloc has committed, the dealloc bit can be safely cleared. For this rule to correctly apply, the following assertions should hold true:

1) The deallocation (dealloc) has to be committed.
2) The dealloc bit has to be set.
3) For the class of dealloc log records, determine if the allocation page (AP) needs to be redone. If the AP needs to be redone during recovery, then the AP is from the present and post-commit work needs to be performed.
4) During failover recovery, consult the CLM to determine the existence and state of the data page in the cluster. This approach exploits the assertion that there can be no deallocated page in the cluster with a timestamp higher than the timestamp on the allocation page.

Allocation of Pages During Runtime Operation of Database

In a non-clustered database server environment, post-commit processing (i.e., the above-described changes to an allocation page) is typically performed without logging as recovery generally has exclusive access to the database being recovered. Allocations and deallocations are handled by setting and clearing the alloc/dealloc bits in the allocation page during the redo/undo passes of recovery. At the end of recovery, the dealloc bits are cleared and extent zapped if necessary. This process for post-commit processing works well in this environment as recovery is the only instance working on the database.

In a clustered environment, however, when a clustered server is being recovered, the database continues to be online and other servers may continue to access the database. Hence, pages (notably the allocation pages) continue to be accessed by other servers in the cluster. As a result, the aforementioned approach will not work correctly in many instances as illustrated by the following examples.

In the first example (Example 1), Transaction T1 allocates page P1 on Node N1. It does some work and then deallocates the same page P1. As part of the deallocation, the dealloc bit is set and the alloc bit is cleared on the allocation page (AP). Assume that the timestamp on the AP due to this change moves from 1000->1010. The transaction then commits. Before post-commit work is performed, more work is done by other transactions on the allocation page of P1. This work may, for example, be due to allocation and deallocation of other pages in this allocation unit that are not related to Transaction T1. As a result of these other transactions, the timestamp on the allocation page may, for instance, change to 1100. Also assume that the server then crashes before the post-commit work is performed on the AP as illustrated in the following table:

EXAMPLE 1

| Action | Page TS | AP TS |
|---|---|---|
| Begin Tran T1 on Node N1 | | |
| ALLOC P1 . . . | | |
| DEALLOC P1 | 100 | 1000->1010 |
| COMMIT T1 | | |
| More work on AP | | 1100 |
| Node N1 Crashes | | |

As a second example (Example 2), assume that Transaction T1 allocates page P1 on node N1. It does some work and then deallocates the same page P1. As part of the deallocation, the dealloc bit is set and the alloc bit is cleared on the allocation page (AP). Consider the timestamp on the AP due to this change to be moving from 1000->1010. The transaction then commits and post-commit work is performed. Note that since this is a non-logged operation, the timestamp does not go forward. Assume that the node N1 then crashes. The page P1 gets allocated in Node N2 by a transaction T2. It also gets deallocated in Node N2 and transaction T2 commits. Due to changes in the AP by this transaction and by other transactions the timestamp is considered to have moved to 1100 as illustrated below:

EXAMPLE 2

| Action | Page TS | AP TS |
|---|---|---|
| Begin Tran T1 on Node N1 | | |
| ALLOC P1 | | |
| . . . | | |
| DEALLOC P1 | 100 | 1000->1010 |
| COMMIT | | |
| post-commit WORK | | |
| More work on AP | | |
| Node N1 Crashes | | |
| Begin Tran T2 (in Node N2) | | |
| ALLOC P1 in Node N2 | | |
| DEALLOC P1 | | 1100 |
| COMMIT T2 | | |

After the crash, the system cannot determine based on AP timestamps whether the dealloc bit set on the allocation page is due to Transaction T1 whose post-commit work is not yet completed as in Example 1, or possibly to another Transaction T2 as in Example 2. Those skilled in the art will appreciate that there are a number of other variations of the above examples that may also involve this problem of determining when to clear the dealloc bits in the allocation page during recovery. The present invention provides a solution to this problem which can be defined as follows: "During recovery, how can one decide when to clear the dealloc bits in the allocation page?"

Design of Post-Commit Processing Solution

The following observations can be made with regards to addressing the above problem of determining when to clear the dealloc bits in the allocation page during recovery. An initial observation is that this problem exists only for committed transactions and does not apply to aborted transactions and incomplete transactions. During recovery, aborted transactions are addressed by the CLRs in the redo pass and the CLRs logged in the undo pass address the incomplete transactions.

Also, any solution to this problem needs to handle multiple page/extent deallocations as indicated by log records such as XREC_DEALLOCM, XREC_DROPEXTSMAP, XREC_SOPGDEALLOC, XREC_LOGDEALLOC in addition to the single page deallocations represented by the XREC_DEALLOC log records. This complete group of log records is referred to in the following discussion as "the class of dealloc records".

The solution provided by the present invention can be summarized as follows. For committed transactions, during redo, the following question is asked for the class of dealloc records if one sees the deallocation bit set in the allocation page: Does this deallocation bit (also referred to herein as the "dealloc bit" or "deal bit") represent the changes due to this log record? If so, since the transaction is committed, the dealloc bit is cleared. This can be expressed in a rule as "if the ownership of a dealloc bit in an AP can be established to a log record, and the dealloc has committed, then the dealloc bit can be safely cleared".

For the above rule to be correctly applied, the following assertions should hold true. The system and methodology of the present invention provides for traversing through these assertions to establish the rule:
1) The dealloc has to be committed.
2) The dealloc bit has to be set.
3) A basic integrity check (objid/indid/ptnid) between the log record and the extent should hold true.

The present invention also uses two optimizations to help determine the correct application of the rule:
1) For processing the class of dealloc log records determine if the AP needs to be redone. If the AP needs to be redone during recovery, then the AP is from the present and post-commit work should be performed.
2) During node recovery, the CLM is consulted to determine the existence and state of the data page in the cluster. The present invention exploits the assertion from the distributed timestamp methodology of the present invention that "there can be no deallocated page in the cluster with a timestamp higher than the timestamp on the allocation page".

The approach of the present invention is based on identifying only those deallocations that need post-commit processing. The solution leverages the fact that allocation pages are time stamped in the cluster server. It follows a logical approach and avoids additional logging (and the performance overhead associated with logging). The solution provides for maintaining a transaction table for committed transactions with deallocations (deallocs). By restricting this table to only transactions with deallocations, the size of the table is limited. Given that post-commit processing is only done on an as-needed basis, the solution has no significant impact on system performance.

Single Page and Multiple Page Deallocations

The following discussion describes the high-level design of the solution, addressing single page deallocations first and extending the solution to multiple page deallocations. For each, both crash recovery, after the whole cluster comes down, and node recovery, where one node fails and a second node recovers the failed node, are discussed.

The XREC_DEALLOC log record represents single page deallocations. The page header of the page to be deallocated at the time of deallocation is stored in the XREC_DEALLOC log record. The log record also stores the allocation page's old and new timestamps.

The log records that involve multiple page deallocations include the following:
XREC_DEALLOCM: multiple page deallocations in an allocation unit, caused by online index reorganization.
XREC_DROPEXTSMAP: Multiple extents dropped during drop table or truncate table.
XREC_SOPGDEALLOC: Deallocation of pages during sort or other actions.
XREC_LOGDEALLOC: Log page deallocations during log truncation.

For multiple page deallocations, the log records store the bitmap of pages being deallocated (XREC_DEALLOCM) in an allocation unit or the allocation/deallocation maps (XREC_DROPEXTSMAP). Also, as part of the above-described distributed timestamp methodology of the present invention, allocation pages are time stamped. In addition, the allocation page timestamp is incorporated into the XREC_DROPEXTSMAP and XREC_SOPGDEALLOC log records.

Single Page Reallocations During Crash Recovery

Figure 12:
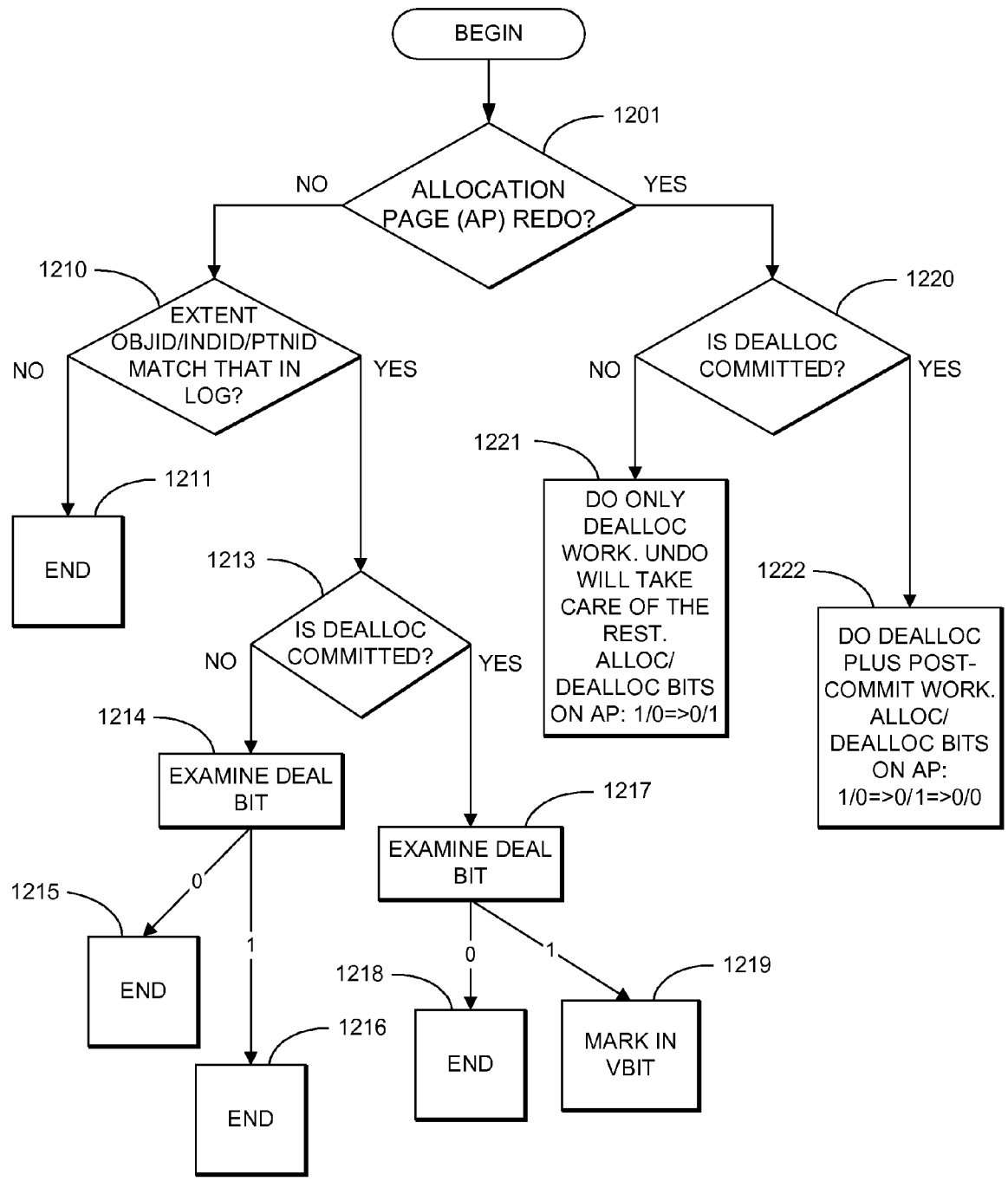
FIG. 12 is a high-level flow diagram illustrating the method steps of the present invention for single page deallocation during crash recovery.

FIG. 12 is a high-level flow diagram 1200 illustrating the method steps of the present invention for a single page deallocation during crash recovery. During processing of the dealloc record in the redo pass, a check is made as shown at 1220 to determine whether the dealloc is committed and AP changes need to be redone. The check made at 1220 determines if AP changes need to be redone by checking whether the dealloc is committed. If the dealloc is committed, then the dealloc is redone and necessary post-commit work is also performed for committed deallocs as illustrated at 1222.

However, if the dealloc is not committed at 1220, then only the dealloc work is done at 1221. It should be noted that for aborted or incomplete transactions only the dealloc is redone and the approach of the present invention is to let the undo pass (or redo of CLRs) handle further processing in the case of aborted or incomplete transactions.

Referring back to 1201 at FIG. 12, if an allocation page (AP) does not need to be redone, then the AP is from the future. In this event, the methodology of the present invention provides for determining if post-commit processing needs to be performed. First, a fundamental integrity check is performed as shown at 1210 at FIG. 12 to determine if the objid/indid/ptnid in the extent matches the one in the log record. If the integrity check fails, the process ends (exits) as provided at 1211 as the fact that the log record does not match the extent information indicates that the wrong point in time is being examined. However, in the event of a match at 1210, a check is made at 1213 to determine if the dealloc is committed.

If the dealloc is committed at 1213, the dealloc bit (deal bit) is examined at 1217. If the dealloc bit is set (i.e., deal bit set to 1), ownership needs to be established by finding out if this is the dealloc record that should be associated with the bit or if it is in the future. For example, this dealloc bit may represent a future deallocation that is not committed. Note that since post-commit is not a time stamped action, there is no way of physically determining if post-commit processing has been completed. Hence, an approach of setting a bit for this alloc unit in the recovery vbit map is used as provided at 1219. In addition, the status of the transaction is associated with the extent. These allocation units are visited at the end of redo and undo passes to clean up the deallocation bits. If the dealloc is not committed, there is nothing further to do from a post-commit processing perspective and the process ends (exits) as provided at 1214-1216.

The following summarizes the result of the above steps when an AP does not require redo. At 1219, the dealloc bit is set for a committed deallocation. This can be from the future or the remnants of an uncompleted post-commit operation. The vbit is marked and will be cleared at the end of the redo pass for extents touched by completed transactions and at the end of undo pass for all transactions. At 1218, there is nothing more to do as the dealloc bit is not set for a committed dealloc.

At 1216, the dealloc bit is set (i.e., deal bit=1) for an uncommitted dealloc. The present invention provides for continuing and letting undo handle the rollback of the dealloc if necessary. At 1215, the dealloc bit is not set (i.e., deal bit=0) for a transaction that is not committed. The transaction can be aborted or incomplete. Note that the AP did not need redo, as that is an AP version from the future and one can just continue. It should be noted that when the AP does not need a redo and the dealloc is not committed, the process can just continue irrespective of the deal bit. Both 1215 and 1216 represent assertions that it is proper to continue with performing post-commit processing in these instances.

Single Page Deallocations During Node Recovery

When a node crashes, and is recovered, the pages recovered by the node may be worked on by other nodes in a cluster. In other words, the database is still active. The approach of the present invention for node recovery is similar to that described above for crash recovery, but with some additional steps resulting from the fact that other nodes in the cluster remain active.

Figure 13A:
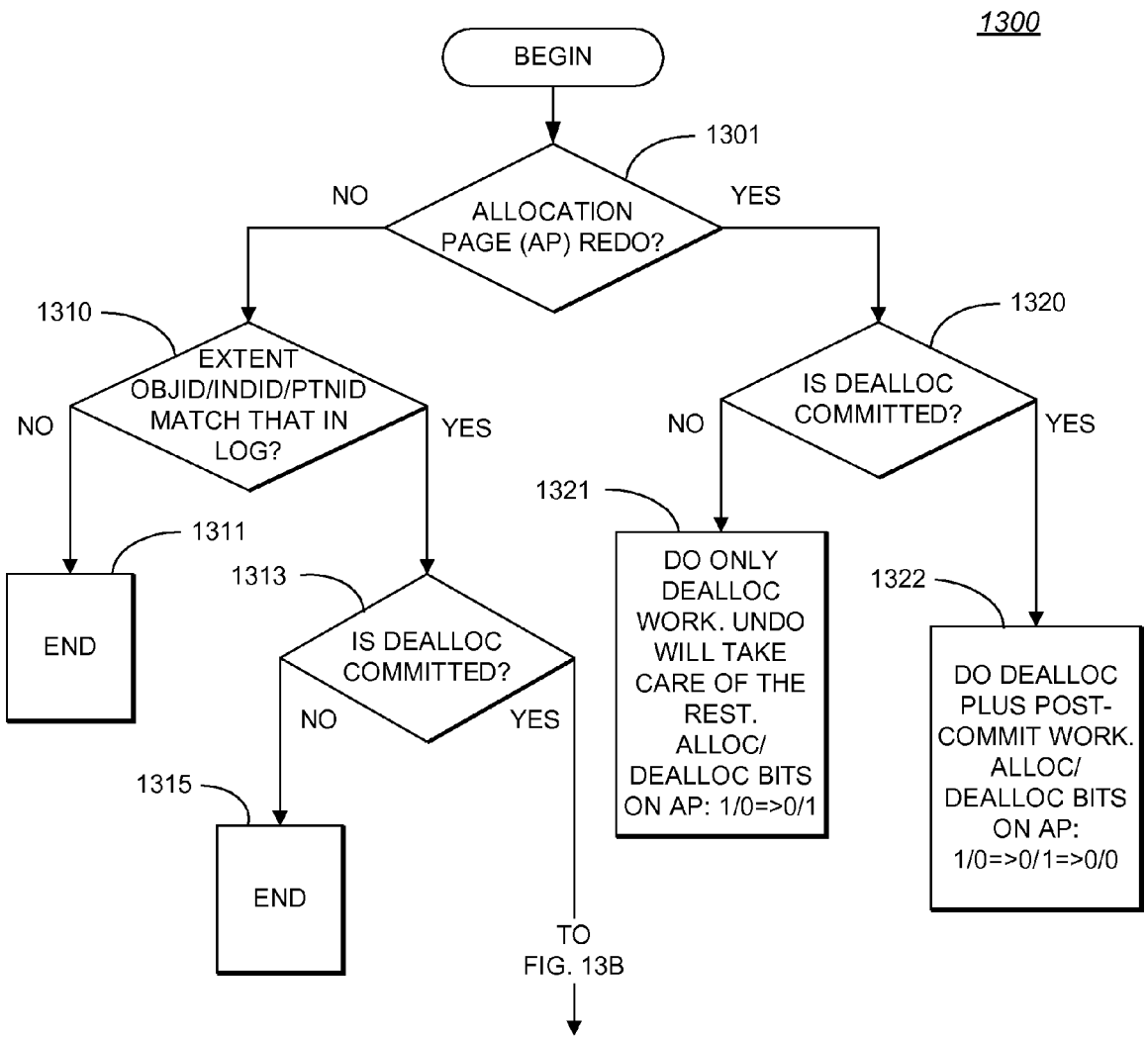
FIGS. 13A-B comprise a single high-level flow diagram illustrating the method steps of the present invention for single page deallocation during node recovery.
Figure 13B:
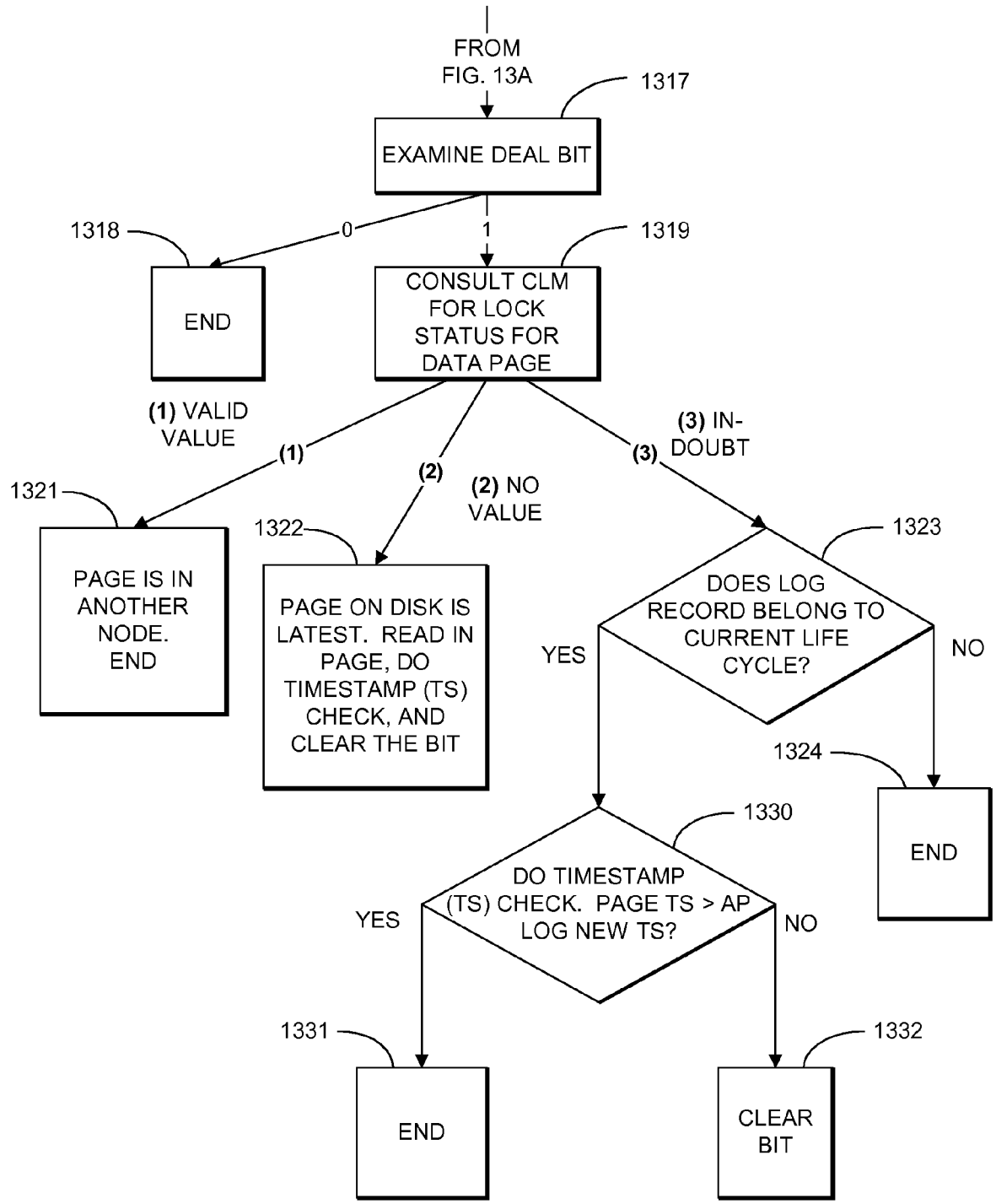

FIGS. 13A-B comprise a single high-level flow diagram 1300 illustrating the method steps of the present invention for a single page deallocation during node recovery. During processing of the dealloc record in the redo pass of recovery, a check is made as shown at 1301 at FIG. 13A to determine if AP changes need to be redone. If this check determines that AP changes need to be redone then the process proceeds to 1320.

If AP changes need to be performed, then post-commit changes may also need to be done. In this case, a check is made at 1320 in the same fashion as described above for crash recovery. If the dealloc is committed at 1320, the dealloc is redone and the post-commit work is also performed for committed deallocs as provided at 1322. However, for aborted or incomplete transactions only the dealloc is redone as provided at 1321. Further processing for aborted or incomplete transactions is left for handling by the undo pass (or redo of CLRs).

A more difficult case is when the allocation page (AP) does not need redo. Referring again to FIG. 13A, if the allocation page (AP) does not require redo during node recovery at 1301, the method proceeds to 1310. In this case, the first step is to perform the fundamental integrity check at 1310. If the check fails, one can exit (end) the process as provided at 1311. However, if the integrity check at 1310 is successful, then a check is made at 1313 to determine if the dealloc is committed. If the dealloc is not committed, there is no post-commit processing to do and the method ends as provided at 1315. However, if the dealloc is committed, the deal bit is examined as shown at 1317 at FIG. 13B. If the deal bit is not set (i.e., deal bit=0), there is no processing to do and the method exits (ends) as provided at 1318. However, if the deal bit is set (i.e., deal bit=1), ownership needs to be established. In other words, a determination is made as to whether this deal bit belongs to this log record, or if this is a remnant of not doing post-commit processing for a deallocation that is committed. One way to determine this is to request a shared lock on the page and fetch the page (either from another node or from disk). If the timestamp on the page is greater than the log's new timestamp on the allocation page, then the page has moved forward (i.e., the page was allocated again and is in a different life cycle). In this case one can conclusively determine that this dealloc bit does not belong to this log record and exit as it can be assumed that post-commit processing for this log record is completed. However, if the timestamp is less, then this dealloc log record's post-commit work is not yet complete. In this case it is safe to do the post-commit work and clear the bit.

Instead of fetching the page, the present invention provides an optimization by consulting lock status information for the data page available from the CLM as shown at 1319 at FIG. 13B. The CLM can provide the following information:

1) Valid value. A valid lock exists on another node for the page. This indicates that the page has moved forward in time. Post-commit processing has completed and the page has been allocated to a different node. No further processing is needed and the method ends (exit) as provided at 1321.
2) No value. No lock exists which indicates that the page on disk is the latest. As provided at 1322, the page can be read in from disk and a timestamp (TS) check can be performed to determine the ownership as above.
3) In-doubt. If the lock is in-doubt, this indicates that the node that crashed held the lock before going down. It is important to note that a page can have undergone multiple life cycles in the recoverable log. A life cycle is denoted by an allocation-deallocation cycle of a page. To illustrate this consider the following:

|  | Page Timestamp (Transaction) |
| --- | --- |
| ALLOC P1 | 100 (T1) |
| ... | 300 (T1) |
| DEALLOC P1 | 300 (T1) |
| COMMIT T1 |  |
| ALLOC P1 | 400 (T2) |
| ... | 500 (T2) |
| DEALLOC P1 | 500 (T2) |
| COMMIT T2 (post-commit not performed) |  |
| Crash |  |

In the above situation, one needs to ensure that post-commit processing is done only for the deallocation for transaction T2 and not for transaction T1. In other words it is necessary to track the life cycle of the page. Otherwise, the dealloc bit can be incorrectly cleared for Transaction T1.

Once the life cycle of the page has been identified, the timestamp on the page can be compared with the AP log new timestamp to determine the ownership of the dealloc bit with the log record. The log record is the owner if Page TS<AP log new TS. The AP timestamp is floored with the timestamp on the page during deallocation. If the page timestamp is higher, then the page has been reallocated and is in a different life cycle and therefore one can exit (end) the process as no further action is necessary.

The CLM maintains for every lock, a lock value that contains the timestamp on the page.

This value is updated at the following stages:
1) Page allocation.
2) Lock Downgrade.
3) Buffer gets destroyed (part of post-commit).

Since the value is updated during allocation, one can consider that as a boundary to establish the life cycle of a page. The methodology of the present invention will consider establishing ownership only if the AP new timestamp (AP new TS) as seen in the log record is in the current life cycle as determined from the lock value block. For every lock in the cluster, there is a node that contains the resource master. This maintains the information about the lock and has the timestamp stored in the value block.

There are two cases to consider:
1) The lock master is not on the crashed node. The lock value block is available. In this case, for every dealloc log record, in order to establish the ownership of the dealloc bit with the log record, the timestamp from the log record is compared with the timestamp in the lock value block. Post-commit processing will not be considered if the timestamp in the lock value block is greater than the AP new TS as seen in the log record. A higher timestamp indicates that the page has been reallocated again and is in a different life cycle.
2) The lock master is in the crashed node. The lock value block is not available. One of the first things done on node recovery is to reconstruct the lock master. It will have an invalid value for the lock value block (timestamp). The timestamp in the last life cycle during the analysis pass is then determined (i.e., reconstruct the lock value block in the lock master). Thus, at the end of the analysis pass one has the timestamp at the last allocation of the page.

During redo, a dealloc will not be considered for post-commit processing if the lock value timestamp is greater than the AP new timestamp as determined from the log record. Once the ownership is determined, then based on the other assertions the dealloc bit can be cleared.

The following summarizes the result of the above processing:

If the dealloc is not committed at 1313 as shown at FIG. 13A, the method can terminate (exit) as provided at 1315.

If the dealloc is committed at 1313, but the deal bit is not set at 1317 at FIG. 13B, exit (end) as provided at 1318.

If the dealloc is committed and the deal bit is set at 1317, determine if the deal bit belongs to this log record or is from the future. In this case, the CLM is consulted for the latest version of the page as provided at 1319 at FIG. 13B. The values of interest at 1319 are as follows: a lock exists (VALID VALUE), a lock does not exist (NO VALUE), and the lock is IN-DOUBT. The method proceeds to 1321, 1322, or 1323, respectively, based on these values.

If there is a valid lock on the page in another node with a valid status (VALID VALUE), then this deal bit does not belong to this log record (e.g., the page is in another node) as provided at 1321.

If no lock is held by any node (NO VALUE), then the page on disk is the latest. As provided at 1322, the page is read and the timestamp (TS) is checked. If the page timestamp is not greater than the log new AP timestamp (TS), the bit is cleared.

If the lock is IN-DOUBT, then this node held the latest version of the page before crash. A check is made as illustrated at 1323 to determine if the log record reflects the last incarnation of the page. If not, the process is exited (ended) as provided at 1324.

If the check at 1323 determines that the log record belongs to the last incarnation of the page, the timestamp on the page is compared with the AP new timestamp in the log record as provided at 1330. If the page timestamp (TS) is greater than the AP new timestamp (TS) in the log record at 1330, then this is from the future and the process ends (exits) as provided at 1331. Otherwise, the bit is cleared as provided at 1332.

Multiple Page Deallocations

For multiple page deallocations, the same approach and methodology discussed above for single page allocations is applied, with the following modifications:
1) The extent-log record check encompasses all the extents denoted in a log record if the log record affects multiple extents.
2) In order to associate the dealloc record and the post-commit work, a check is made to determine if all the dealloc bits as specified by the log record are set.

Furthermore, in order to conclusively ascertain that the operation has not been recycled (to ensure that one is not seeing the same set of operations from the future), the timestamp of one of the pages specified in the bitmap is checked against the new timestamp of the AP in the log record. If the timestamp on the page is greater, then the page has gone forward and a future version is being examined. Examining one of the pages is sufficient because if one page has moved forward in time then it can be assumed that all pages have moved forward in time given the same deallocation bitmap. As discussed previously, there can be no free page with a timestamp greater than the allocation page. The optimization of using the CLM can also be extended to cover multiple pages.

Determining that Deallocation has Committed

It should be noted that completed transactions in phase-1 recovery are removed from the transaction table during the analysis pass. Also note that completed transactions include committed and aborted transactions. Hence, a list of committed transactions is maintained and used during the post-commit processing.

A dealloc belonging to a committed transaction is not necessarily a committed dealloc, for the dealloc may be rolled back in cases such as "rollback to savepoint". For example, the following can be a log sequence due to rollback to savepoint:

```
1: Begin Tran T1
2: ..
3: save tran foo
4: dealloc P1
5: dealloc P2
6: CLR
7: CLR
8: Commit Tran
```

Although the transaction has committed, the deallocation of pages P1 and P2 are rolled back. There is no restriction on the number of savepoints in a transaction.

To address these issues a transaction table is maintained for committed transactions. This table contains a log record from the class of dealloc log records. For each transaction a list of rollback blocks is maintained to address deallocations that are rolled back. A dealloc is a committed dealloc if the transaction is committed and the dealloc is not part of a rollback block. Deallocations that are part of committed NTAs (nested top actions) are considered committed deallocs irrespective of the status of the outer transaction. Thus each committed xitem will have an array of rollback blocks and an array of committed NTAs.

Recover Only in-Doubt Pages

One of the conditions in failover recovery is that only in-doubt pages will be recovered. This means that only log records belonging to changes in-doubt pages will be processed. If a page is not in-doubt, then the page changes should be on disk. Recovery routines that fetch pages will check if they are in-doubt and processing will proceed only for the in-doubt pages.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. in a distributed database system comprising a cluster of nodes and having an allocation page for tracking allocation and deallocation of data pages accessed by multiple nodes, the allocation page including a deallocation bit for tracking deallocation of a data page, a method for determining when to clear the deallocation bit during recovery from failure of a node while other nodes of the distributed database system remains online, the method comprising:

during runtime operation of the distributed database system, generating log records recording allocation and deallocation of data pages required by the cluster of nodes, setting the deallocation bit during deallocation of a data page by a transaction, and clearing the deallocation bit after the transaction has committed;

during recovery of the distributed database system following a failure of a given node and while other nodes of the distributed database system remains online, determining ownership of the deallocation bit by identifying a particular log record corresponding to the deallocation bit set in the allocation page during deallocation of a given data page;

determining whether the deallocation of the given data page recorded in the particular log record committed prior to the failure; and if the deallocation of the given data page committed prior to the failure and the ownership of the deallocation bit can be established to the particular log record, clearing the deallocation bit.

2. The method of claim 1, further comprising:

if the deallocation was not committed prior to the failure, redoing the deallocation and any necessary undo action without clearing the deallocation bit.

3. The method of claim 1, wherein said step of generating log records includes generating log records of deallocation of data pages without generating log records for post-commit work performed after the transaction has committed.

4. The method of claim 1, wherein the failure comprises a complete failure or a partial failure of the distributed database system.

5. The method of claim 1, wherein the failure includes a partial failure of the distributed database system after which one or more nodes of the distributed database system continue runtime operations.

6. The method of claim 5, wherein said identifying step includes identifying whether the deallocation bit is set as a result of a transaction committed prior to the partial failure of the distributed database system which has post-commit work pending.

7. The method of claim 1, wherein said clearing step includes substeps of:

determining whether the deallocation bit in the allocation page is set;

if the deallocation bit in the allocation page is set, identifying a particular log record corresponding to the deallocation bit;

comparing a data page timestamp to a new allocation page timestamp recorded in the particular log record; and if the data page timestamp is less than the new allocation page timestamp recorded in the particular log record, clearing the deallocation bit.

8. The method of claim 1, wherein said determining step includes consulting a lock manager for determining state of the data page, so as to minimize page transfers and page reads from disk in the distributed database system.

9. A computer-readable medium having processor-executable instructions for performing the method of claim 1.

10. A downloadable set of processor-executable instructions for performing the method of claim 1.

11. A system for tracking allocation and deallocation of database pages in a distributed database system having a plurality of database servers sharing access to data pages, the system comprising:

an allocation page for tracking allocation and deallocation of data pages in the database system, the allocation page including a deallocation bit for tracking deallocation of a data page, an allocation module for setting the deallocation bit during deallocation of a data page by a transaction, and clearing the deallocation bit after the transaction has committed during runtime operation of the distributed database system;

a log module for generating log records recording allocation and deallocation of data pages during runtime operation; and a recovery module for identifying, during recovery from failure of a given database server and while other database servers of the distributed database system remains online, ownership of the deallocation bit by determining a particular log record corresponding to the deallocation bit set in the allocation page during deallocation of a given data page, clearing the deallocation bit if the deallocation of the given data page recorded in the particular log record committed prior to the failure and the ownership of the deallocation bit can be established to the particular log record, and redoing the deallocation and performing any necessary undo action if the deallocation was not committed prior to failure.

12. The system of claim 11, wherein the recovery module redoes the deallocation and any necessary undo action without clearing the deallocation bit if the deallocation was not committed prior to failure.

13. The system of claim 11, wherein the log module generates log records of deallocation of data pages without generating log records for post-commit work performed after the transaction has committed.

14. The system of claim 11, wherein the failure comprises a failure of more than one database server of the distributed database system.

15. The system of claim 11, wherein the failure comprises a failure of one database server node of the distributed database system after which one or more other nodes of the distributed database system continue runtime operations.

16. The system of claim 15, wherein the recovery module determines whether the deallocation bit is set as a result of a transaction committed prior to the failure which has post-commit work pending.

17. The system of claim 11, wherein the recovery module determines whether the deallocation bit in the allocation page is set and identifies a particular log record corresponding to the deallocation bit if the deallocation bit in the allocation page is set.

18. The system of claim 17, wherein the recovery module compares a data page timestamp to a new allocation page timestamp recorded in the particular log record for purposes of determining whether post-commit processing is complete.

19. The system of claim 11, wherein the recovery module consults a lock manager for determining state of the data page, so as to minimize page transfers and page reads from disk in the distributed database system.

20. In a distributed database system including a plurality of servers sharing access to data, an improved method for post-commit processing of transactions, the method comprising:
   maintaining an allocation page timestamp on an allocation page which allocation page timestamp is updated when pages are deallocated;
   when data pages are deallocated during operation of the distributed database system, setting a deallocation bit on the allocation page;
   creating log records identifying the deallocated data pages and the allocation page timestamp before and after the deallocation;
   during database recovery operations following a failure of a given server and while other servers of the distributed database system remain online, determining whether to perform post-commit processing for a committed transaction based on examining the log records to determine if the data page deallocation committed and whether ownership of the deallocation bit can be established to a given log record as a result of the data page deallocation being reflected in that given log record; and
   performing any post-commit processing determined to be necessary to return the database to a consistent state.

21. The method of claim 20, further comprising:
   if said determining step determines that the data page deallocation was not committed prior to the failure, redoing the deallocation and any necessary undo action without clearing the deallocation bit.

22. The method of claim 20, wherein said step of creating log records includes creating log records of deallocation of data pages without generating log records for post-commit work performed after the transaction has committed.

23. The method of claim 20, wherein the failure comprises a complete failure or a partial failure of the distributed database system.

24. The method of claim 20, wherein the failure includes a partial failure of the distributed database system after which one or more servers continue runtime operations.

25. The method of claim 24, wherein said determining step includes identifying whether the deallocation bit is set as a result of a transaction committed prior to the partial failure of the distributed database system which has post-commit work pending.

26. The method of claim 25, further comprising:
   if the data page deallocation committed prior to the failure, clearing the deallocation bit.

27. The method of claim 20, wherein said determining step includes substeps of:
   determining whether the deallocation bit in the allocation page is set;
   if the deallocation bit in the allocation page is set, identifying a particular log record corresponding to the deallocation bit; and
   comparing a data page timestamp to an allocation page timestamp recorded in the particular log record.

28. The method of claim 20, wherein said determining step includes consulting a lock manager for determining state of the data page.

29. The method of claim 20, wherein said step of performing post commit work includes performing post-commit work for a transaction committed prior to the failure which is determined to have post-commit work pending.

30. A computer-readable medium having processor-executable instructions for performing the method of claim 20.

* * * * *